US011254433B2

(12) United States Patent
Rajasingham

(10) Patent No.: US 11,254,433 B2
(45) Date of Patent: Feb. 22, 2022

(54) OCCUPANT SUPPORTS AND VIRTUAL VISUALIZATION AND NAVIGATION

(71) Applicant: Arjuna Indraeswaran Rajasingham, Bethesda, MD (US)

(72) Inventor: Arjuna Indraeswaran Rajasingham, Bethesda, MD (US)

( * ) Notice: Subject to any disclaimer, the term of this patent is extended or adjusted under 35 U.S.C. 154(b) by 0 days.

(21) Appl. No.: 16/926,685

(22) Filed: Jul. 11, 2020

(65) Prior Publication Data

US 2020/0407064 A1    Dec. 31, 2020

Related U.S. Application Data

(63) Continuation-in-part of application No. 16/855,181, filed on Apr. 22, 2020, now Pat. No. 10,921,885, and a continuation-in-part of application No. 16/884,479, filed on May 27, 2020, now abandoned, which is a continuation-in-part of application No. 16/855,181, filed on Apr. 22, 2020, now Pat. No. 10,921,885, which is a continuation-in-part of application No. 16/430,061, filed on Jun. 3, 2019, which is a
(Continued)

(51) Int. Cl.
| | |
|---|---|
| *B64D 11/06* | (2006.01) |
| *B60N 2/28* | (2006.01) |
| *B60N 3/00* | (2006.01) |
| *B60N 2/427* | (2006.01) |
| *B64D 11/00* | (2006.01) |
| *B60N 2/01* | (2006.01) |
| *B60N 2/34* | (2006.01) |
| *B60N 2/75* | (2018.01) |
| *B60N 2/885* | (2018.01) |
| *B60N 2/90* | (2018.01) |

(52) U.S. Cl.
CPC .............. *B64D 11/064* (2014.12); *B60N 2/01* (2013.01); *B60N 2/012* (2013.01); *B60N 2/286* (2013.01); *B60N 2/289* (2013.01); *B60N 2/2827* (2013.01); *B60N 2/2851* (2013.01); *B60N 2/2863* (2013.01); *B60N 2/2869* (2013.01); *B60N 2/2872* (2013.01); *B60N 2/2875* (2013.01); *B60N 2/2893* (2013.01); *B60N 2/34* (2013.01); *B60N 2/42709* (2013.01); *B60N 2/78* (2018.02); *B60N 2/885* (2018.02); *B60N 2/986* (2018.02); *B60N 2/995* (2018.02); *B60N 3/002* (2013.01); *B64D 11/00* (2013.01); *B64D 11/0601* (2014.12); *B64D 11/0604* (2014.12); *B64D 11/0606* (2014.12); *B64D 11/0638* (2014.12); *B64D 11/0641* (2014.12); *B64D 2011/0046* (2013.01); *Y02T 50/40* (2013.01)

(58) Field of Classification Search
CPC ......... B64C 6411/0604; B64C 11/0601; B64C 11/0602; B64C 11/0606; B64C 11/0648; B64C 2011/0046; B64C 2011/0069; B64C 11/0641; B64C 2011/0084; B64C 2011/0604; B60N 2/34
See application file for complete search history.

(56) References Cited

U.S. PATENT DOCUMENTS 2,808,787 A * 10/1957 Murphy .................. B61D 1/02
                                                        105/315
2,914,001 A * 11/1959 Murphy .................. B61D 1/04
                                                        105/315
(Continued)

*Primary Examiner* — Philip J Bonzell

(57) ABSTRACT

Arrangements for safety and comfort in vehicles.

20 Claims, 54 Drawing Sheets

Related U.S. Application Data continuation-in-part of application No. PCT/US2017/064626, filed on Dec. 5, 2017, which is a continuation-in-part of application No. 14/203,088, filed on Mar. 10, 2014, now Pat. No. 10,423,295, which is a continuation-in-part of application No. 13/694,996, filed on Jan. 24, 2013, said application No. PCT/US2017/064626 is a continuation-in-part of application No. 14/708,584, filed on May 11, 2015, now Pat. No. 10,120,440, said application No. 16/884,479 is a continuation-in-part of application No. 16/430,061, filed on Jun. 3, 2019, which is a continuation-in-part of application No. 14/203,088, filed on Mar. 10, 2014, now Pat. No. 10,423,295, said application No. 16/884,479 is a continuation-in-part of application No. 16/430,061, filed on Jun. 3, 2019, which is a continuation-in-part of application No. 13/694,996, filed on Jan. 24, 2013, said application No. 16/884,479 is a continuation-in-part of application No. 16/430,061, filed on Jun. 3, 2019, which is a continuation-in-part of application No. 16/138,998, filed on Sep. 22, 2018, which is a continuation-in-part of application No. 15/203,882, filed on Jul. 7, 2016, now Pat. No. 10,703,483, which is a continuation-in-part of application No. 14/375,673, filed as application No. PCT/US2013/000024 on Jan. 31, 2013, now Pat. No. 9,868,416, said application No. 16/884,479 is a continuation-in-part of application No. 16/430,061, filed on Jun. 3, 2019, which is a continuation-in-part of application No. 16/138,998, filed on Sep. 22, 2018, which is a continuation-in-part of application No. 15/872,108, filed on Jan. 16, 2018, which is a continuation-in-part of application No. 15/143,168, filed on Apr. 29, 2016, now Pat. No. 10,556,523, said application No. 16/884,479 is a continuation-in-part of application No. 16/430,061, filed on Jun. 3, 2019, which is a continuation-in-part of application No. 16/138,998, filed on Sep. 22, 2018, which is a continuation-in-part of application No. 15/143,168, filed on Apr. 29, 2016, now Pat. No. 10,556,523, which is a continuation-in-part of application No. 13/820,510, filed as application No. PCT/US2011/001547 on Sep. 6, 2011, now Pat. No. 9,358,908, said application No. 16/884,479 is a continuation-in-part of application No. 16/430,061, filed on Jun. 3, 2019, which is a continuation-in-part of application No. 16/138,998, filed on Sep. 22, 2018, said application No. 16/138,998 is a continuation-in-part of application No. 15/143,168, filed on Apr. 29, 2016, now Pat. No. 10,556,523, which is a continuation-in-part of application No. 14/461,395, filed on Aug. 16, 2014, now Pat. No. 9,440,563, which is a continuation-in-part of application No. 12/451,317, filed on Nov. 6, 2009, now Pat. No. 8,864,229, said application No. 16/884,479 is a continuation-in-part of application No. 16/430,061, filed on Jun. 3, 2019, which is a continuation-in-part of application No. 16/138,998, filed on Sep. 22, 2018, which is a continuation-in-part of application No. 15/143,168, filed on Apr. 29, 2016, now Pat. No. 10,556,523, which is a continuation-in-part of application No. 14/210,413, filed on Mar. 13, 2014, now Pat. No. 9,428,088, which is a continuation of application No. 12/735,146, filed as application No. PCT/US2009/000342 on Jan. 21, 2009, now Pat. No. 8,763,954, said application No. 16/884,479 is a continuation-in-part of application No. 16/430,061, filed on Jun. 3, 2019, which is a continuation-in-part of application No. 16/138,998, filed on Sep. 22, 2018, which is a continuation-in-part of application No. 15/143,168, filed on Apr. 29, 2016, now Pat. No. 10,556,523, which is a continuation-in-part of application No. 14/848,575, filed on Sep. 9, 2015, now Pat. No. 9,669,739, which is a continuation-in-part of application No. 13/138,183, filed on Jul. 18, 2011, now Pat. No. 9,174,555, said application No. 16/884,479 is a continuation-in-part of application No. 16/430,061, filed on Jun. 3, 2019, which is a continuation-in-part of application No. 16/138,998, filed on Sep. 22, 2018, which is a continuation-in-part of application No. 15/203,882, filed on Jul. 7, 2016, now Pat. No. 10,703,483, which is a continuation-in-part of application No. 14/210,413, filed on Mar. 13, 2014, now Pat. No. 9,428,088, which is a continuation of application No. 12/735,146, filed as application No. PCT/US2009/000342 on Jan. 21, 2009, now Pat. No. 8,763,954, said application No. 16/884,479 is a continuation-in-part of application No. 16/430,061, filed on Jun. 3, 2019, which is a continuation-in-part of application No. 16/138,998, filed on Sep. 22, 2018, which is a continuation-in-part of application No. 15/872,108, filed on Jan. 16, 2018, which is a continuation-in-part of application No. 14/903,573, filed as application No. PCT/US2014/045727 on Jul. 8, 2014, now Pat. No. 10,173,779, said application No. 16/884,479 is a continuation-in-part of application No. 16/430,061, filed on Jun. 3, 2019, which is a continuation-in-part of application No. 16/138,998, filed on Sep. 22, 2018, which is a continuation-in-part of application No. 15/872,108, filed on Jan. 16, 2018, which is a continuation-in-part of application No. 15/203,882, filed on Jul. 7, 2016, now Pat. No. 10,703,483, which is a continuation-in-part of application No. 14/375,673, filed on Jul. 30, 2014, now Pat. No. 9,868,416, said application No. 15/203,882 is a continuation-in-part of application No. 14/852,593, filed on Sep. 13, 2015, now Pat. No. 10,144,514, which is a continuation-in-part of application No. 13/138,183, filed as application No. PCT/US2010/000237 on Jan. 28, 2010, now Pat. No. 9,174,555, said application No. 16/884,479 is a continuation-in-part of application No. 16/430,061, filed on Jun. 3, 2019, which is a continuation-in-part of application No. 16/138,998, filed on Sep. 22, 2018, which is a continuation-in-part of application No. 15/878,488, filed on Jan. 24, 2018, now Pat. No. 10,780,857, which is a continuation-in-part of application No. 14/726,170, filed on May 29, 2015, now Pat. No. 11,046,215, which is a continuation-in-part of application No. 13/507,149, filed on Jun. 9, 2012, now Pat. No. 9,150,127, which is a continuation-in-part of application No. 11/639,088, filed on Dec. 14, 2006, now Pat. No. 8,251,444, said application No. PCT/US2010/000237 is a continuation-in-part of application No. 11/639,088, filed on Dec. 14, 2006, now Pat. No. 8,251,444, said application No. 16/884,479 is a continuation-in-part of application No. 16/430,061, filed on Jun. 3, 2019, which is a continuation-in-part of application No. 15/878,488, filed on Jan. 24, 2018, now Pat. No. 10,780,857, said application No. 16/884,479 is a continuation-in-part of application No. 16/430,061, filed on Jun. 3, 2019, which is a continuation-in-part of application No. 15/872,108, filed on Jan. 16, 2018, said application No. 16/884,479 is a continuation-in-part of application No. 16/430,061, filed on Jun. 3, 2019, which is a continuation-in-part of application No. 15/203,882, filed on Jul. 7, 2016, now Pat. No. 10,703,483, said application No. 16/884,479 is a continuation-in-part of application No. 16/430,061, filed on Jun. 3, 2019, which is a continuation-in-part of application No. 15/143,168, filed on Apr. 29, 2016, now Pat. No. 10,556,523, said application No. 13/507,149 is a continuation-in-part of application No. 13/138,183, filed on Jul. 18, 2011, now Pat. No. 9,174,555, application No. 16/926,685, which is a continuation-in-part of application No. 16/138,998, filed on Sep. 22, 2018.

(60) Provisional application No. 63/044,598, filed on Jun. 26, 2020, provisional application No. 63/028,004, filed on May 21, 2020, provisional application No. 62/971,946, filed on Feb. 8, 2020, provisional application No. 62/480,071, filed on Mar. 31, 2017, provisional application No. 62/430,910, filed on Dec. 6, 2016, provisional application No. 61/961,367, filed on Oct. 12, 2013, provisional application No. 61/961,092, filed on Oct. 4, 2013, provisional application No. 61/959,598, filed on Aug. 28, 2013, provisional application No. 61/957,635, filed on Jul. 8, 2013, provisional application No. 61/848,724, filed on Jan. 10, 2013, provisional application No. 61/797,639, filed on Dec. 12, 2012, provisional application No. 61/797,175, filed on Dec. 1, 2012, provisional application No. 61/744,431, filed on Sep. 26, 2012, provisional application No. 61/688,855, filed on May 23, 2012, provisional application No. 61/688,591, filed on May 17, 2012, provisional application No. 61/686,316, filed on Apr. 3, 2012, provisional application No. 61/685,537, filed on Mar. 20, 2012, provisional application No. 61/632,797, filed on Jan. 31, 2012, provisional application No. 61/465,160, filed on Mar. 15, 2011, provisional application No. 61/460,266, filed on Dec. 29, 2010, provisional application No. 61/459,689, filed on Dec. 16, 2010, provisional application No. 61/458,997, filed on Dec. 3, 2010, provisional application No. 61/404,335, filed on Oct. 1, 2010, provisional application No. 61/402,751, filed on Sep. 3, 2010, provisional application No. 61/276,298, filed on Sep. 9, 2009, provisional application No. 61/270,808, filed on Jul. 14, 2009, provisional application No. 61/215,559, filed on May 7, 2009, provisional application No. 61/214,672, filed on Apr. 27, 2009, provisional application No. 61/211,191, filed on Mar. 27, 2009, provisional application No. 61/208,445, filed on Feb. 24, 2009, provisional application No. 61/206,205, filed on Jan. 28, 2009, provisional application No. 61/198,541, filed on Nov. 6, 2008, provisional application No. 61/191,309, filed on Sep. 8, 2008, provisional application No. 61/188,175, filed on Aug. 7, 2008, provisional application No. 61/123,345, filed on Apr. 8, 2008, provisional application No. 61/072,495, filed on Mar. 31, 2008, provisional application No. 61/072,241, filed on Mar. 28, 2008, provisional application No. 61/066,372, filed on Feb. 20, 2008, provisional application No. 61/062,002, filed on Jan. 23, 2008.

(56) References Cited

U.S. PATENT DOCUMENTS

| | | | | |
|---|---|---|---|---|
| 4,686,908 A * | 8/1987 | Legrand | | B61D 1/02 |
| | | | | 105/315 |
| 5,716,026 A * | 2/1998 | Pascasio | | B64D 11/00 |
| | | | | 105/315 |
| 6,056,239 A * | 5/2000 | Cantu | | B64D 11/06 |
| | | | | 244/118.5 |
| 7,448,575 B2 * | 11/2008 | Cheung | | B64D 11/00 |
| | | | | 244/118.6 |
| 7,681,951 B2 * | 3/2010 | Doebertin | | B64D 11/0604 |
| | | | | 297/245 |
| 7,975,962 B2 * | 7/2011 | Jacob | | B60N 2/345 |
| | | | | 244/118.6 |
| 8,678,311 B2 * | 3/2014 | Cheung | | B60N 2/06 |
| | | | | 244/118.6 |
| 9,868,531 B2 * | 1/2018 | Kircher | | B64D 11/0604 |
| 9,994,127 B2 * | 6/2018 | Cheung | | B60N 2/0292 |
| 2006/0192050 A1 * | 8/2006 | Cheung | | B60N 2/06 |
| | | | | 244/118.6 |
| 2007/0164591 A1 * | 7/2007 | Doebertin | | B64D 11/0604 |
| | | | | 297/245 |
| 2009/0065642 A1 * | 3/2009 | Cheung | | B60N 2/22 |
| | | | | 244/118.6 |
| 2009/0066121 A1 * | 3/2009 | Jacob | | B64D 11/0604 |
| | | | | 297/118 |
| 2014/0197667 A1 * | 7/2014 | Cheung | | B64D 11/00 |
| | | | | 297/257 |
| 2015/0274298 A1 * | 10/2015 | Kircher | | B64D 11/0604 |
| | | | | 244/118.6 |
| 2018/0290562 A1 * | 10/2018 | Cheung | | B64D 11/0601 |
| 2019/0308733 A1 * | 10/2019 | O'Neill | | B64D 11/0698 |

* cited by examiner

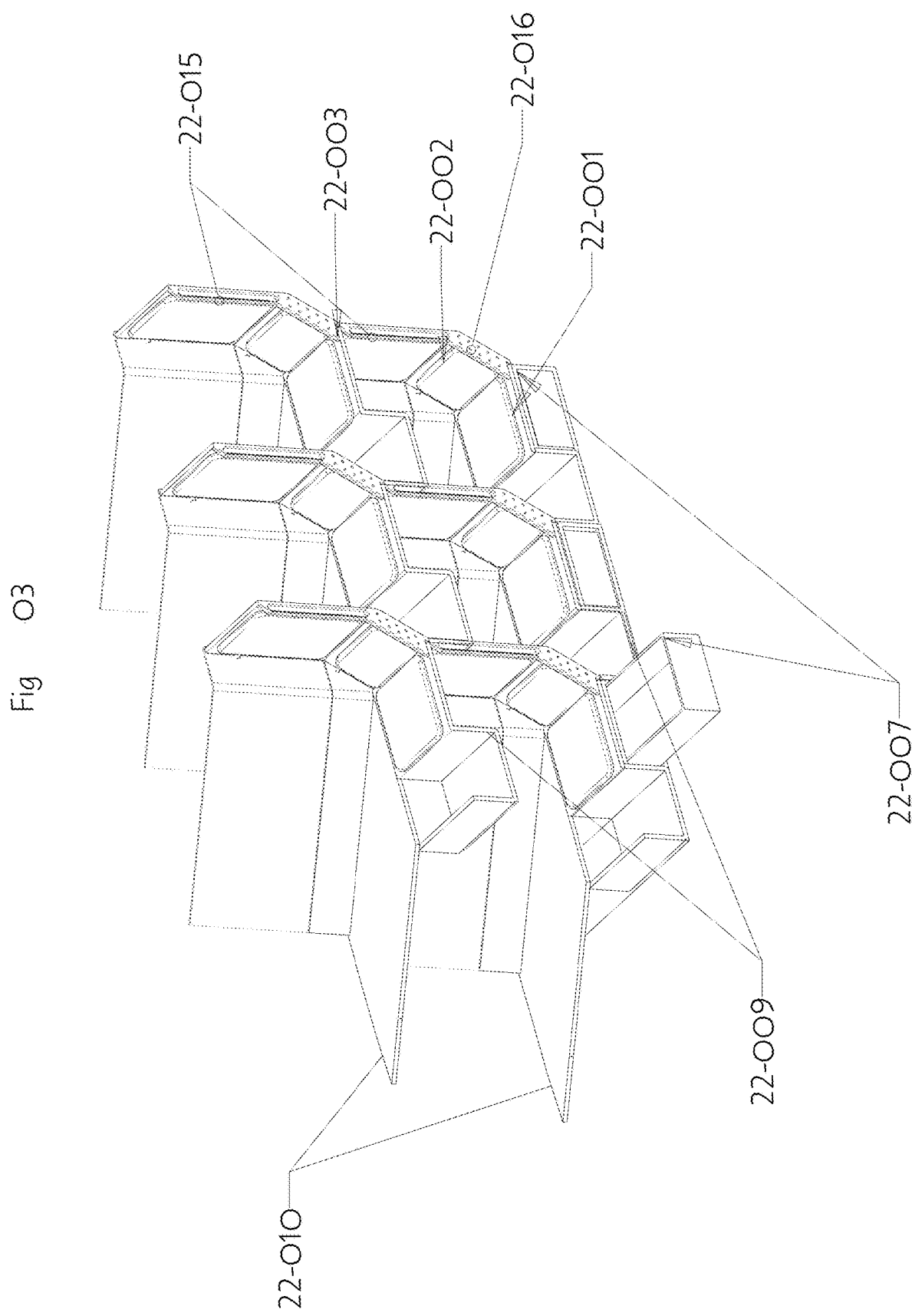

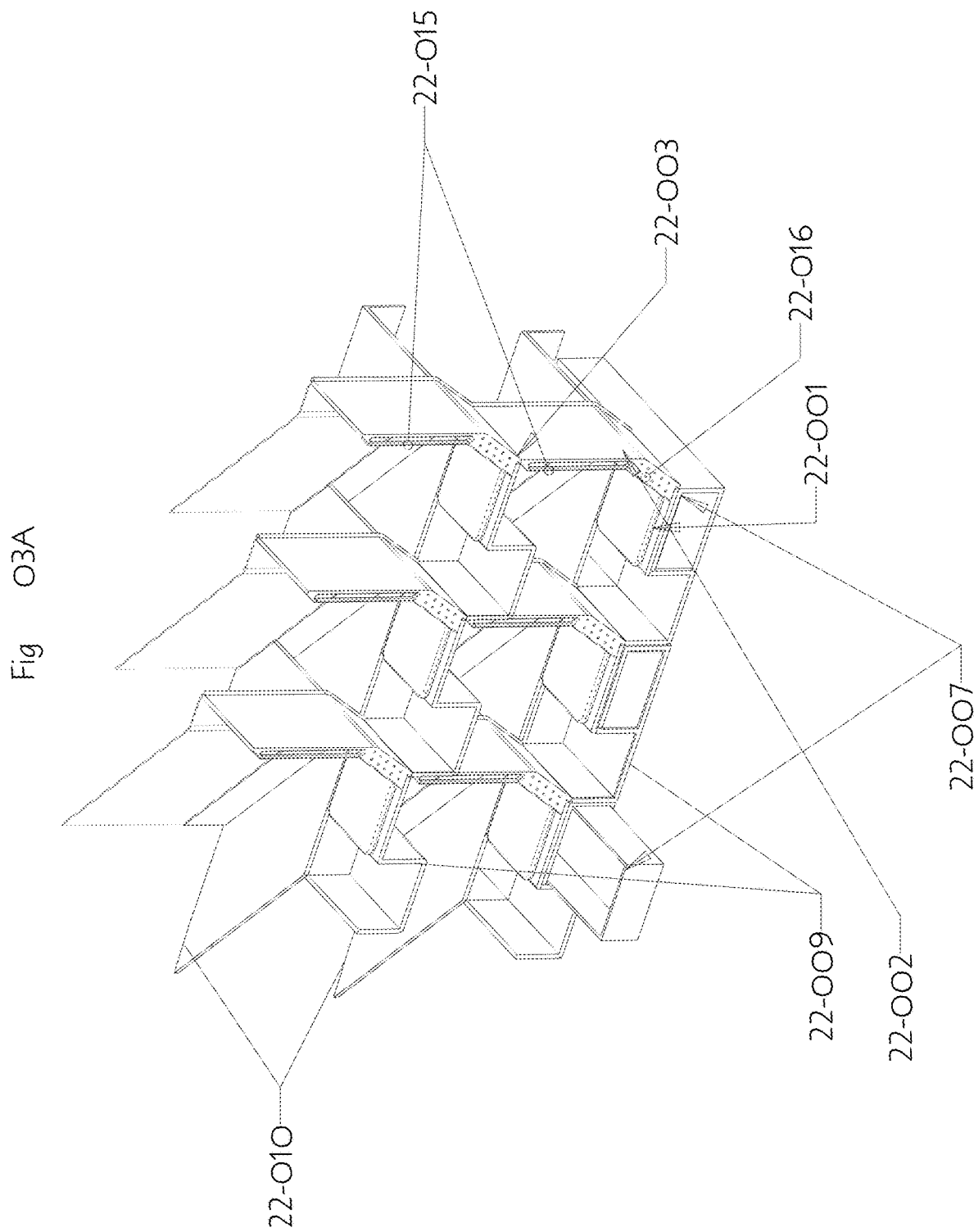

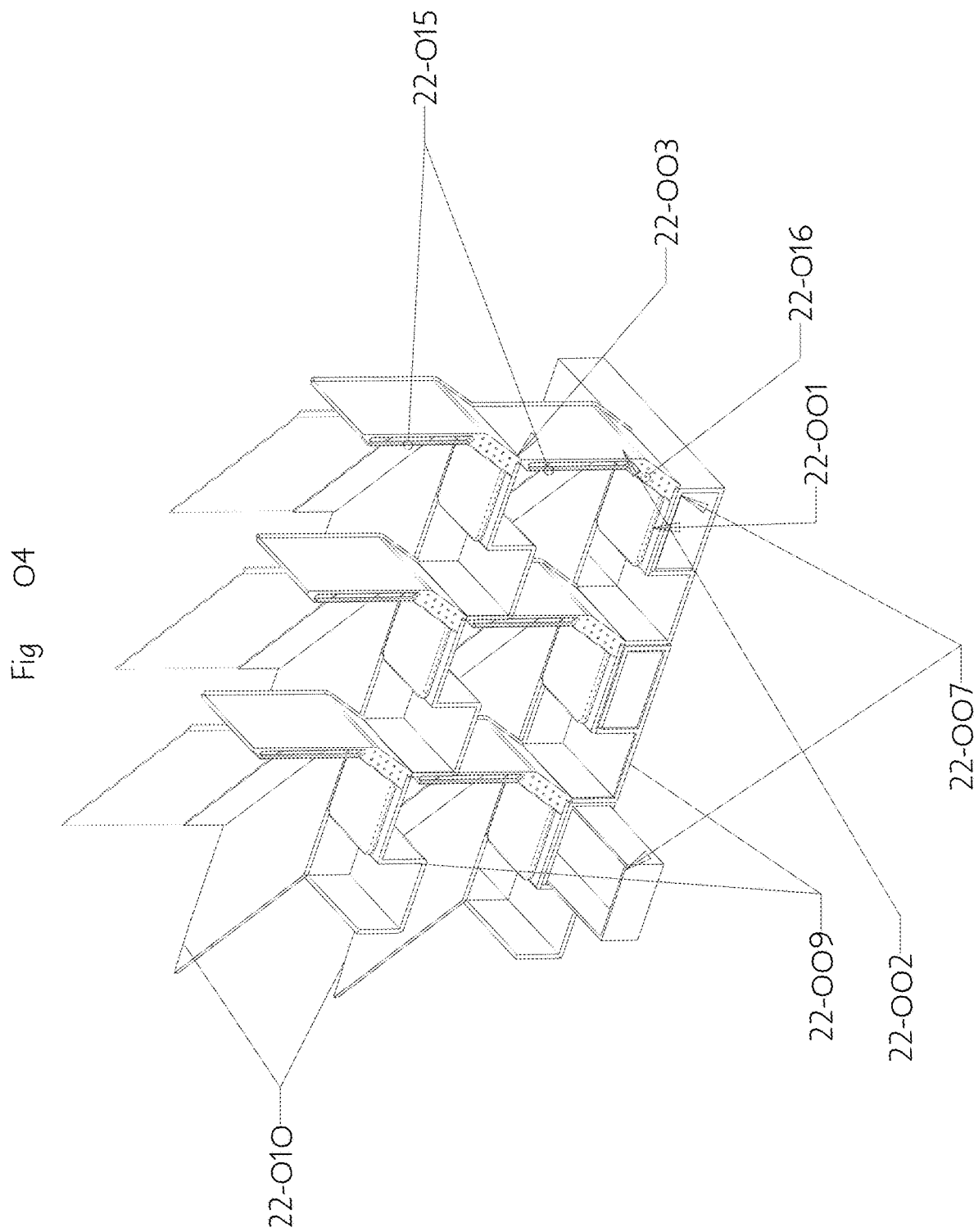

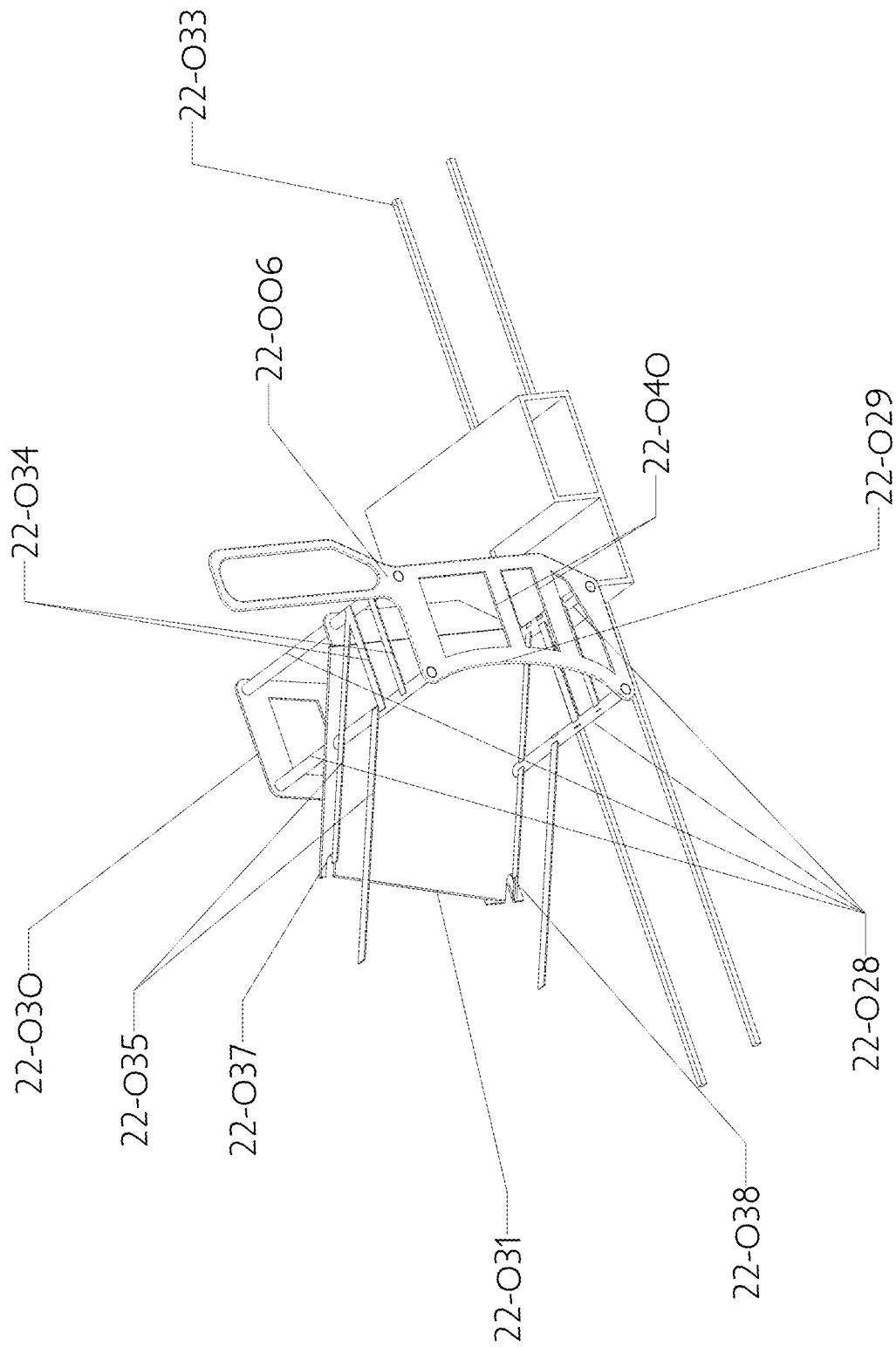

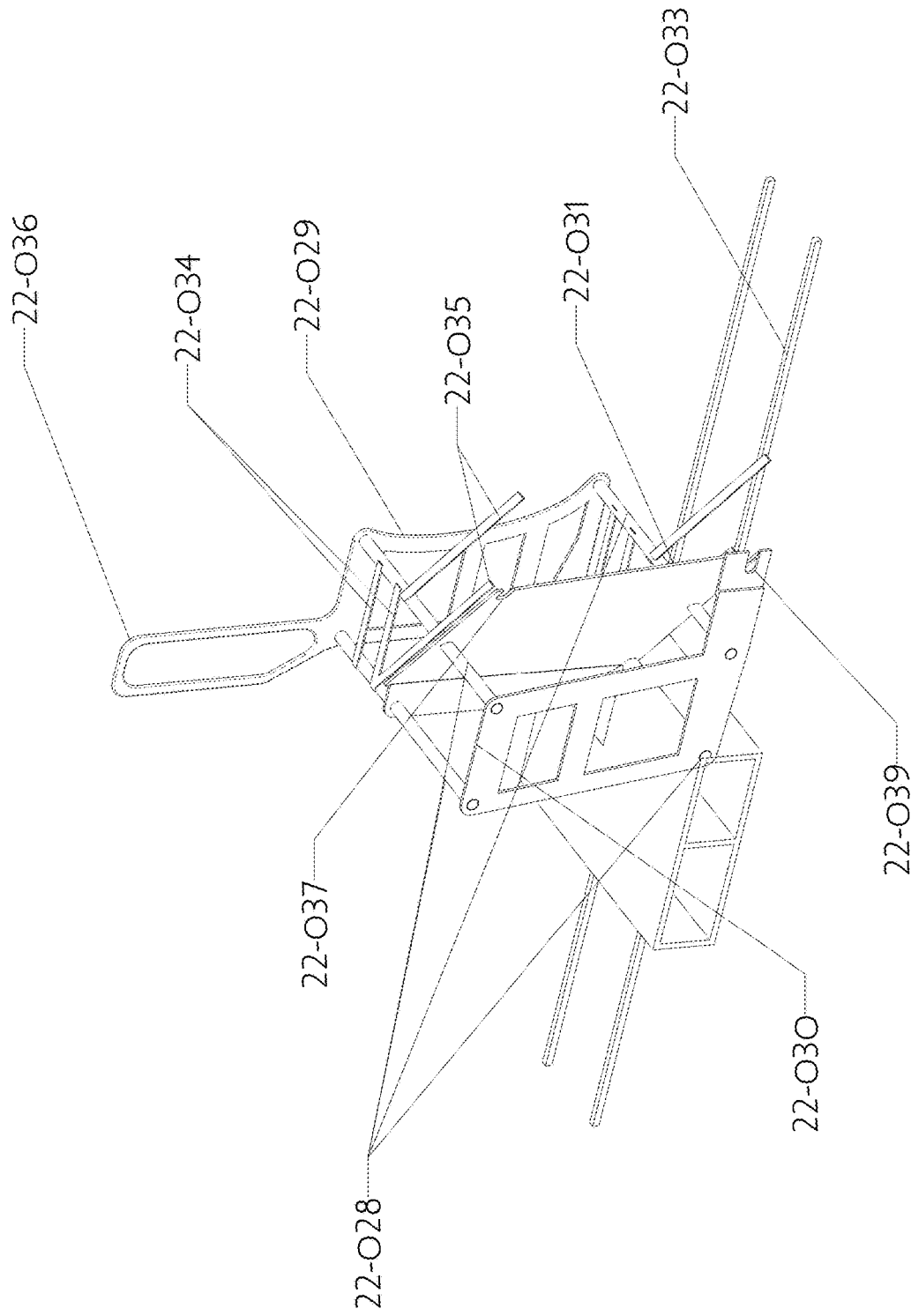

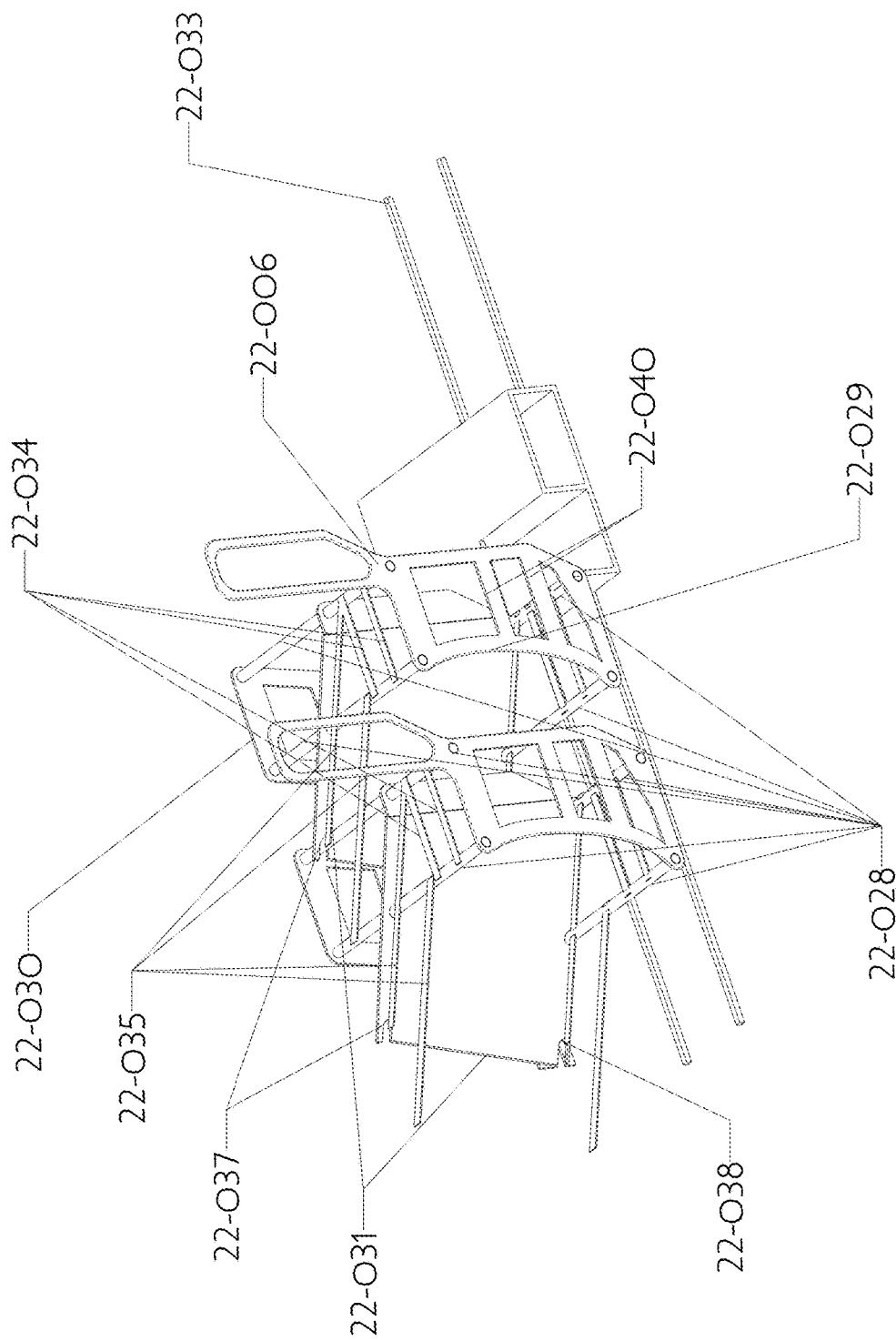

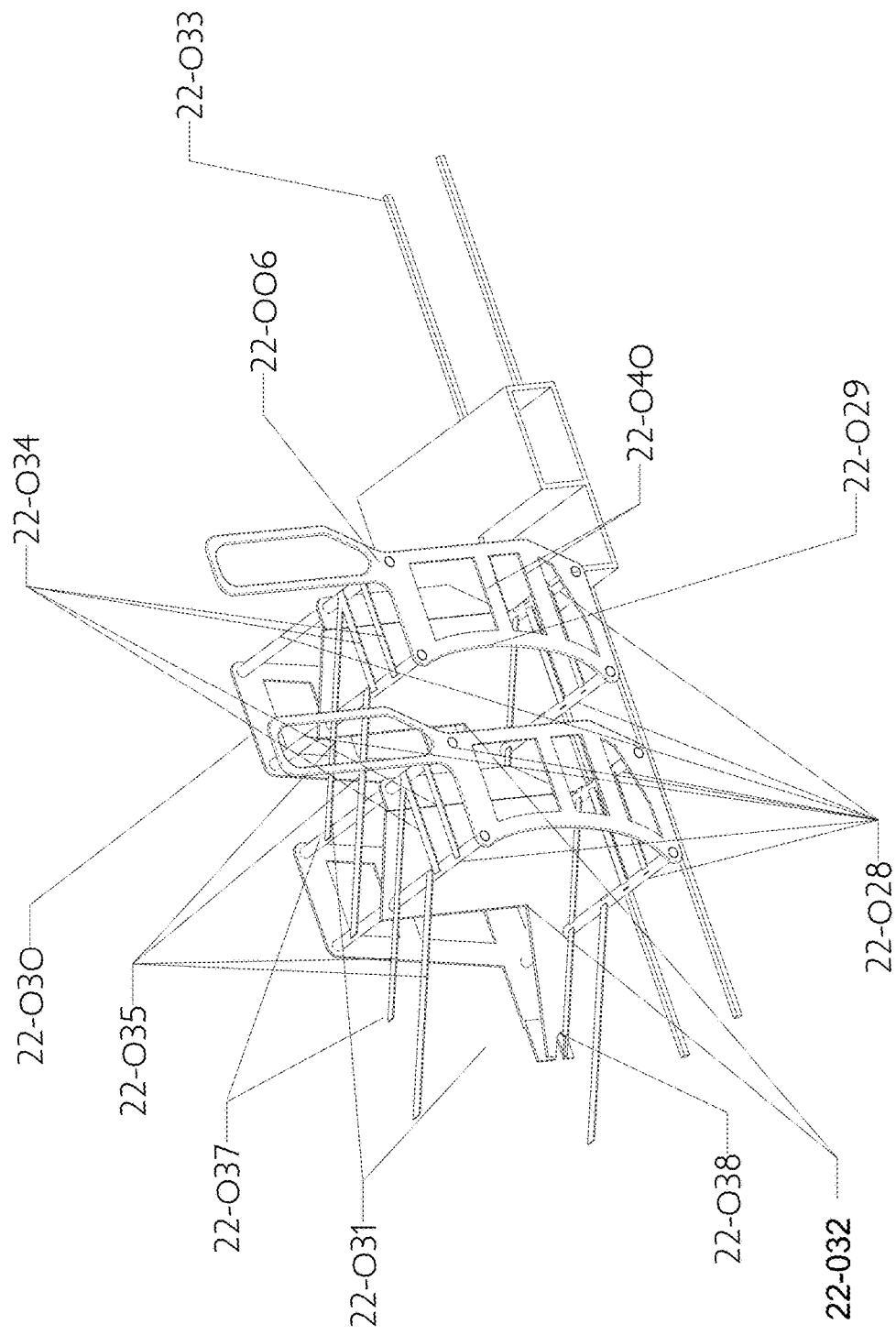

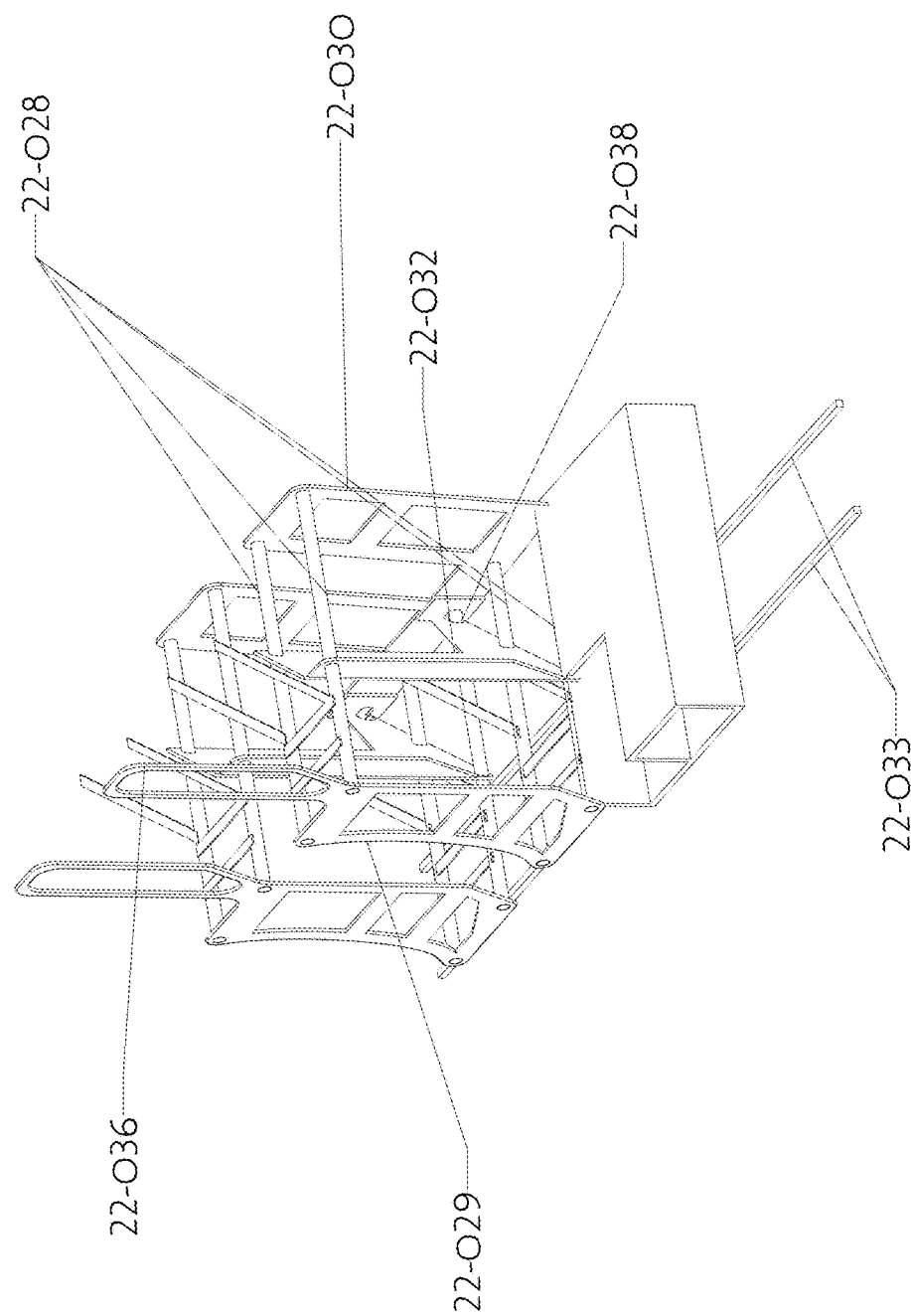

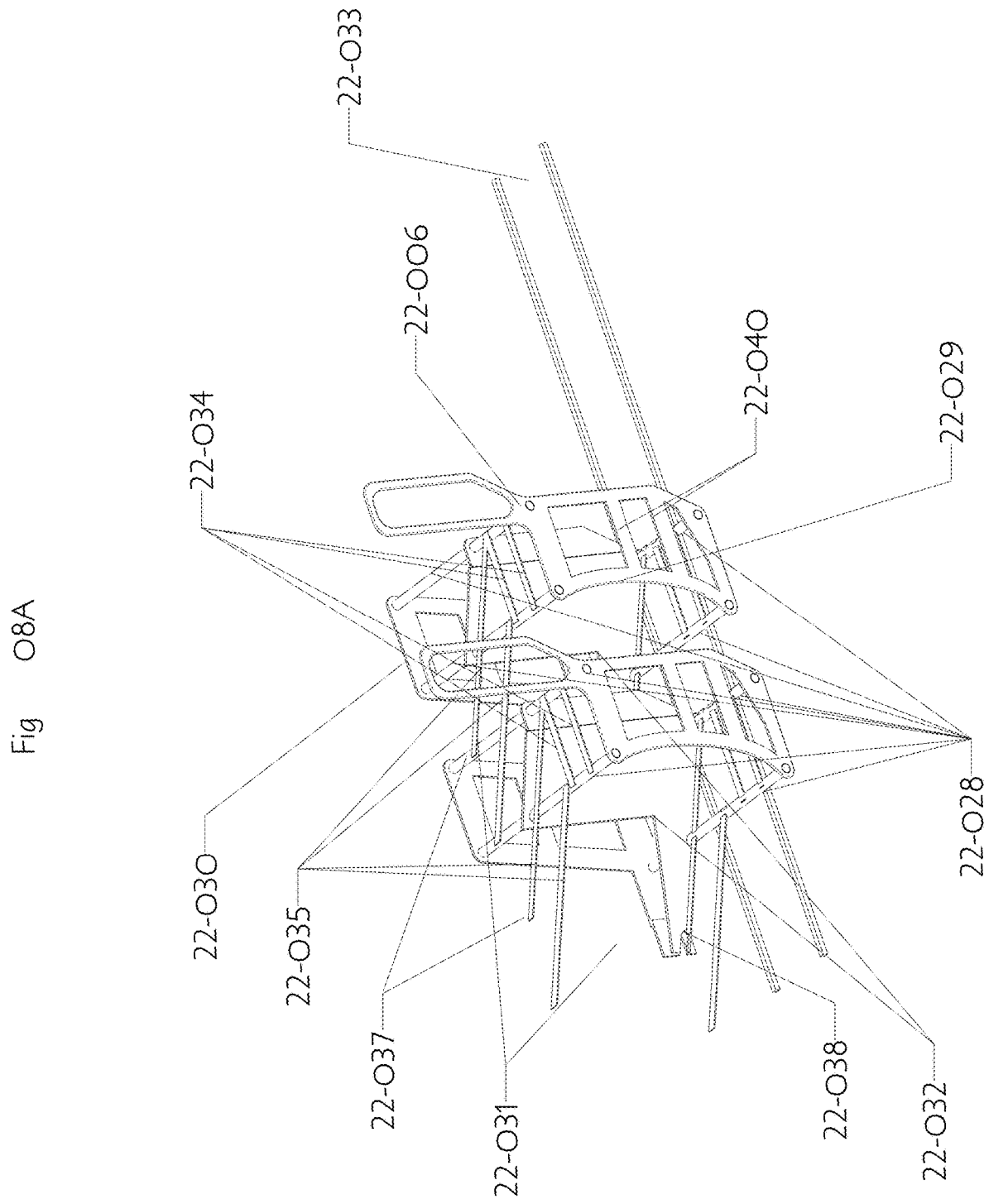

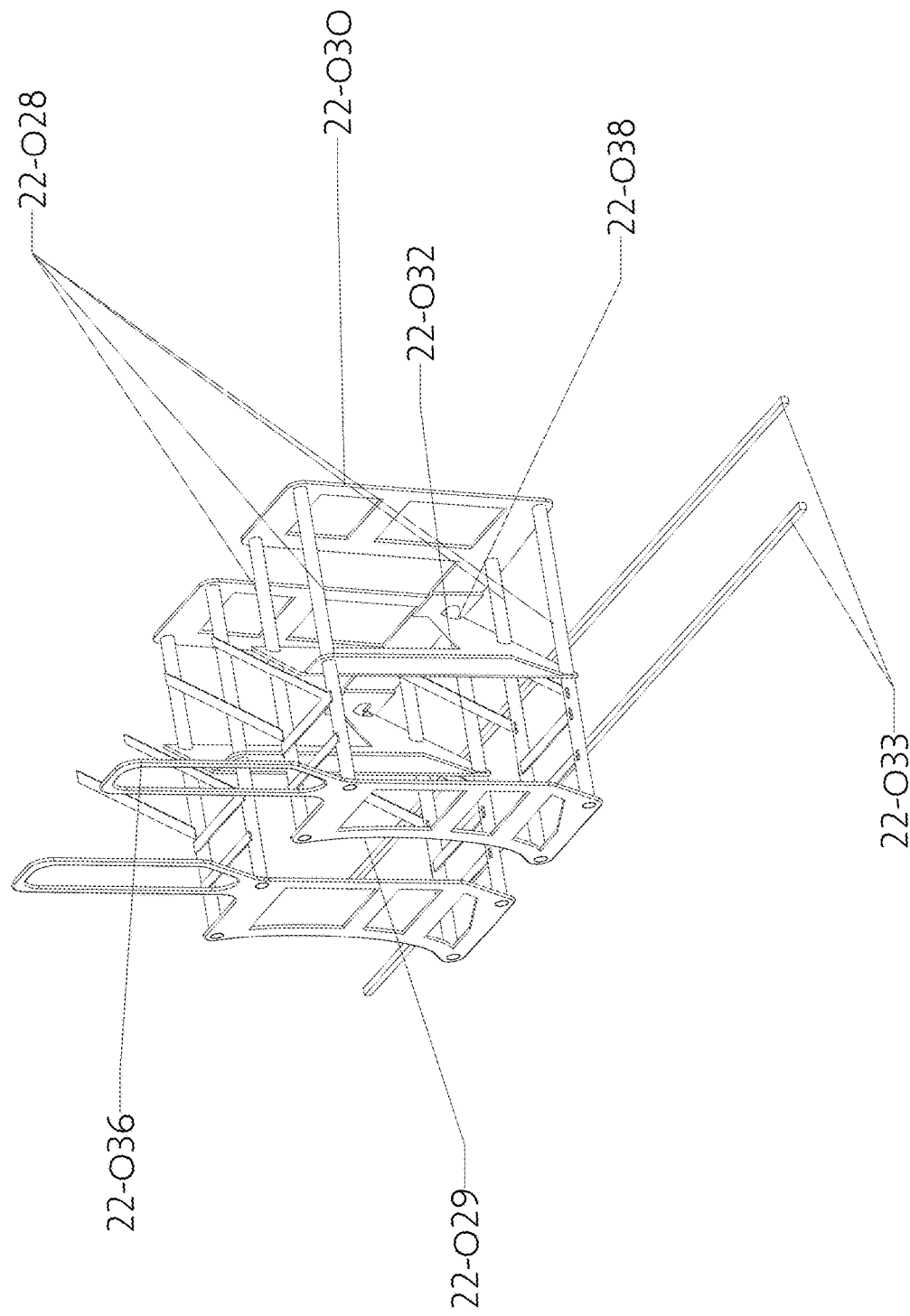

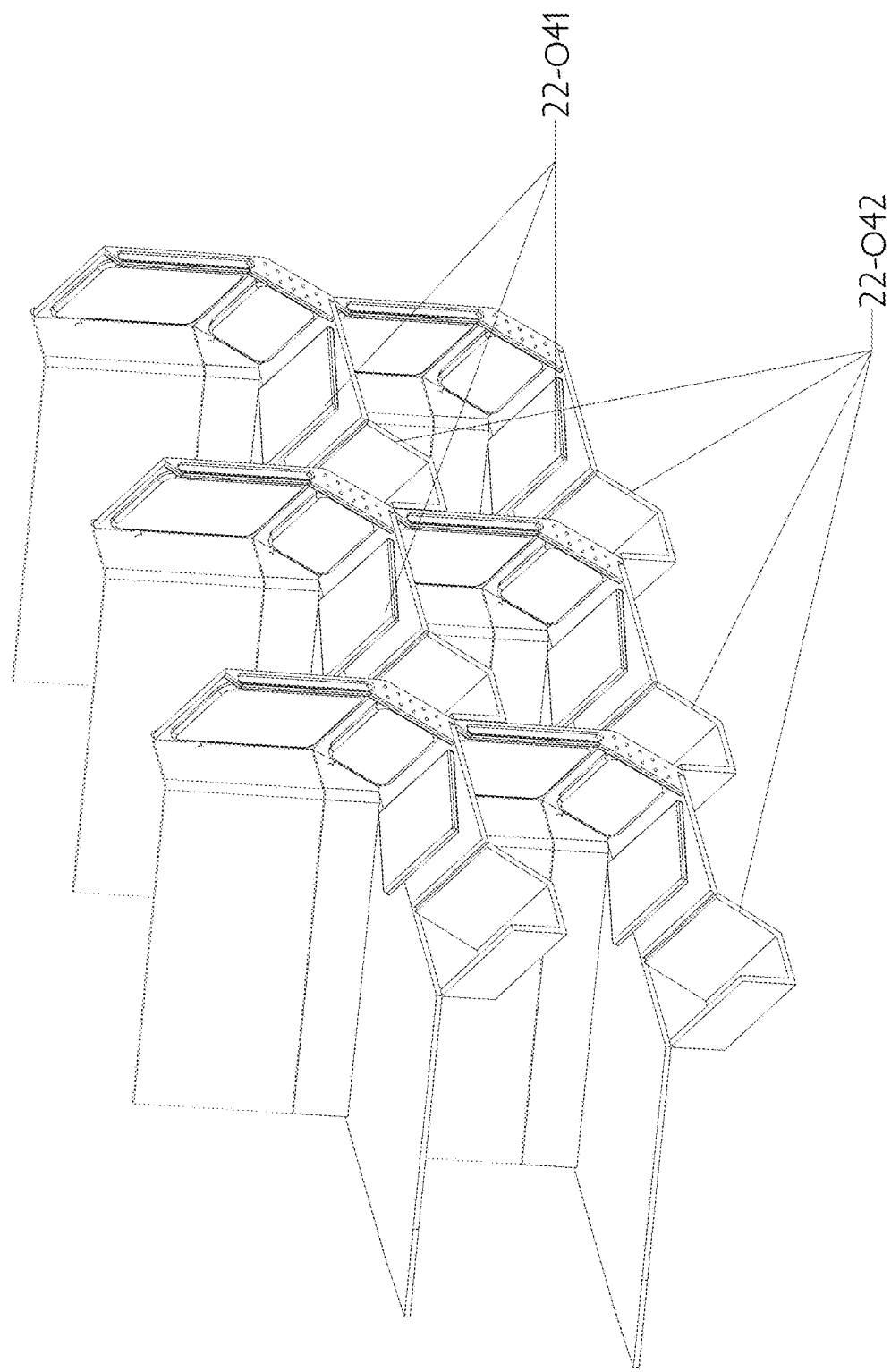

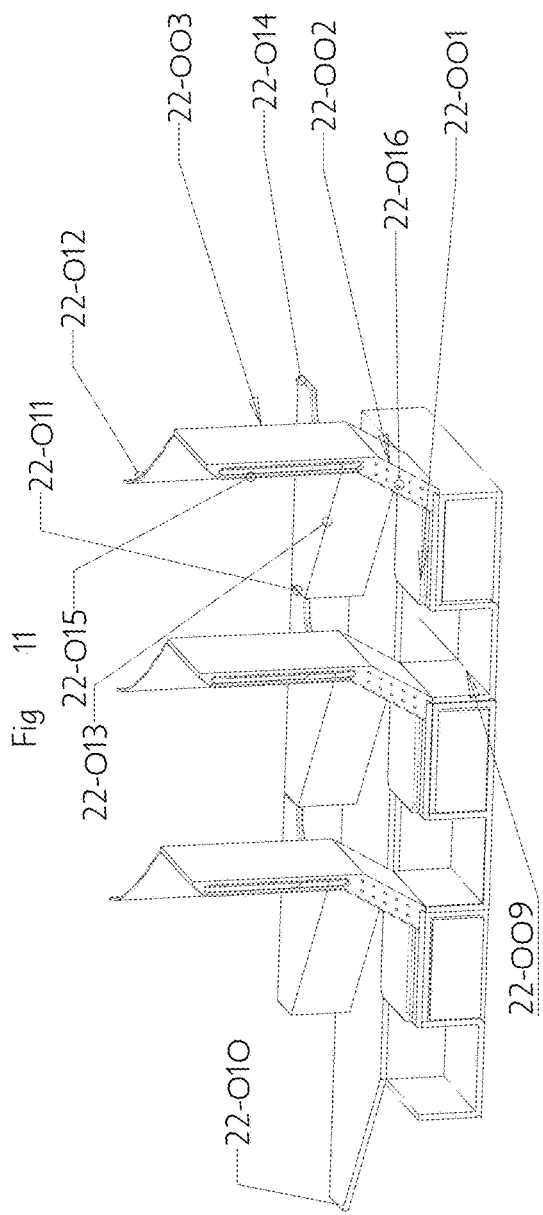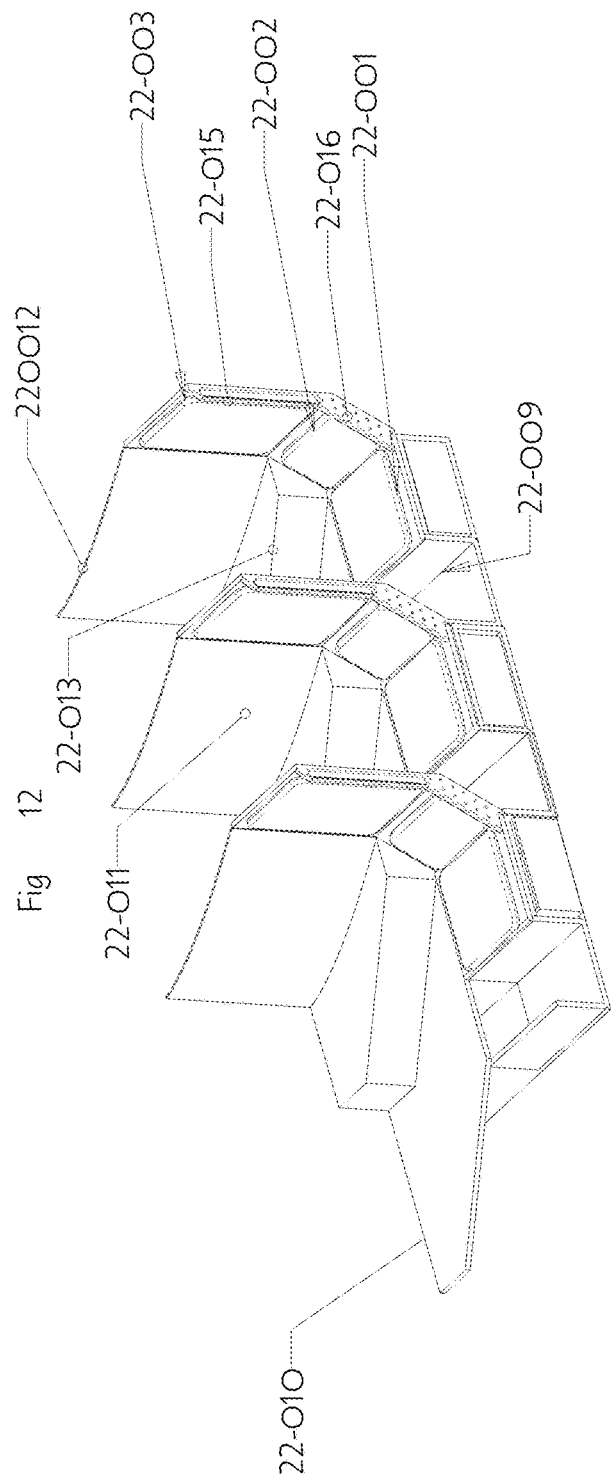

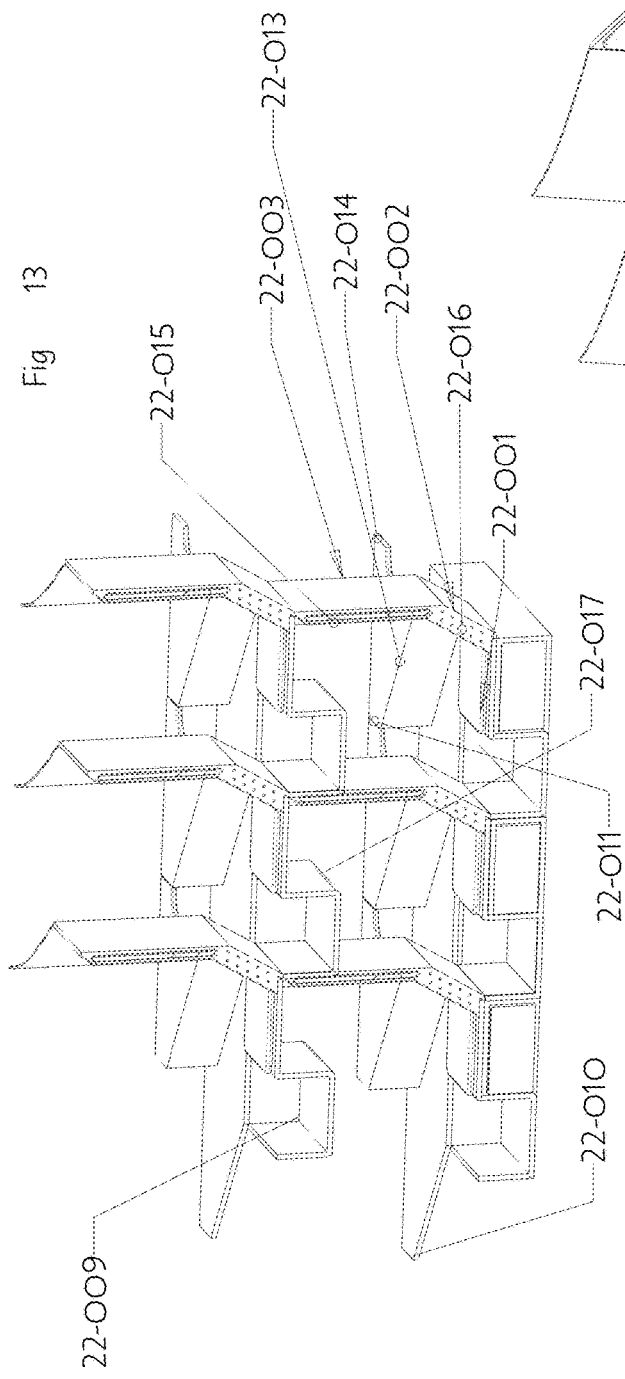
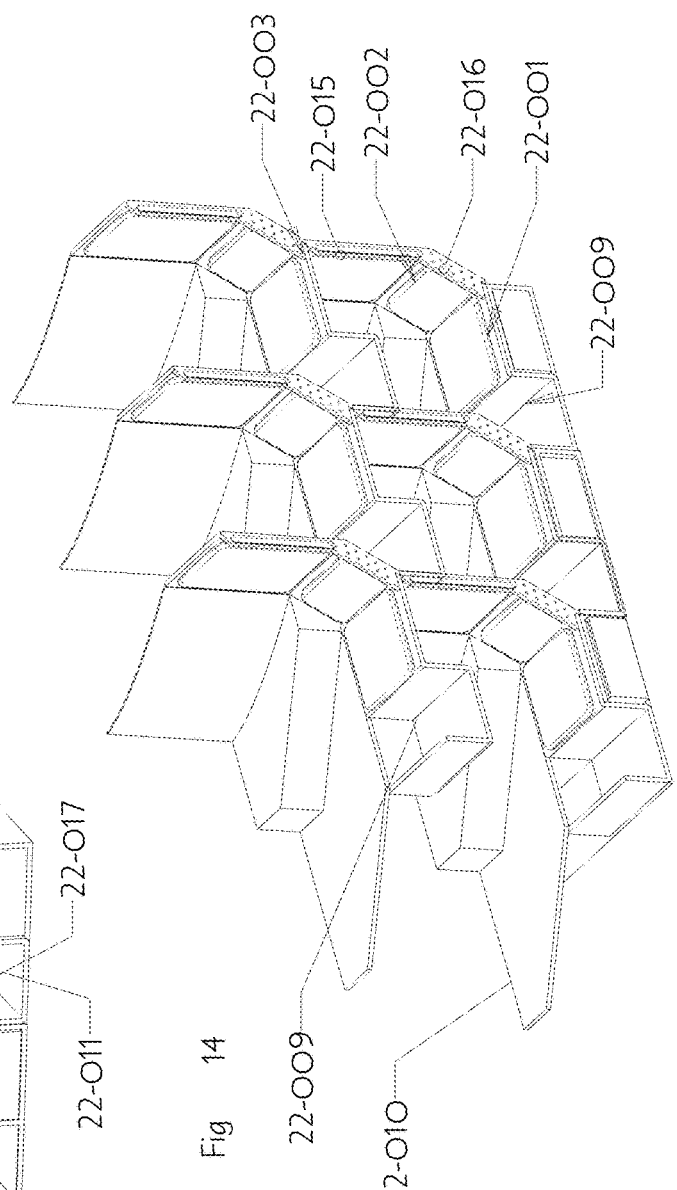
Fig 13
Fig 14

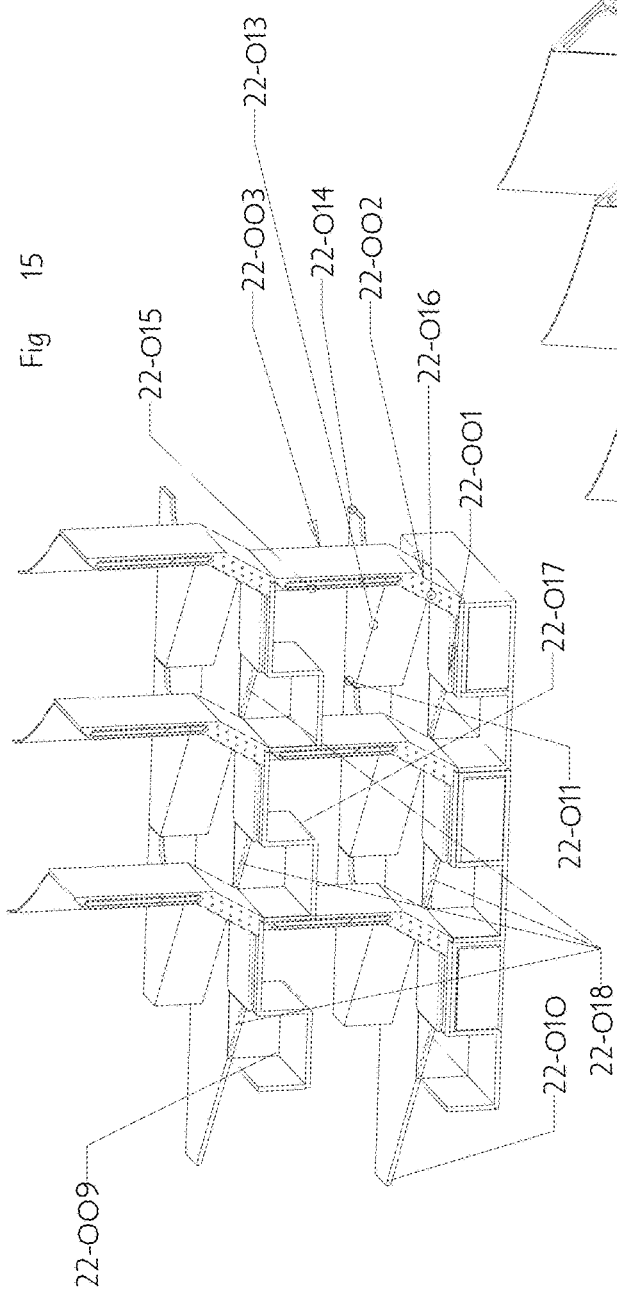
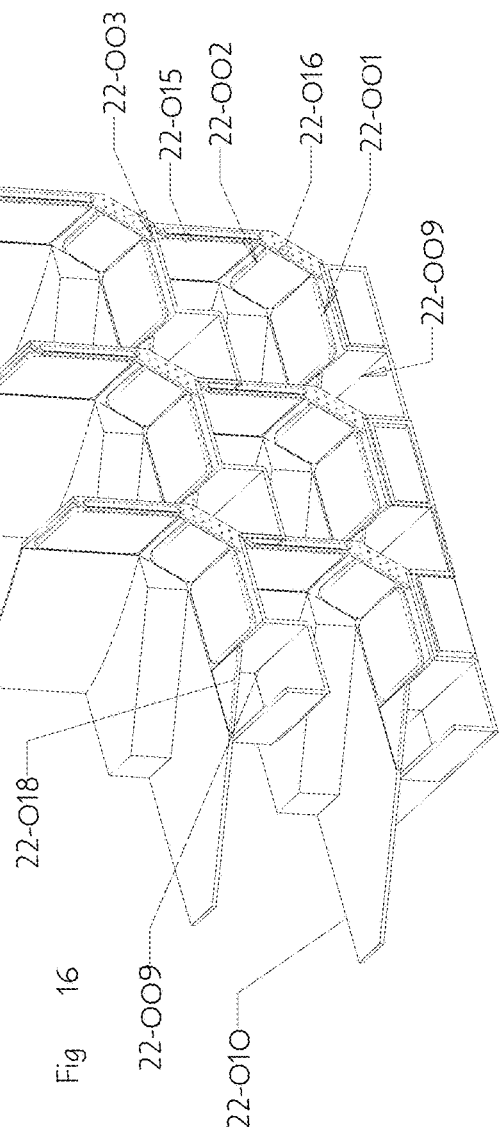
Fig 15
Fig 16

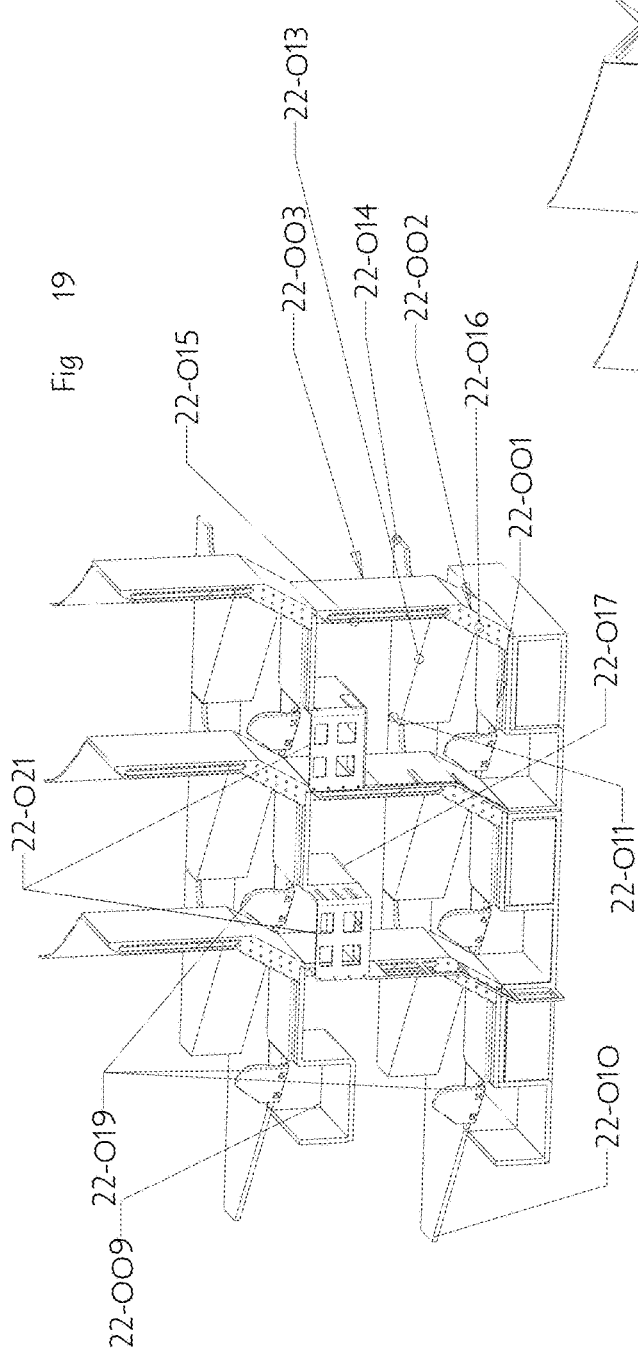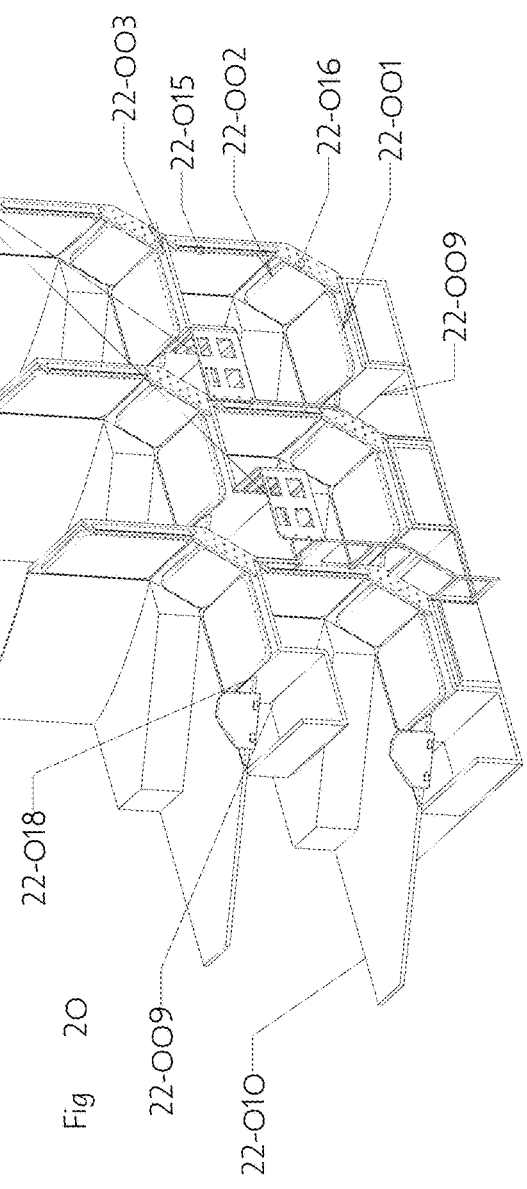

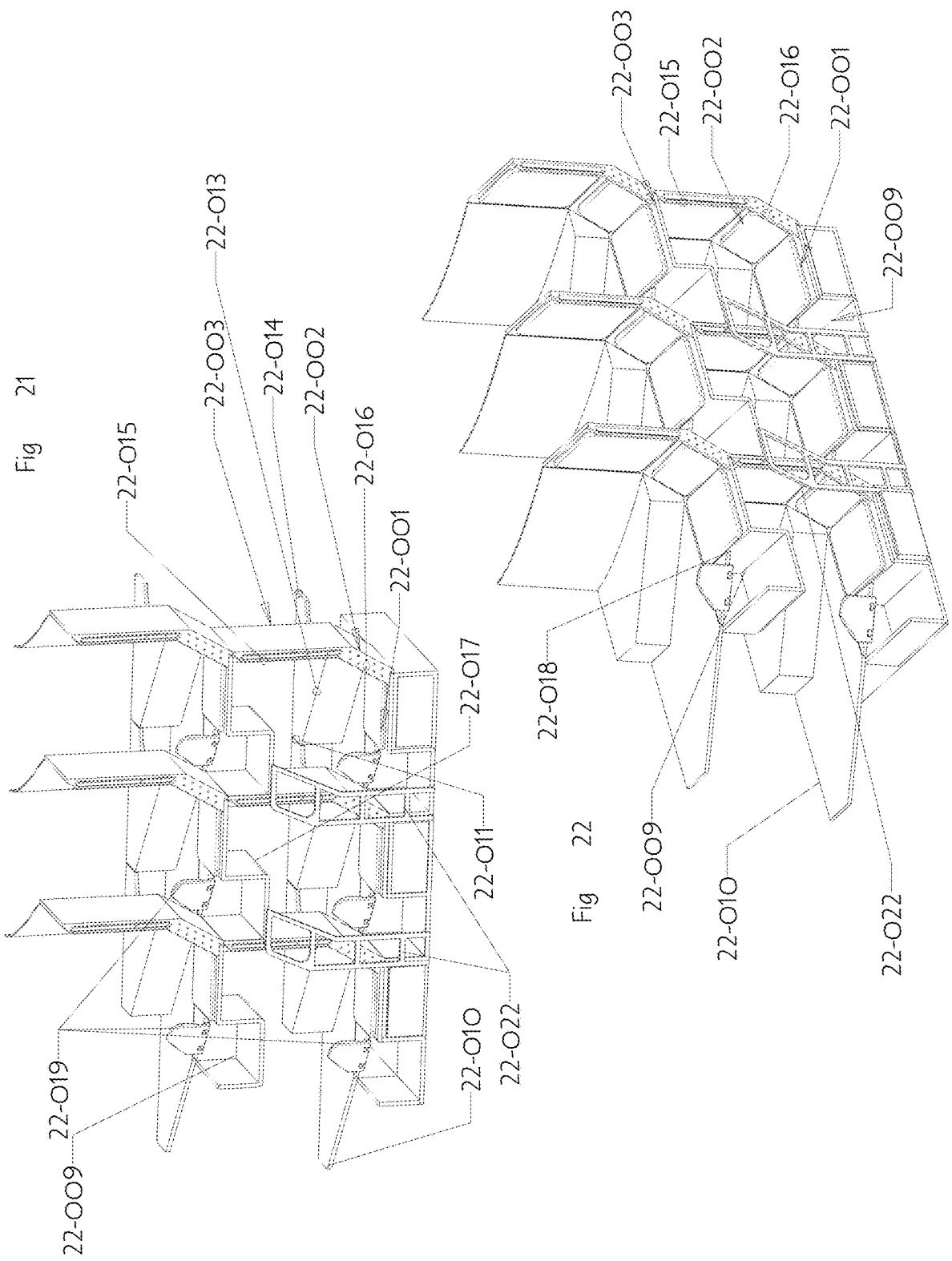

22-O27

22-O27

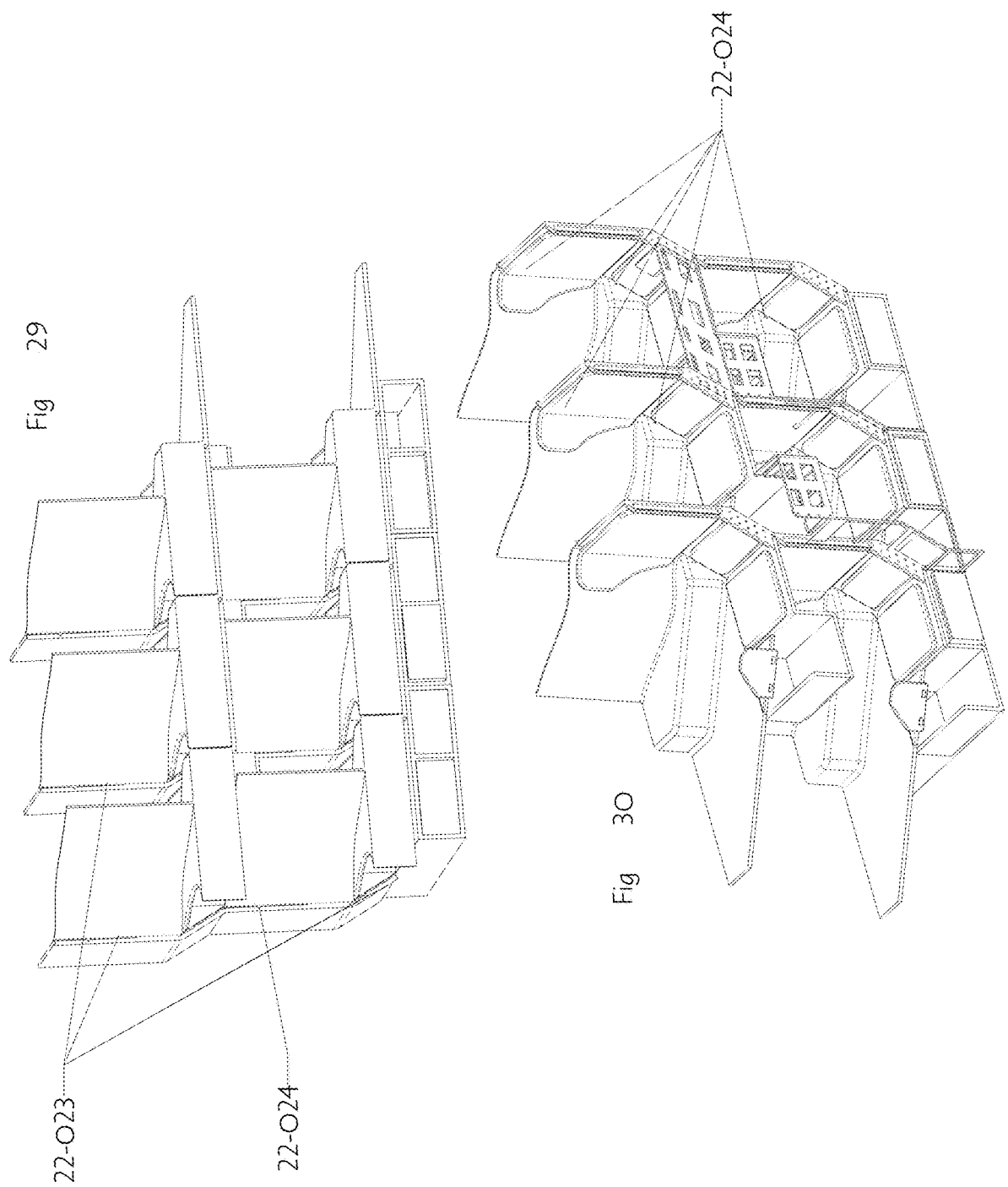

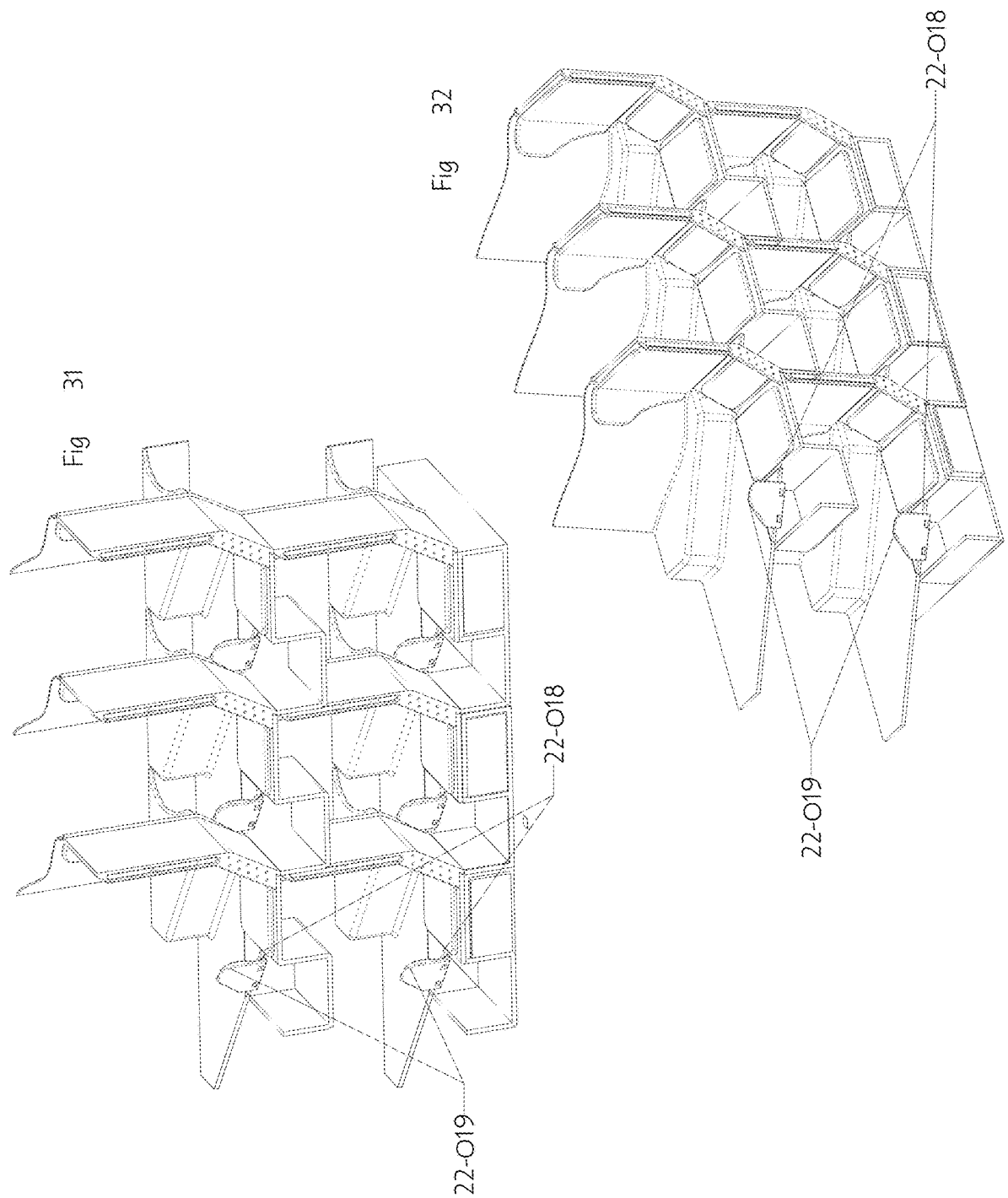

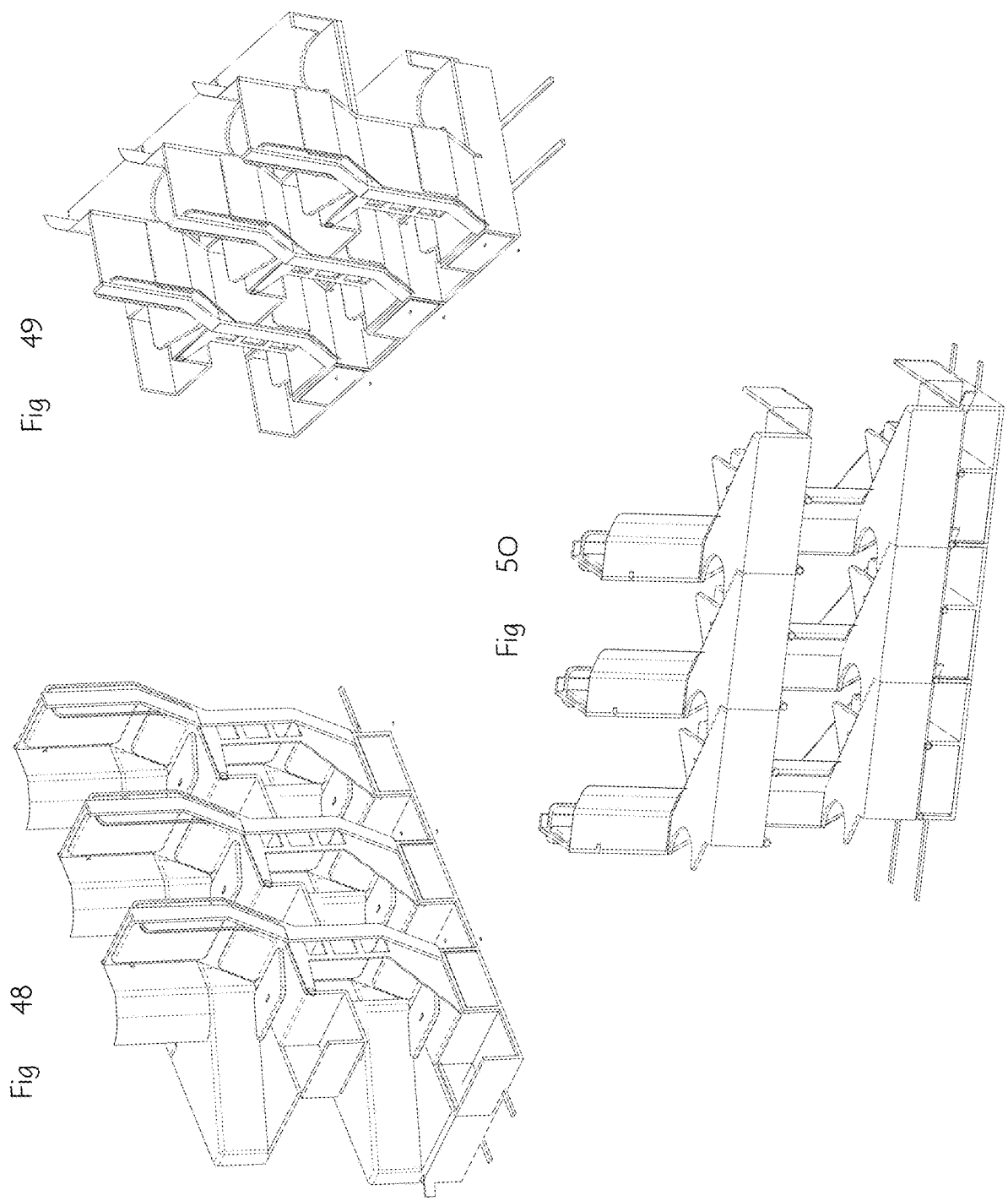

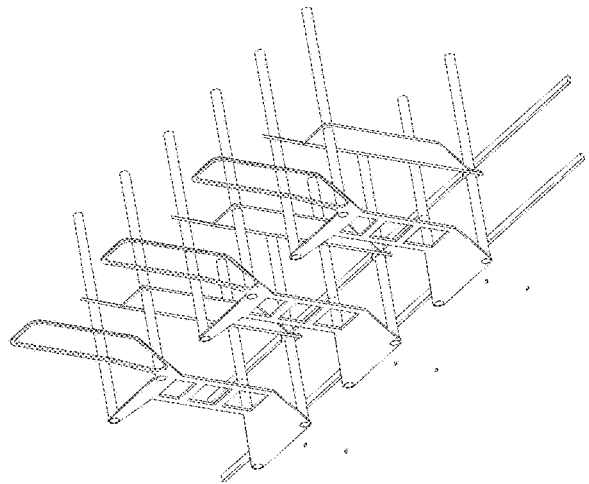
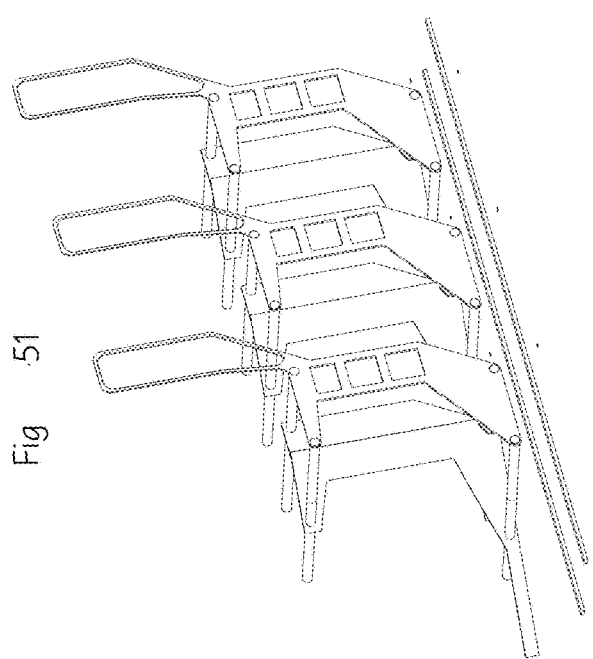
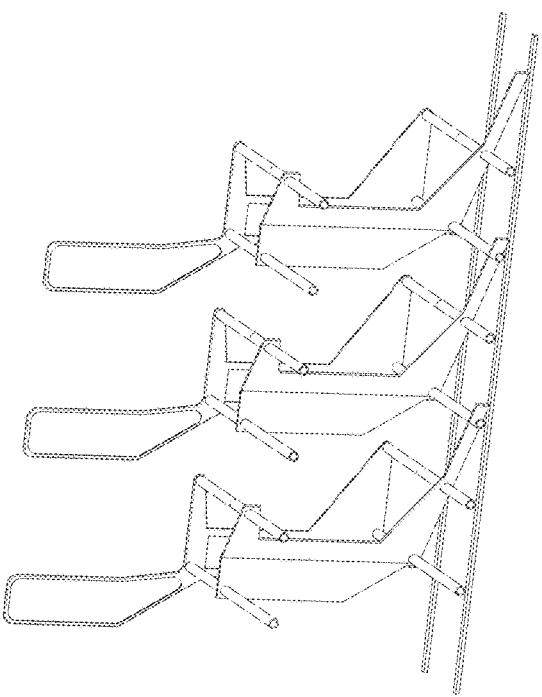

22-O45

22-O45

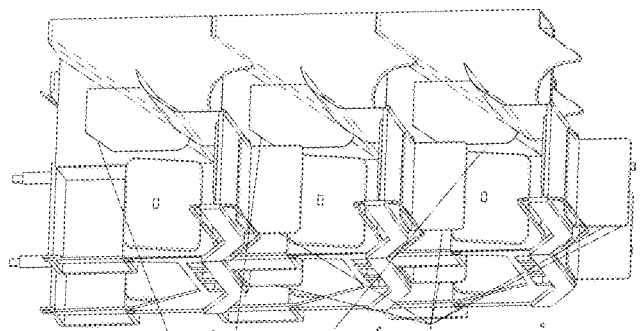
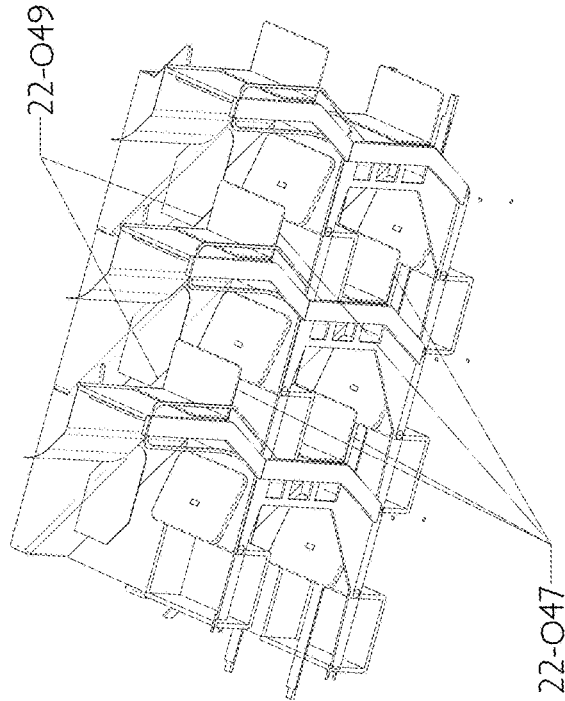
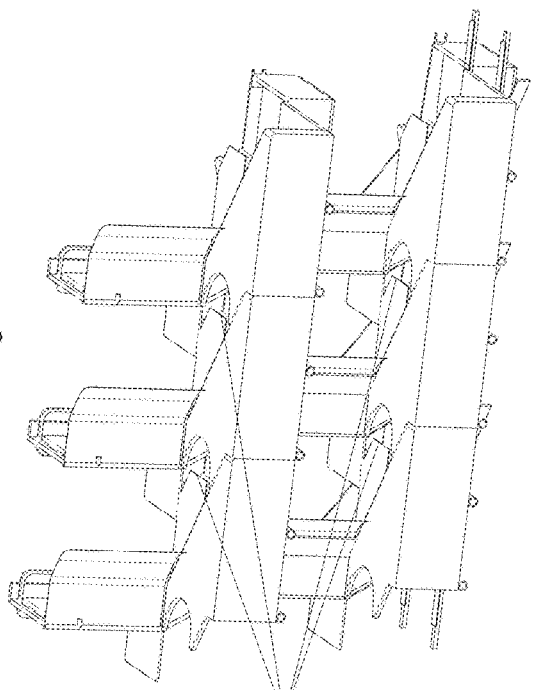

Fig 81
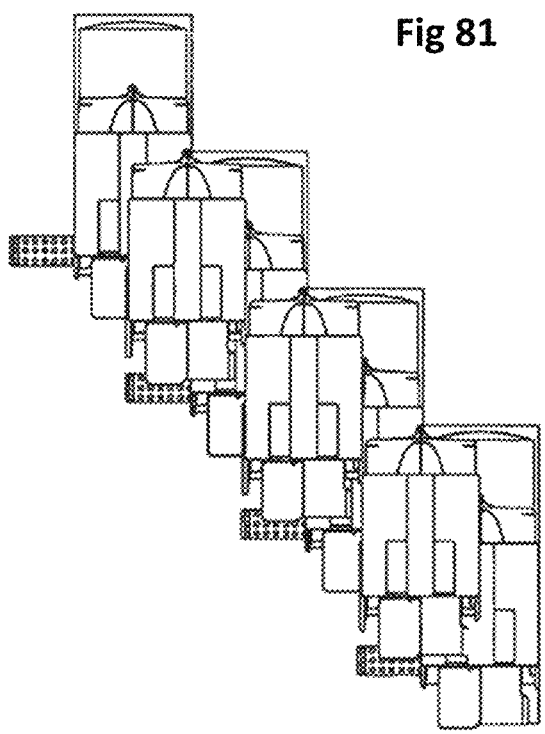
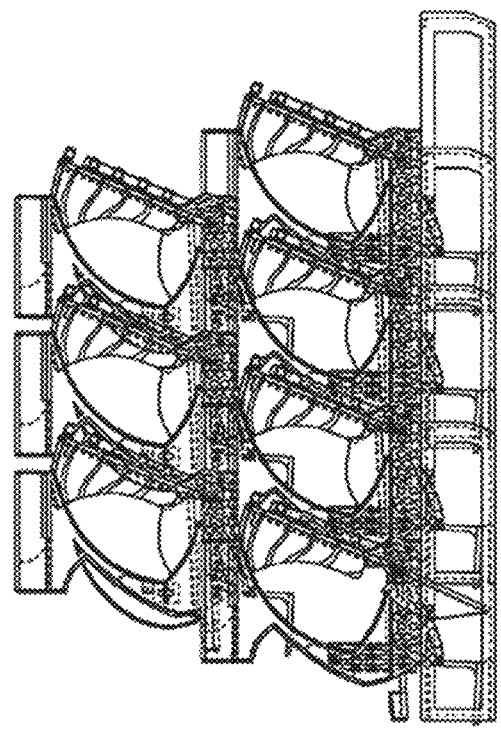
Fig 82
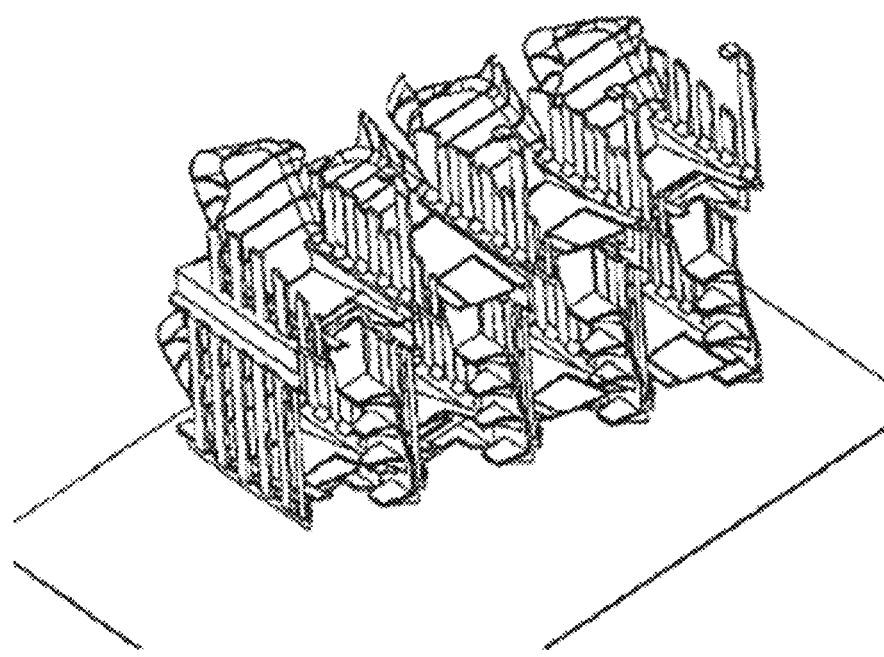

OCCUPANT SUPPORTS AND VIRTUAL VISUALIZATION AND NAVIGATION

RELATED APPLICATIONS PCT

This application hereby claims priority from and incorporates herein by reference in their entirety the following applications.

| Referenced Application | Relationship | Priority and incorporation hereby by reference in their entirety claimed to | Filing date |
|---|---|---|---|
| This application | Claims benefit of provisional | 63/028004 | 2020 May 21 |
| This application | Claims benefit of provisional | 62/971946 | 2020 Feb. 8 |
| This application | Claims benefit of provisional | 63/044598 | 2020 Jun. 26 |
| This application | Continuation in part of | 16/855181 | 2020 Apr. 22 |
| 16/884,479 | Claims benefit of provisional | 63/028004 | 2020 May 21 |
| 16/884,479 | Claims benefit of provisional | 62/971946 | 2020 Feb. 8 |
| 16/884,479 | Continuation in part of | 16/855181 | 2020 Apr. 22 |
| 16/884,479 | Continuation in part of | 16/430061 | 2019 Jun. 3 |
| 16/430061 | Continuation in part of | PCT/US2017/064626 | 2017 Dec. 6 |
| PCT/US2017/064626 | Claims benefit of provisional | 62/430910 | 2016 Dec. 6 |
| PCT/US2017/064626 | Claims benefit of provisional | 62/480071 | 2017 Mar. 31 |
| PCT/US2017/064626 | Continuation in part of | 14/203088 | 2014 Mar. 10 |
| 14/203088 | Continuation in part of | 13/694996 | 2013 Jan. 24 |
| 13/694996 | Continuation in part of | 10/790151 | 2004 Mar. 2 |
| 10/790151 | Claims benefit of provisional | 60/450682 | 2003 Mar. 3 |
| 14/203088 | Continuation in part of | 11/730161 | 2007 Mar. 29 |
| 11/730161 | Claims benefit of provisional | 60/787444 | 2006 Mar. 30 |
| PCT/US2017/064626 | Continuation in part of | 14/708584 | 2015 May 11 |
| 14/708584 | Continuation of | 11/730161 | 2007 Mar. 29 |
| 11/730161 | Claims benefit of provisional | 60/787444 | 2006 Mar. 30 |
| 16/884,479 | Continuation in part of | 16/430061 | 2019 Jun. 3 |
| 16/430061 | Continuation in part of | 16/138998 | 2018 Sep. 22 |
| 16/138998 | Continuation in part of | 15/203882 | 2016 Jul. 7 |
| 15/203882 | Continuation in part of | 14/375673 | 2014 Jul. 30 |
| 14/375673 | a 371 of international | PCT/US2013/000024 | 2013 Jan. 31 |
| PCT/US2013/000024 | Claims benefit of provisional | 61/632797 | 2012 Jan. 31 |
| PCT/US2013/000024 | Claims benefit of provisional | 61/685537 | 2012 Mar. 20 |
| PCT/US2013/000024 | Claims benefit of provisional | 61/686316 | 2012 Apr. 3 |
| PCT/US2013/000024 | Claims benefit of provisional | 61/688591 | 2012 May 17 |
| PCT/US2013/000024 | Claims benefit of provisional | 61/688855 | 2012 May 23 |
| PCT/US2013/000024 | Claims benefit of provisional | 61/744431 | 2012 Sep. 26 |
| PCT/US2013/000024 | Claims benefit of provisional | 61/797175 | 2012 Dec. 1 |
| PCT/US2013/000024 | Claims benefit of provisional | 61/797639 | 2012 Dec. 12 |
| PCT/US2013/000024 | Claims benefit of provisional | 61/848724 | 2013 Jan. 10 |
| 16/884,479 | Continuation in part of | 16/430061 | 2019 Jun. 3 |
| 16/430061 | Continuation in part of | 16/138998 | 2018 Sep. 22 |
| 16/138998 | Continuation in part of | 15/872108 | 2018 Jan. 16 |
| 15/872108 | Continuation in part of | 15/143168 | 2016 Apr. 29 |
| 15/143168 | Continuation in part of | 13/820510 | 2013 Mar. 2 |
| 13/820510 | a 371 of international | PCT/US2011/001547 | 2011 Sep. 6 |
| PCT/US2011/001547 | Claims benefit of provisional | 61/402751 | 2010 Sep. 3 |
| PCT/US2011/001547 | Claims benefit of provisional | 61/404335 | 2010 Oct. 1 |
| PCT/US2011/001547 | Claims benefit of provisional | 61/458997 | 2010 Dec. 3 |
| PCT/US2011/001547 | Claims benefit of provisional | 61/459689 | 2010 Dec. 16 |
| PCT/US2011/001547 | Claims benefit of provisional | 61/460266 | 2010 Dec. 29 |
| PCT/US2011/001547 | Claims benefit of provisional | 61/465160 | 2011 Mar. 15 |
| 16/884,479 | Continuation in part of | 16/430061 | 2019 Jun. 3 |
| 16/430061 | Continuation in part of | 16/138998 | 2018 Sep. 22 |
| 16/138998 | Continuation in part of | 15/143168 | 2016 Apr. 29 |
| 15/143168 | Continuation in part of | 14/461395 | 2014 Aug. 16 |
| 14/461395 | Continuation of | 12/451317 | 2009 Nov. 6 |
| 12/451317 | a 371 of international | PCT/US2008/005810 | 2008 May 7 |
| PCT/US2008/005810 | Claims benefit of provisional | 60/928040 | 2007 May 7 |
| PCT/US2008/005810 | Claims benefit of provisional | 60/962077 | 2007 Jul. 26 |
| PCT/US2008/005810 | Claims benefit of provisional | 60/960067 | 2007 Sep. 13 |
| PCT/US2008/005810 | Claims benefit of provisional | 60/960620 | 2007 Oct. 5 |
| PCT/US2008/005810 | Claims benefit of provisional | 61/006074 | 2007 Dec. 17 |
| 16/884,479 | Continuation in part of | 16/430061 | 2019 Jun. 3 |
| 16/430061 | Continuation in part of | 16/138998 | 2018 Sep. 22 |
| 16/138998 | Continuation in part of | 15/143168 | 2016 Apr. 29 |
| 15/143168 | Continuation in part of | 14/210413 | 2014 Mar. 13 |
| 14/210413 | Continuation of | 12/735146 | 2010 Jun. 17 |
| 12/735146 | a 371 of international | PCT/US2009/000342 | 2009 Jan. 21 |
| PCT/US2009/000342 | Claims benefit of provisional | 61/062002 | 2008 Jan. 23 |
| PCT/US2009/000342 | Claims benefit of provisional | 61/066372 | 2008 Feb. 20 |
| PCT/US2009/000342 | Claims benefit of provisional | 61/072241 | 2008 Mar. 28 |

-continued

| Referenced Application | Relationship | Priority and incorporation hereby by reference in their entirety claimed to | Filing date |
|---|---|---|---|
| PCT/US2009/000342 | Claims benefit of provisional | 61/072495 | 2008 Mar. 31 |
| PCT/US2009/000342 | Claims benefit of provisional | 61/123345 | 2008 Apr. 8 |
| PCT/US2009/000342 | Claims benefit of provisional | 61/188175 | 2008 Aug. 7 |
| PCT/US2009/000342 | Claims benefit of provisional | 61/191309 | 2008 Sep. 8 |
| PCT/US2009/000342 | Claims benefit of provisional | 61/198541 | 2008 Nov. 6 |
| 16/884,479 | Continuation in part of | 16/430061 | 2019 Jun. 3 |
| 16/430061 | Continuation in part of | 16/138998 | 2018 Sep. 22 |
| 16/138998 | Continuation in part of | 15/143168 | 2016 Apr. 29 |
| 15/143168 | Continuation in part of | 14/848575 | 2015 Sep. 9 |
| 14/848575 | Continuation in part of | 13/138183 | 2011 Jul. 18 |
| This application is | Continuation in part of | 16/430061 | 2019 Jun. 3 |
| 16/430061 | Continuation in part of | 16/138998 | 2018 Sep. 22 |
| 16/138998 | Continuation in part of | 15/203882 | 2016 Jul. 7 |
| 15/203882 | Continuation in part of | 14/210413 | 2014 Mar. 13 |
| 14/210413 | Continuation of | 12/735146 | 2010 Jun. 17 |
| 12/735146 | a 371 of international | PCT/US2009/000342 | 2009 Jan. 21 |
| PCT/US2009/000342 | Claims benefit of provisional | 61/062002 | 2008 Jan. 23 |
| PCT/US2009/000342 | Claims benefit of provisional | 61/066372 | 2008 Feb. 20 |
| PCT/US2009/000342 | Claims benefit of provisional | 61/072241 | 2008 Mar. 28 |
| PCT/US2009/000342 | Claims benefit of provisional | 61/072495 | 2008 Mar. 31 |
| PCT/US2009/000342 | Claims benefit of provisional | 61/123345 | 2008 Apr. 8 |
| PCT/US2009/000342 | Claims benefit of provisional | 61/188175 | 2008 Aug. 7 |
| PCT/US2009/000342 | Claims benefit of provisional | 61/191309 | 2008 Sep. 8 |
| PCT/US2009/000342 | Claims benefit of provisional | 61/198541 | 2008 Nov. 6 |
| 16/884,479 | Continuation in part of | 16/430061 | 2019 Jun. 3 |
| 16/430061 | Continuation in part of | 16/138998 | 2018 Sep. 22 |
| 16/138998 | Continuation in part of | 15/872108 | 2018 Jan. 16 |
| 15/872108 | Continuation in part of | 14/903573 | 2016 Jan. 7 |
| 14/903573 | a 371 of international | PCT/US2014/045727 | 2014 Jul. 8 |
| PCT/US2014/045727 | Claims benefit of provisional | 61/957635 | 2013 Jul. 8 |
| PCT/US2014/045727 | Claims benefit of provisional | 61/959598 | 2013 Aug. 28 |
| PCT/US2014/045727 | Claims benefit of provisional | 61/961092 | 2013 Oct. 4 |
| PCT/US2014/045727 | Claims benefit of provisional | 61/961367 | 2013 Oct. 12 |
| 16/884,479 | Continuation in part of | 16/430061 | 2019 Jun. 3 |
| 16/430061 | Continuation in part of | 16/138998 | 2018 Sep. 22 |
| 16/138998 | Continuation in part of | 15/872108 | 2018 Jan. 16 |
| 15/872108 | Continuation in part of | 15/203882 | 2016 Jul. 7 |
| 15/203882 | Continuation in part of | 14/375673 | 2014 Jul. 30 |
| 15/203882 | Continuation in part of | 14/852593 | 2015 Sep. 13 |
| 14/852593 | Continuation in part of | 13/138183 | 2011 Jul. 18 |
| 13/507149 | Continuation in part of | 13/138183 | 2011 Jul. 18 |
| 13/138183 | a 371 of international | PCT/US2010/000237 | 2010 Jan. 28 |
| PCT/US2010/000237 | Claims benefit of provisional | 61/206205 | 2009 Jan. 26 |
| PCT/US2010/000237 | Claims benefit of provisional | 61/208445 | 2009 Feb. 24 |
| PCT/US2010/000237 | Claims benefit of provisional | 61/211191 | 2009 Mar. 27 |
| PCT/US2010/000237 | Claims benefit of provisional | 61/214672 | 2009 Apr. 27 |
| PCT/US2010/000237 | Claims benefit of provisional | 61/215559 | 2009 May 7 |
| PCT/US2010/000237 | Claims benefit of provisional | 61/270808 | 2009 Jul. 14 |
| PCT/US2010/000237 | Claims benefit of provisional | 61/276298 | 2009 Sep. 9 |
| 16/884,479 | Continuation in part of | 16/430061 | 2019 Jun. 3 |
| 16/430061 | Continuation in part of | 16/138998 | 2018 Sep. 22 |
| 16/138998 | Continuation in part of | 15/878488 | 2018 Jan. 24 |
| 15/878488 | Continuation in part of | 14/726170 | 2015 May 29 |
| 14/726170 | Continuation in part of | 13/507149 | 2012 Jun. 9 |
| 13/507149 | Continuation in part of | 11/639088 | 2006 Dec. 14 |
| 16/884,479 | Continuation in part of | 16/430061 | 2019 Jun. 3 |
| 16/430061 | Continuation in part of | 16/138998 | 2018 Sep. 22 |
| 16/138998 | Continuation in part of | 15/878488 | 2018 Jan. 24 |
| 15/878488 | Continuation in part of | 14/600932 | 2015 Jan. 20 |
| 14/600932 | Continuation in part of | 13/507149 | 2012 Jun. 9 |
| 13/507149 | Continuation in part of | 11/639088 | 2006 Dec. 14 |
| 11/639088 | Claims benefit of provisional | 60/751305 | 2005 Dec. 19 |
| 11/639088 | Claims benefit of provisional | 60/848804 | 2006 Sep. 29 |
| 11/639088 | Claims benefit of provisional | 60/849685 | 2006 Oct. 5 |
| PCT/US10/000237 | Continuation in part of | 11/639088 | 2006 Dec. 14 |
| 16/884,479 | Continuation in part of | 16/430061 | 2019 Jun. 3 |
| 16/430061 | Continuation in part of | 15/878488 | 2018 Jan. 24 |
| 16/884,479 | Continuation in part of | 16/430061 | 2019 Jun. 3 |
| 16/430061 | Continuation in part of | 15/872108 | 2018 Jan. 16 |
| 16/884,479 | Continuation in part of | 16/430061 | 2019 Jun. 3 |
| 16/430061 | Continuation in part of | 15/203882 | 2016 Jul. 7 |
| 16/884,479 | Continuation in part of | 16/430061 | 2019 Jun. 3 |
| 16/430061 | Continuation in part of | 15/143168 | 2016 Apr. 29 |

FIELD OF INVENTION

The present inventions provide a new structure and passenger transport paradigm for accommodating passengers in a vehicle with particular attention paid to safety, utility and comfort and virtual navigation in real spaces.

SUMMARY

The Drawings illustrate embodiments of the inventions. These features and more are described below. The invention relates to the referenced filed applications.

BRIEF DESCRIPTION OF DRAWINGS 22-001—Seat bottom
22-002—Lumbar support
22-003—seat back
22-004—Flat bed surface
22-005—Flat bed separator wall/shroud (adjoining flat bed surface)
22-006—Foot-frame
22-007—Baggage drawer—Main
22-008—Secondary Drawer
22-009—Foot well
22-010—Flat bed
22-011—Flat bed housing (cover over flat bed that can also form a table top)
22-012—Separator wall/shroud (separating occupant spaces or pods)
22-013—Side Table top
22-014—Front table top
22-015—Handle
22-016—Support studs/holes (for some retracting ladders)
22-017—Passive aircushion (some embodiments). Some embodiments have a screen. Some embodiments have both with swing up screen.
22-018—Extension support
22-019—Shoulder stop
22-020—Retractable ladder with full length safety wall
22-021—Ladder with foot well safety wall
22-022—Fixed or folding Ladder
22-023—Air ducting.
22-024—Air Vent positions—vents not shown.
22-025—Latches
22-026—Wrap around seat back cushion.
22-027—Sliding ladder
22-028—Structural tubes—lateral members
22-029—Structural plate 1
22-030—Structural plate 2
22-031—structural plate 3
22-032—Structural plate 3A
22-033—seat tracks
22-034—Seat support elements
22-035—Sleeper support elements
22-036—Structural handle support
22-037—Notch for slidable fit of Structural plate 3 to adjoining single stack structure tube set—upper tube
22-038—Notch for slidable fit of Structural plate 3, 3A to adjoining single stack structure tube set—lower tube
22-039—Displaced Notch for slidable fit of Structural plate 2 to adjoining single stack structure tube set—lower tube
22-040—structural rungs for ladder.
22-041—Seat bottom adjustable angle
22-042—Angled wall foot well
22-043—Notch for slidable fit of Structural plate 1 to adjoining single stack structure tube set—lower tube
22-044—Notch for slidable fit of Structural plate 1 to adjoining single stack structure tube set—upper tube
22-045—Latch support—2 tube
22-046—Latch support single tube
22-047—Table Top—Front Folding
22-048—Table Top Side—retracting forward
22-049—Table Top Side—Retracting laterally
22-050—Detachable Automotive Child seat latch brace, attached through the shroud to the Plate3 or 3A
22-051—Latch attachments for automotive or other child seat.
22-052—Attachment points to Plate3 or 3A through shroud.

FIG. 01 shows a single occupant support installed in the cabin. This embodiment uses foot frames 22-009 to elevate seat height from the floor of the cabin. Foot frames and their seat track attachments are disclosed in prior patents of the applicant. The figure also shows optional drawers including a drawer below the seat bottom 22-007 for the storage of baggage. It also shows a secondary drawer 22-008 that may be placed at the back of the foot well. Some embodiments may not use a foot frame but rather attached the seat bottom directly to the floor of the vehicle with latches.

The figure shows the seat bottom 22-001, the lumbar support 22-002, the seatback 22-003, a flatbed surface 22-010, a separator wall or shroud between occupant supports 22-012, and several other parts as illustrated.

FIG. 03 shows the same three occupant supports in contiguous positions at the lower tier level with in addition have three seats at the upper level.

FIG. 03A shows the assembly of 22-03 from a different viewing angle.

FIG. 04 shows the assembly of 22-03A, for an embodiment without a flatbed housing 22-011, thereby providing an open space in front of the occupant over the flatbed but sacrificing tabletop space for the use of the occupant.

Figure 1:
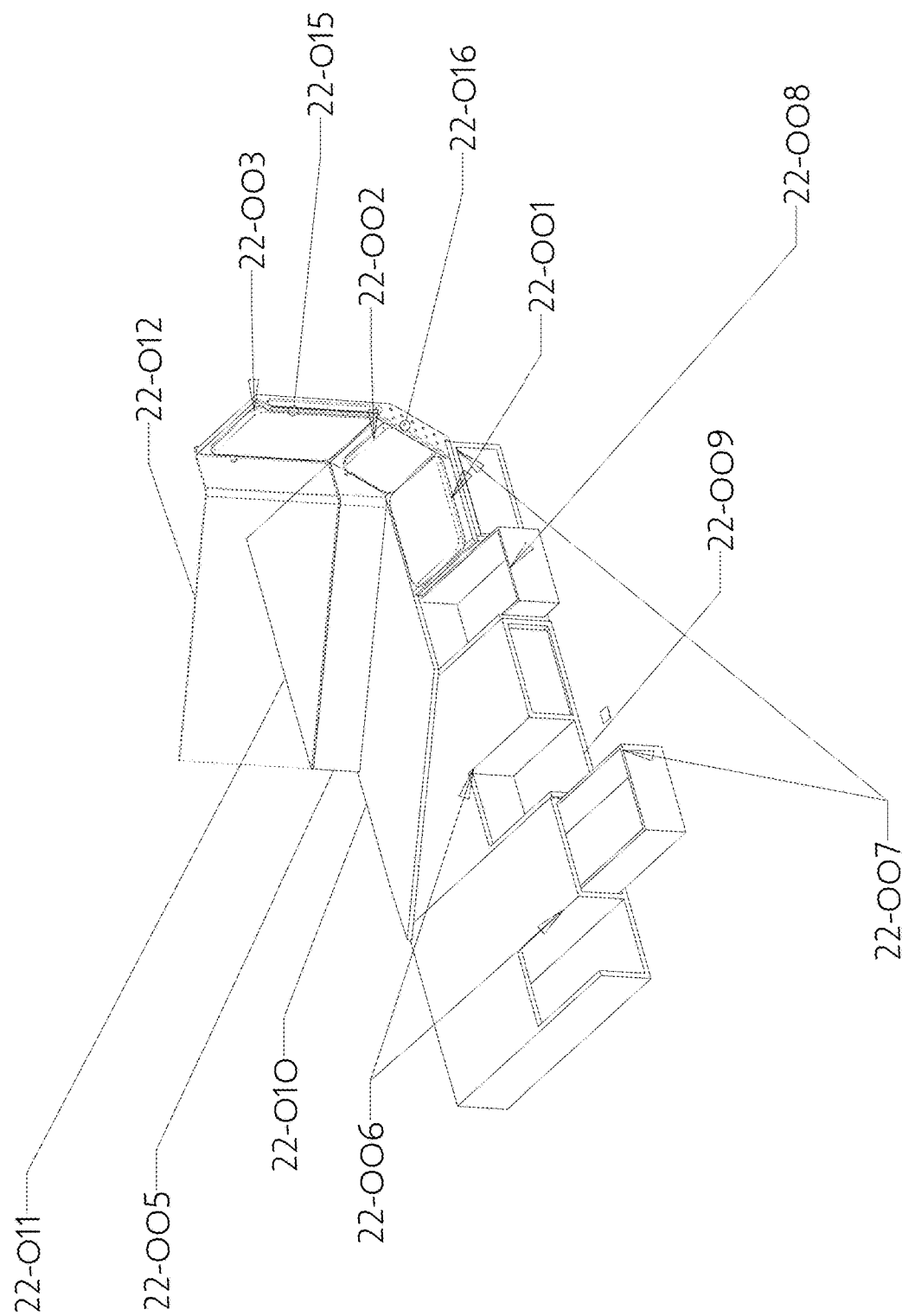
Figure 2:
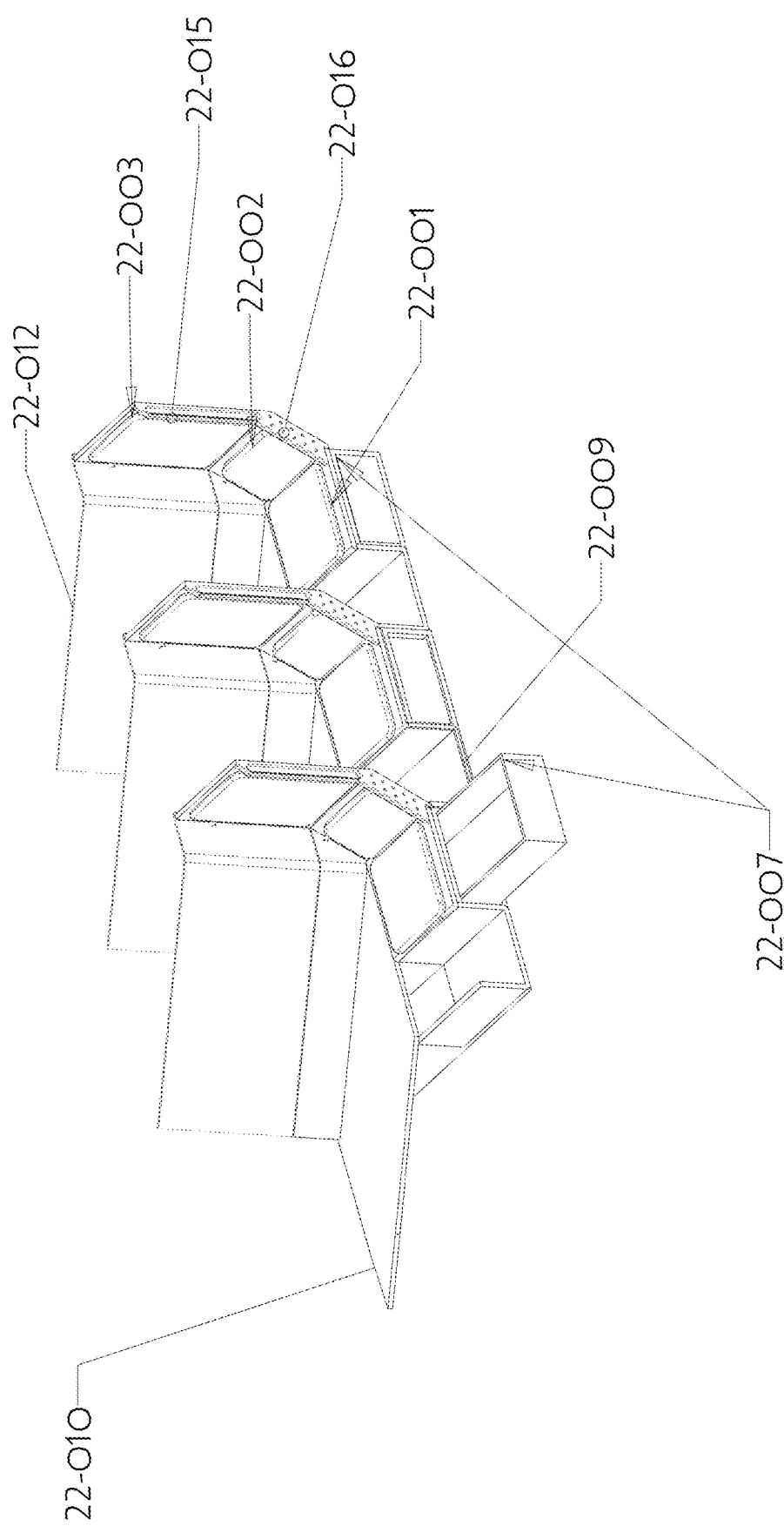
FIG. 02 shows three occupant supports in contiguous positions to illustrate nesting of multiple occupant supports at the lower tier level.
Figure 5B:
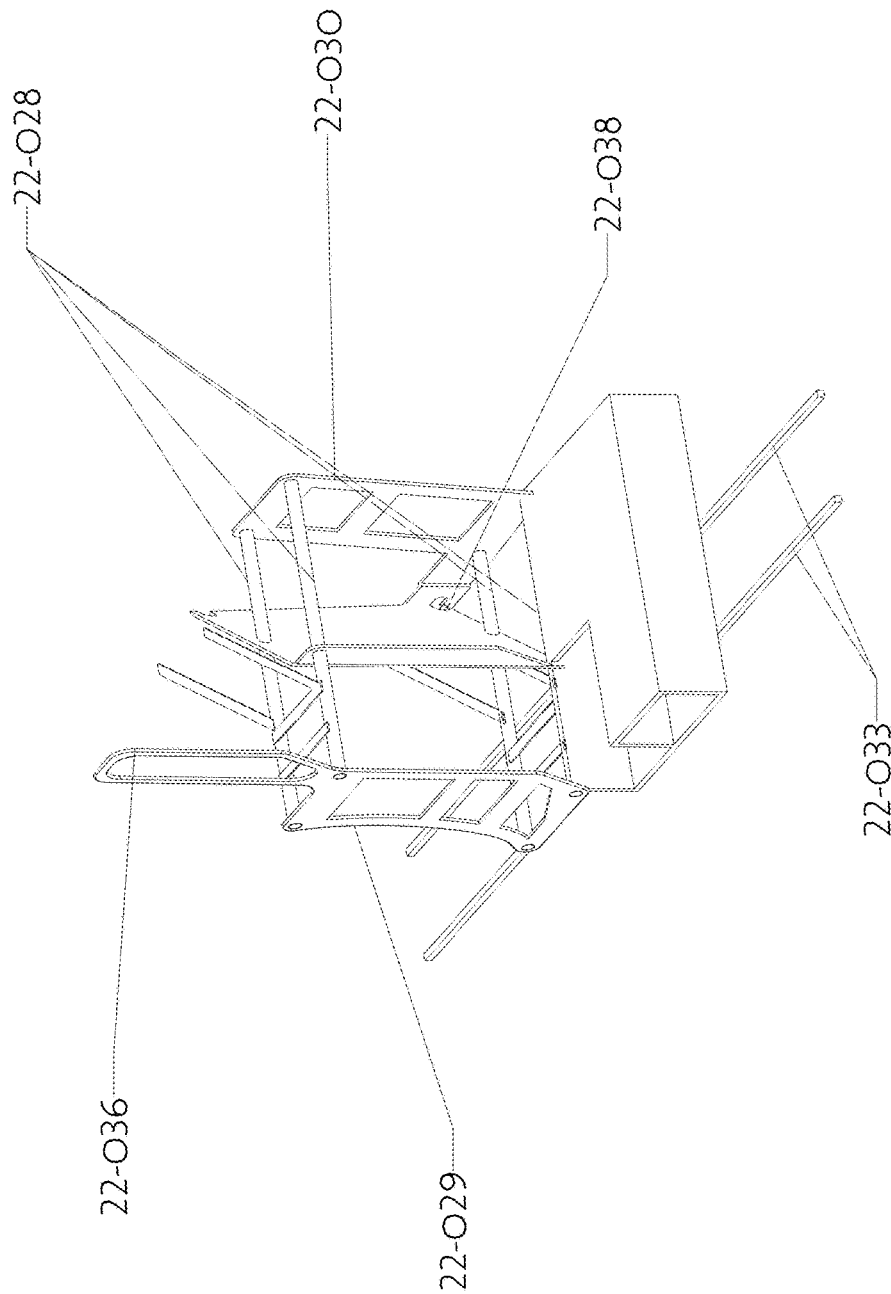

FIGS. 05A, B and C, show an embodiment of the structural support for a single stack of AirSleeper (the single stack structure) occupant supports. The embodiment shown is attached at the top of foot frames which are attached to seat tracks as disclosed in prior disclosures of the applicant. The single stack structure in some embodiments include structural tubes 22-028, structural plates 22-029, 22-030 and 22-031 (or 22-032 not shown). They also include structural support for handles for the occupant. One of many possible positions and shapes of handle support embodiments is shown.

Structural plate 22-030 is optional for a lower weight solution with some compromise in structural strength.

Seat support elements 22-034 are attached to the seat bottom. And the sleeper support elements 22-035 are attached to the flatbed element.

Figure 6B:
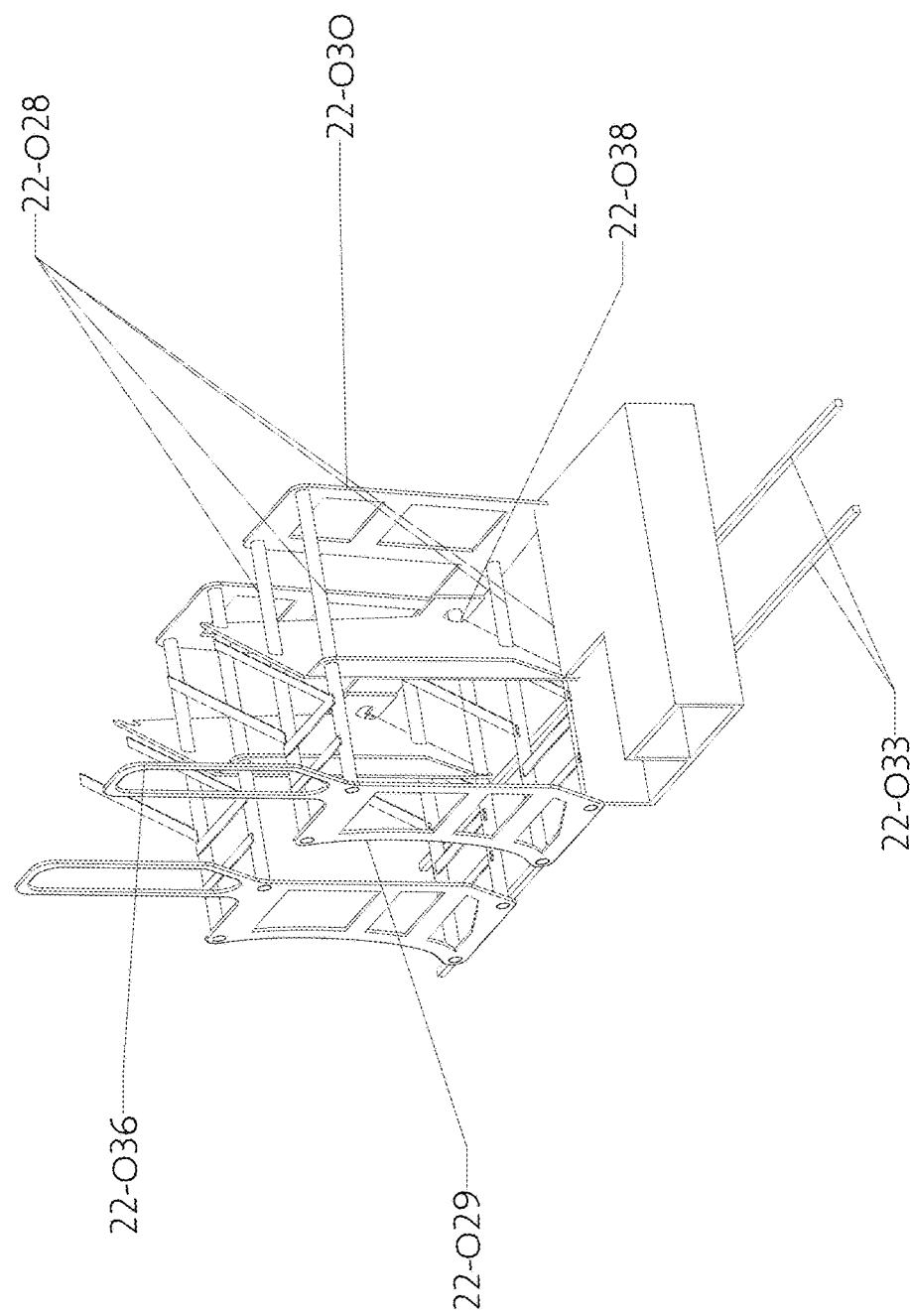
Figure 6C:
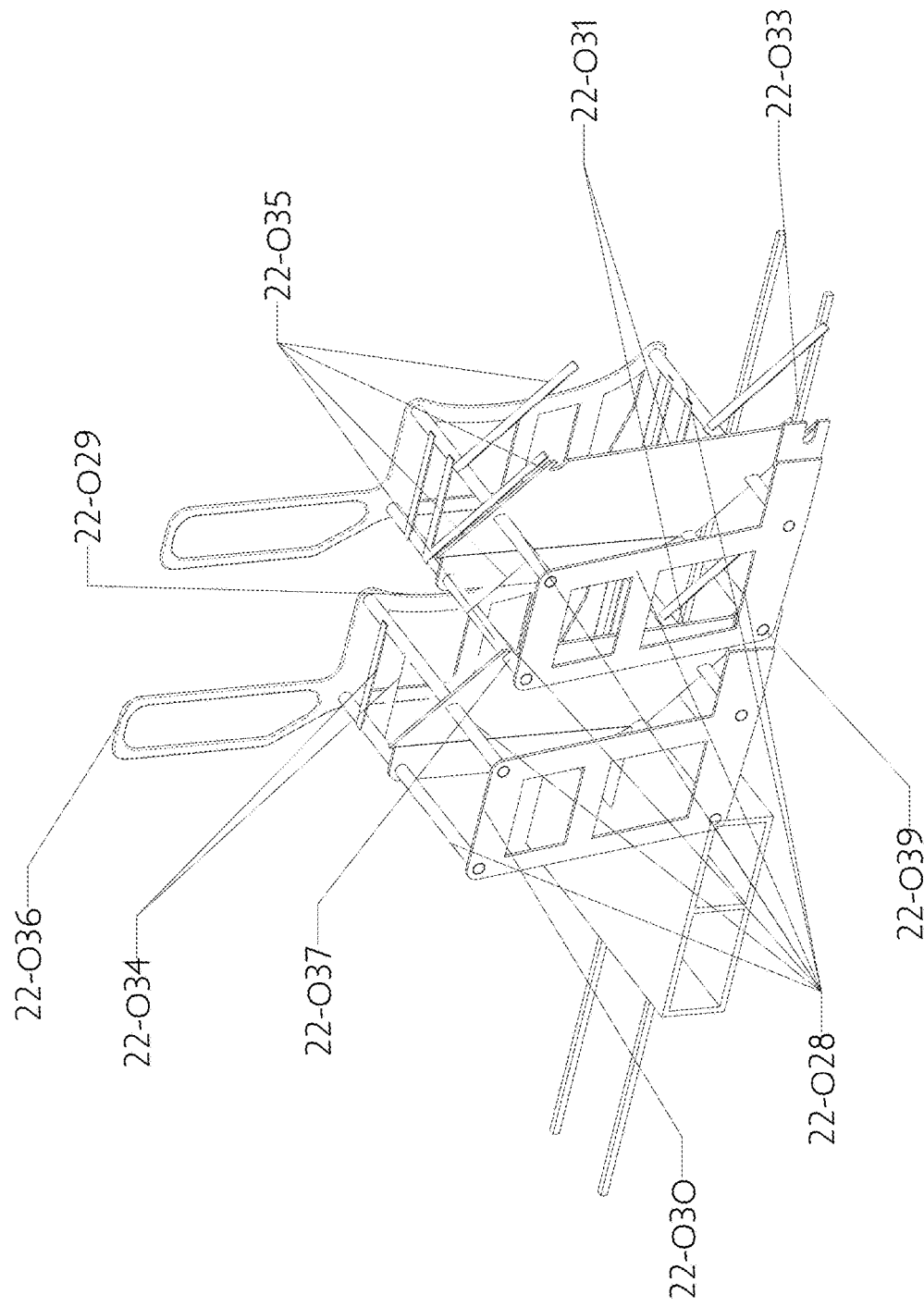

FIGS. 06A, B and C show an embodiment two single stack structures. In some such embodiments contiguous single stack structures are connected to allow the transfer of forces between the single stack structures to mitigate track loadings.

Figure 7C:
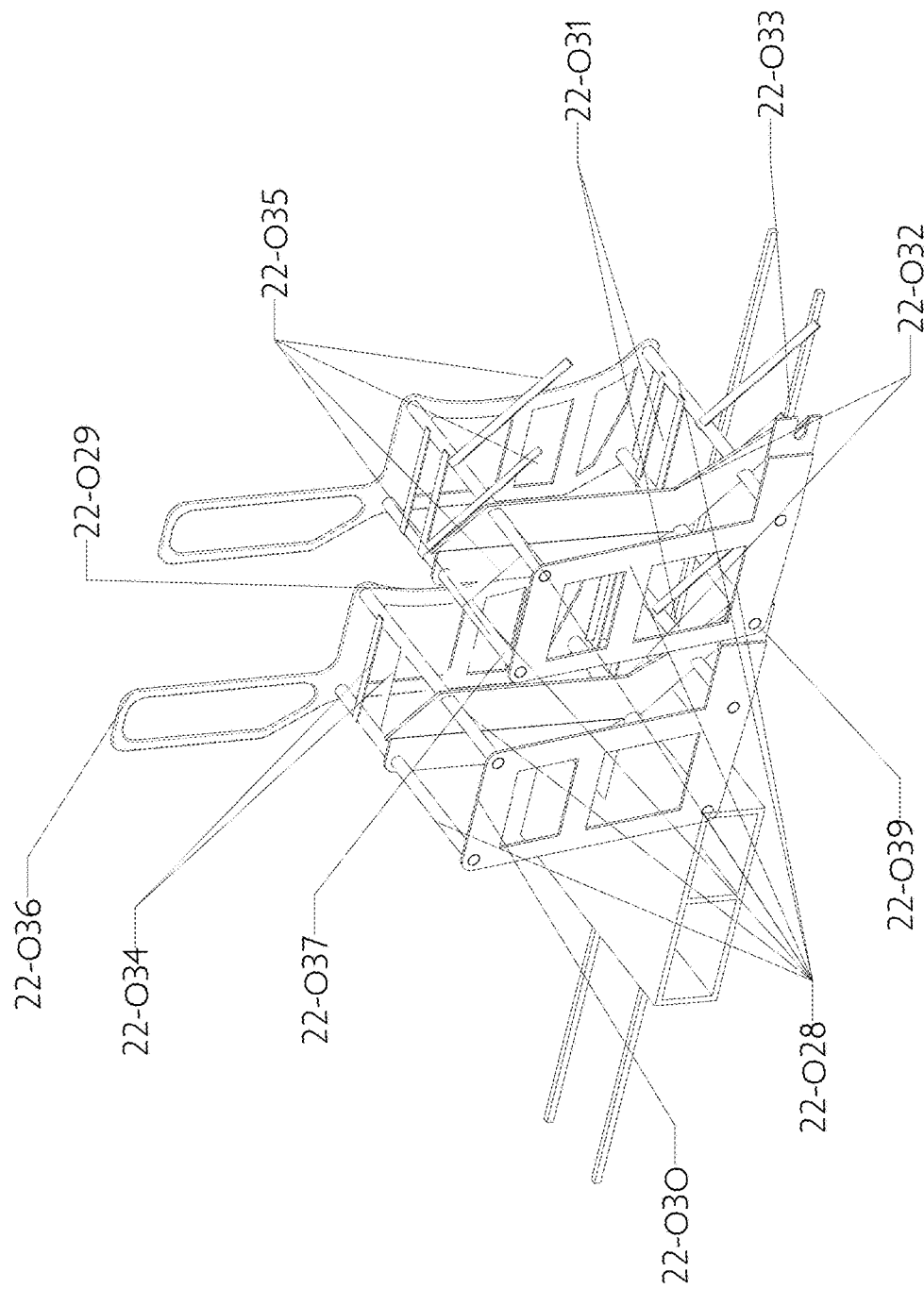

FIGS. 07A, B, C show an embodiment as in FIGS. 22-06A, B, C but with structural plate 3A or 22-032 rather than 22-031. This structural plate increases the flexibility in the shape of shrouds separating the occupant supports, but limits the structural strength of the assembled single stack structures.

Figure 8C:
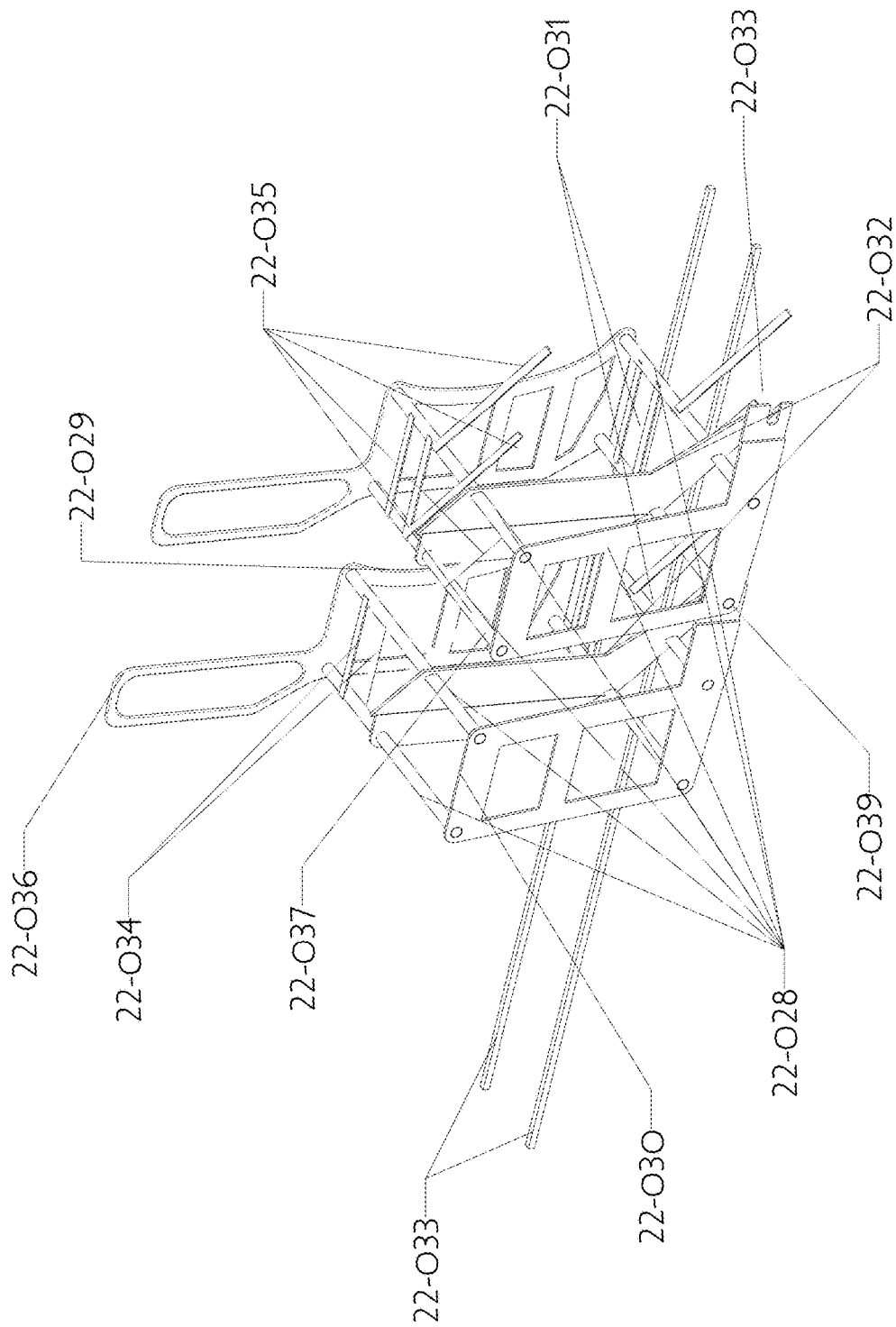

FIGS. 08A, B and C show the structural support members directly attached to the seat tracks with suitable latches. Some embodiments of such latches are disclosed in prior filings of the applicant.

Figure 9A:
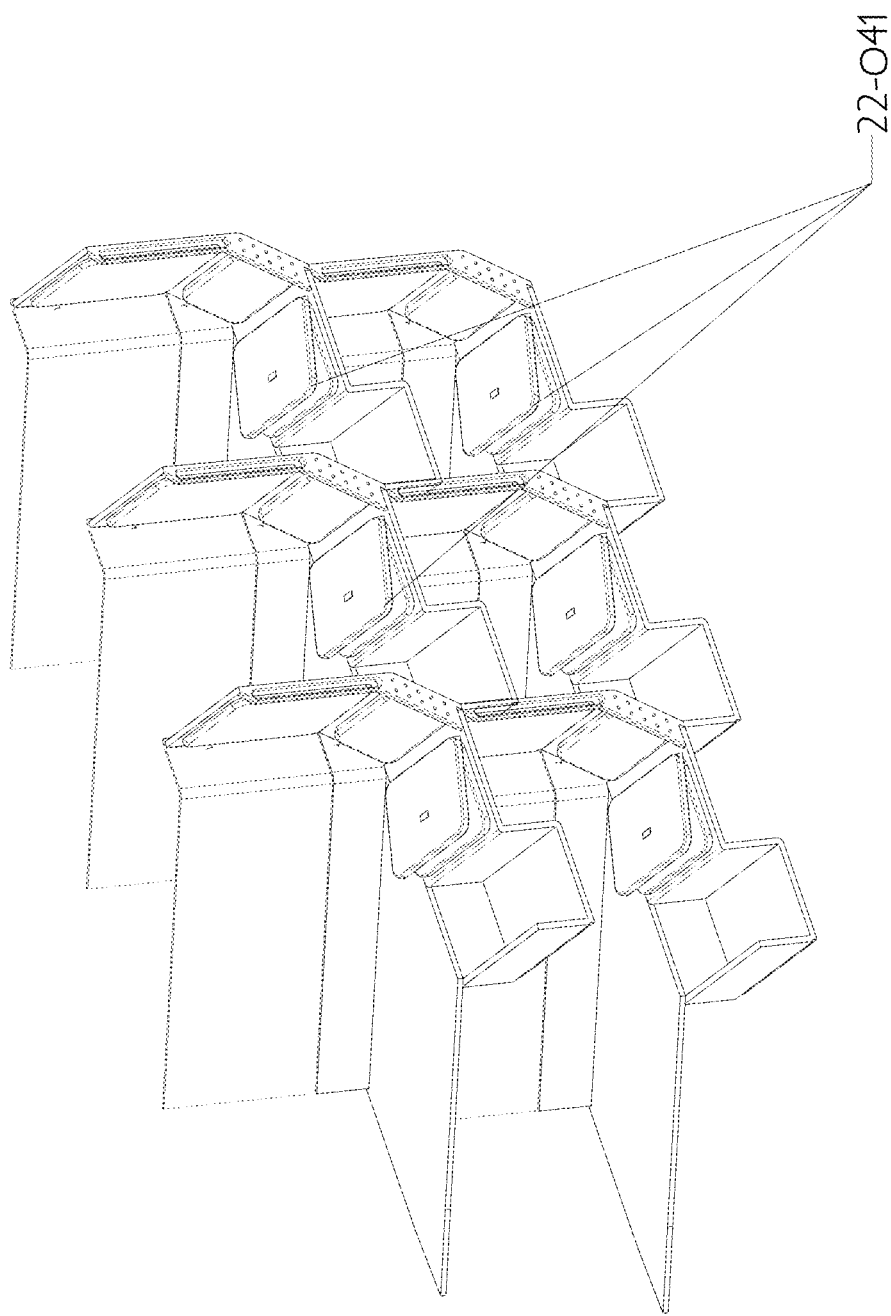
Figure 9B:
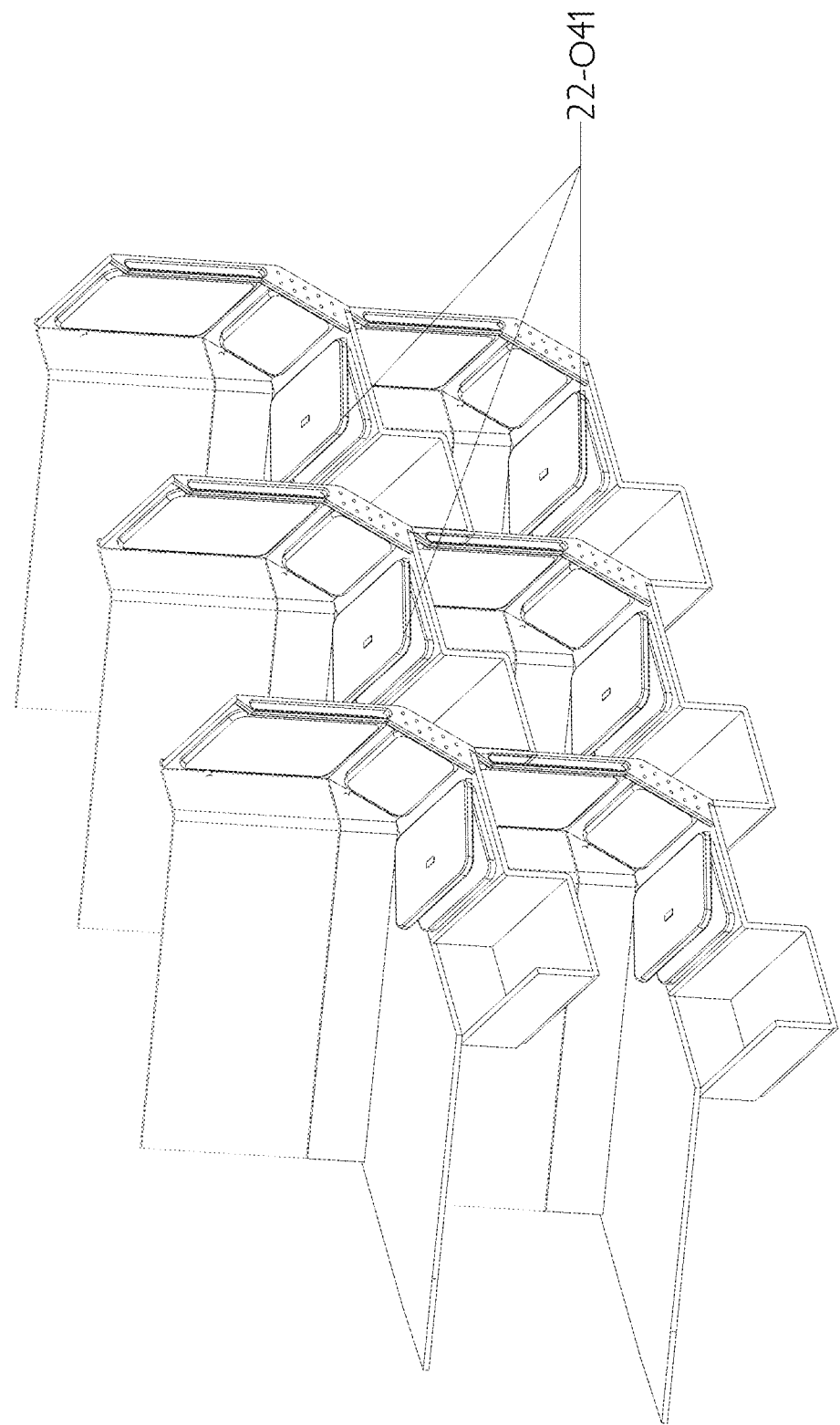

FIGS. 09A and B, show an embodiment with the seat bottom cushion with multiple positions for the comfort of the occupant.

Figure 10A:
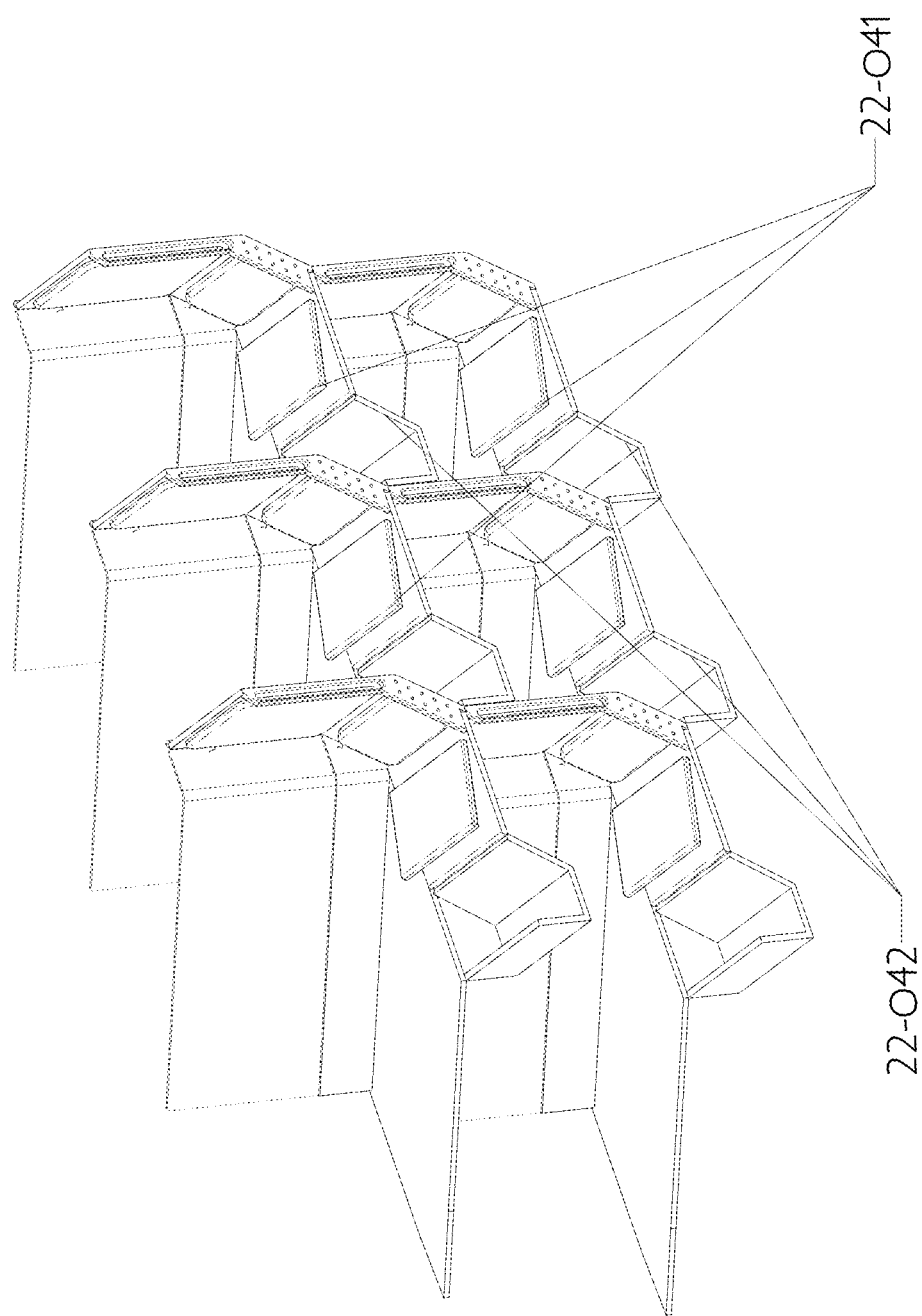

FIGS. 10A, B show a foot well with an inclined rear wall that may be used in one or both of the lower and upper tiers of the occupant supports.

FIGS. 11, 12 show another embodiment of multiple occupant supports installed in the cabin. The embodiments are attached to foot frames for structural support.

FIGS. 13, 14 show the position of passive airbags wherein some such airbags may be foam filled and vented, installed in some embodiments to mitigate head strike forces in the event of an axial direction crash.

FIGS. 15, 16 show the extension support that may be deployed for support of the occupant using the flatbed position. This extension support may be slidably attached to either the seat bottom front, or the side of the seat well. It may also be pivotally attached to the side of the seat well, the front of the drawer to 22-008 if installed, or the front edge of the seat bottom.

Figure 17:
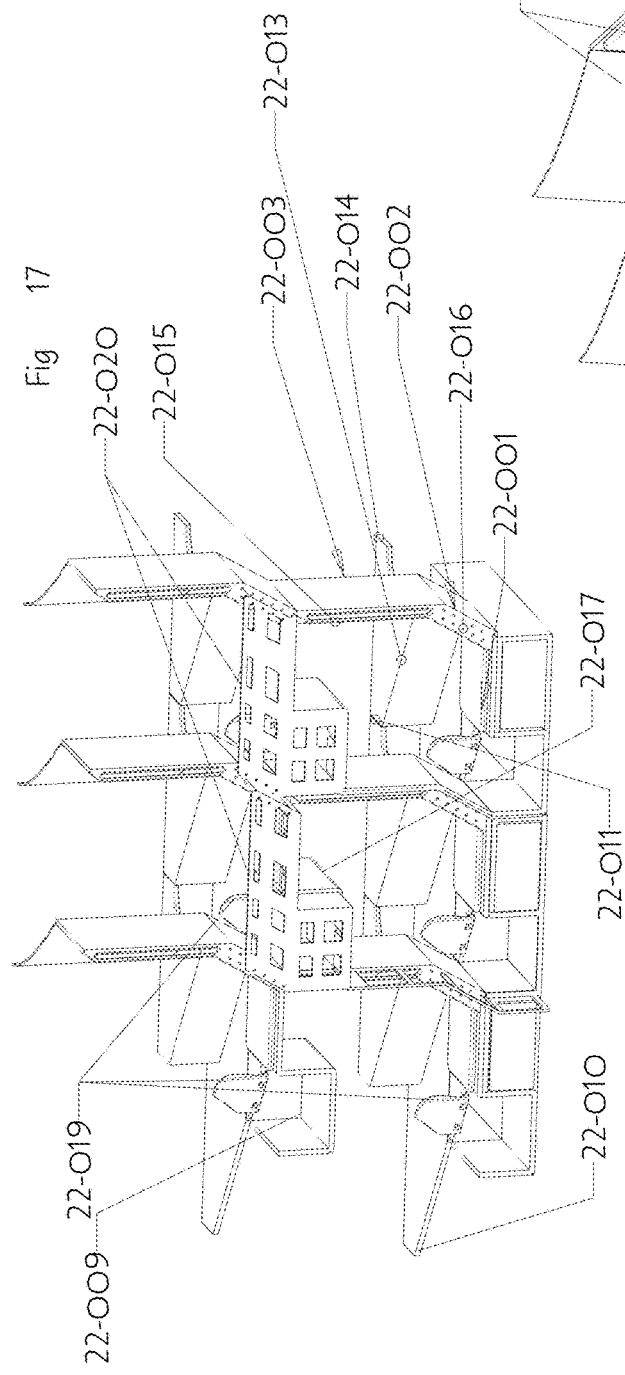
Figure 18:
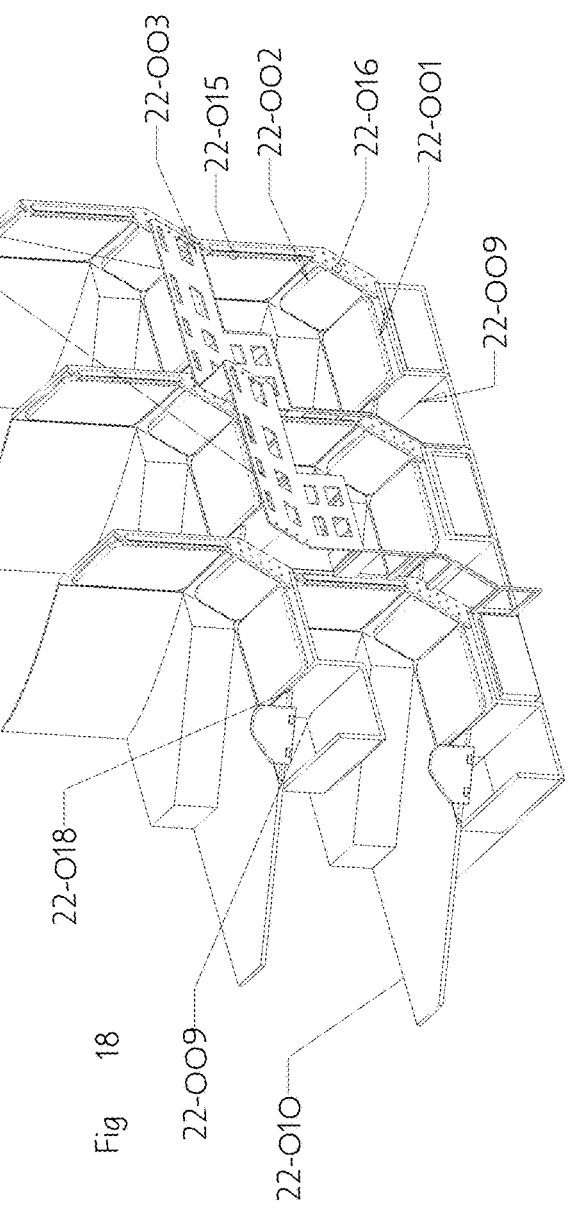

FIGS. 17, 18 show embodiments with a full length retractable ladder which may also in some embodiments function as a safety wall and in some embodiments as a structural member attached to both the seatbacks of two occupant supports at the upper level. Studs or pins on the seatbacks may be used in some embodiments to transmit forces in the axial direction of the vehicle when the latter retracted and restored. These figures show one ladder in the extended position and the other ladder in the retracted position. The service adjoining occupant supports. Retraction of these ladders use the rungs as sliders in cavities on the occupant supports.

FIGS. 19, 20 show embodiments with another ladder with a foot well safety wall 22-021. Two ladders are shown one retracted and the other deployed. Retraction of these ladders use the rungs as sliders in cavities on the occupant supports.

FIG. 21, 22 show a fixed or folding ladder that is both space and weight efficient.

Figure 23:
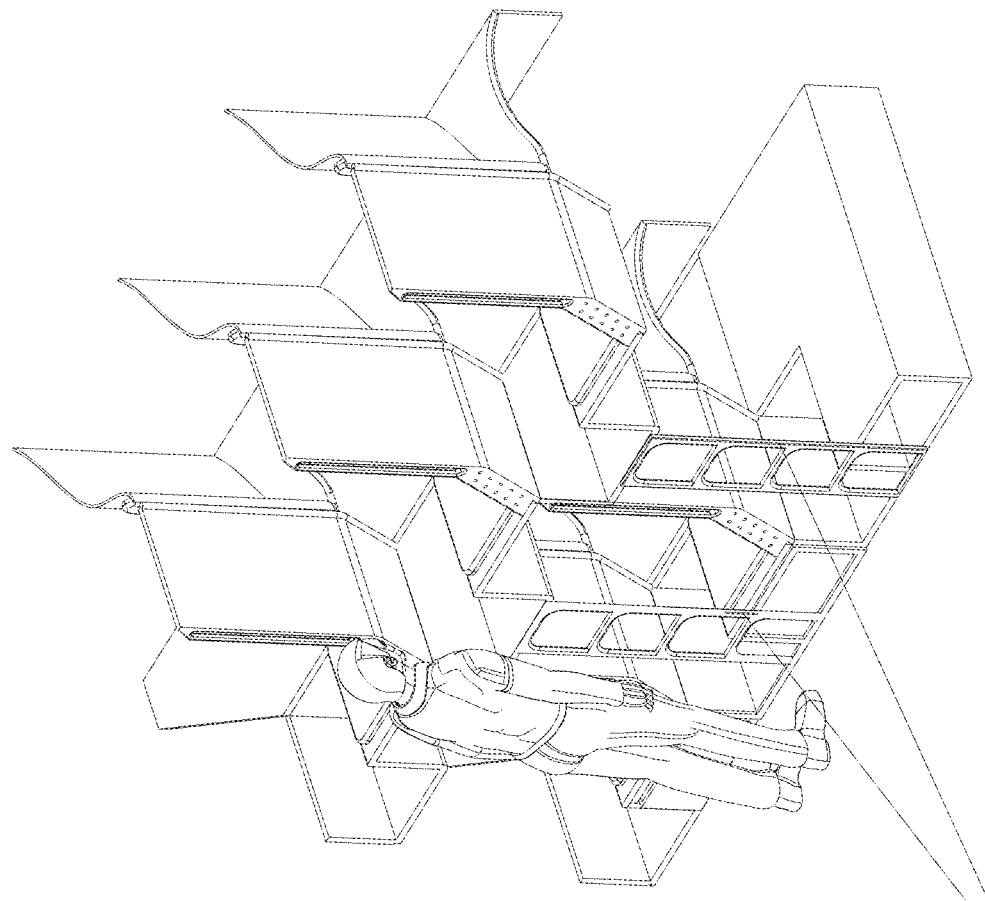

FIG. 23 show a sliding ladder in the deployed position immediately in front of the foot well of the occupant. This sliding ladder slides on one or both of the bottom of the foot well of an upper occupant support and the bottom of a foot frame.

Figure 24:
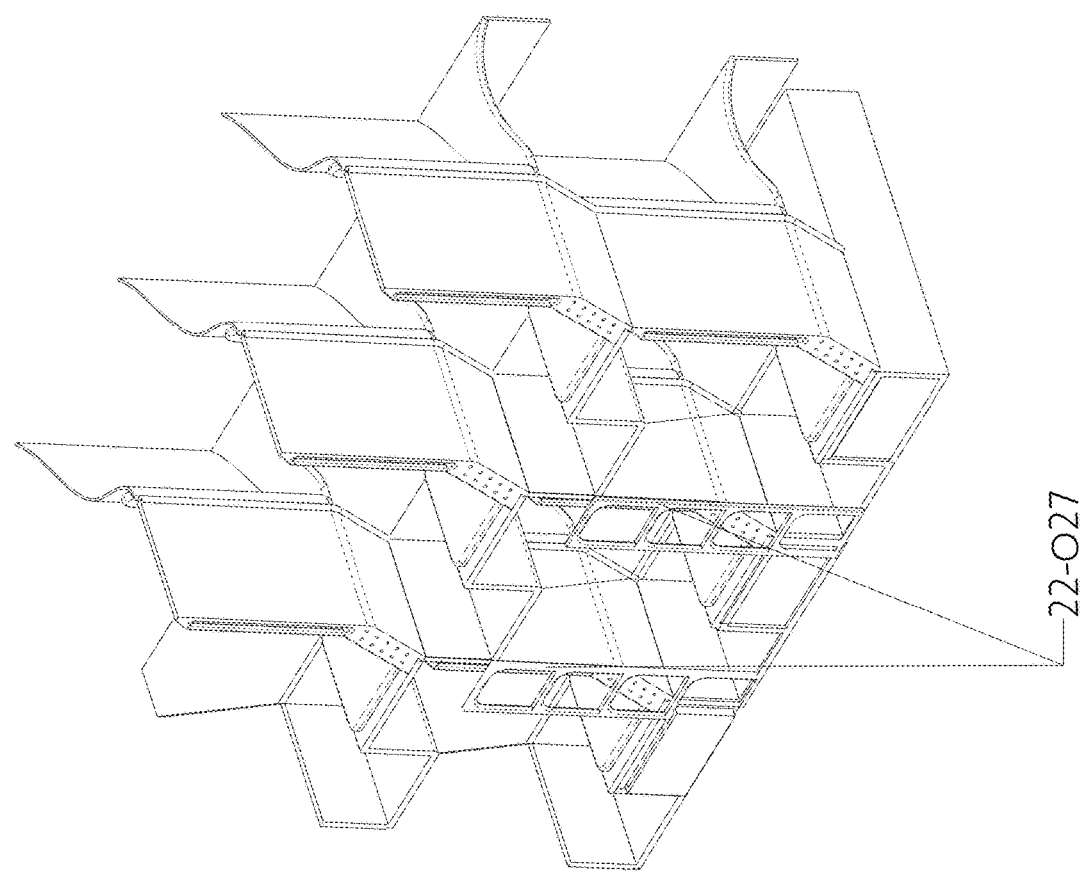

FIG. 24 shows the sliding ladder in a retracted or stored position. Ladder can slide for utility.

Figure 25:
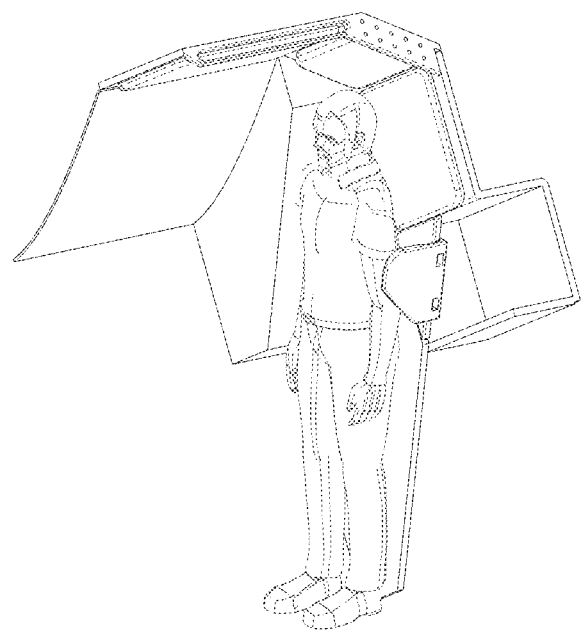

FIG. 25 shows a occupant support with an occupant using the flatbed surface. The extension support 22-018 and the shoulder/head stop 22-019 are deployed for the comfort and safety of the occupant.

Figure 26:
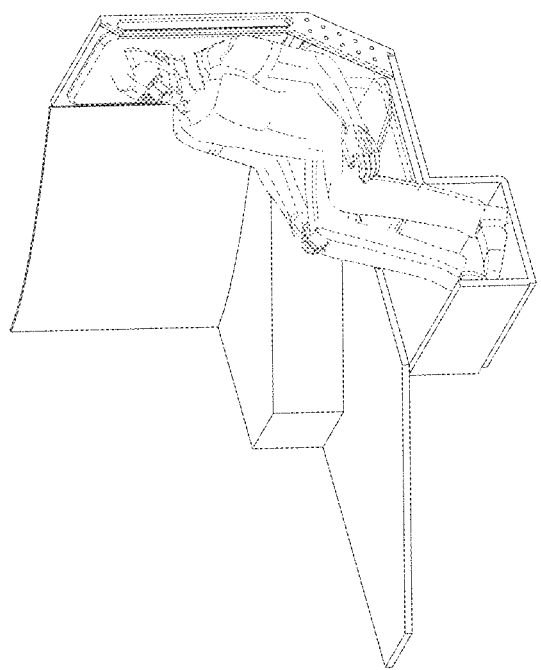

FIG. 26 shows an occupant support with an occupant in the sitting position.

Figure 27:
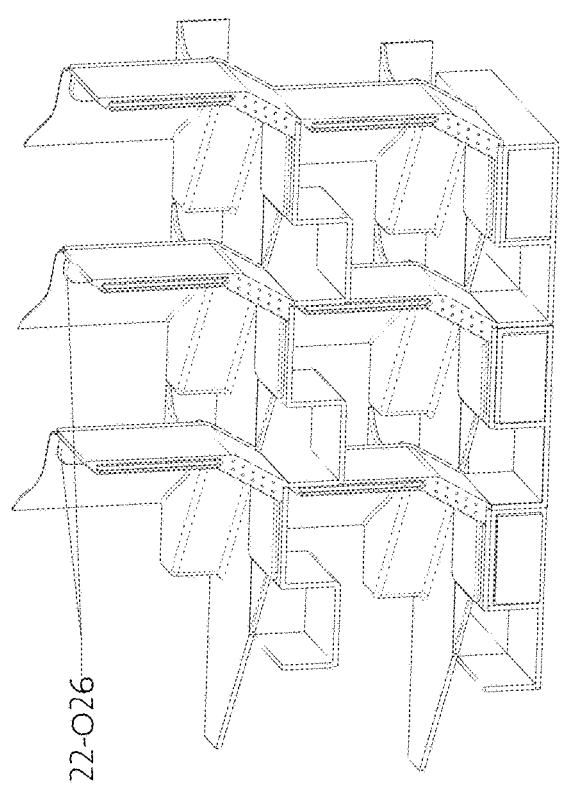
Figure 28:
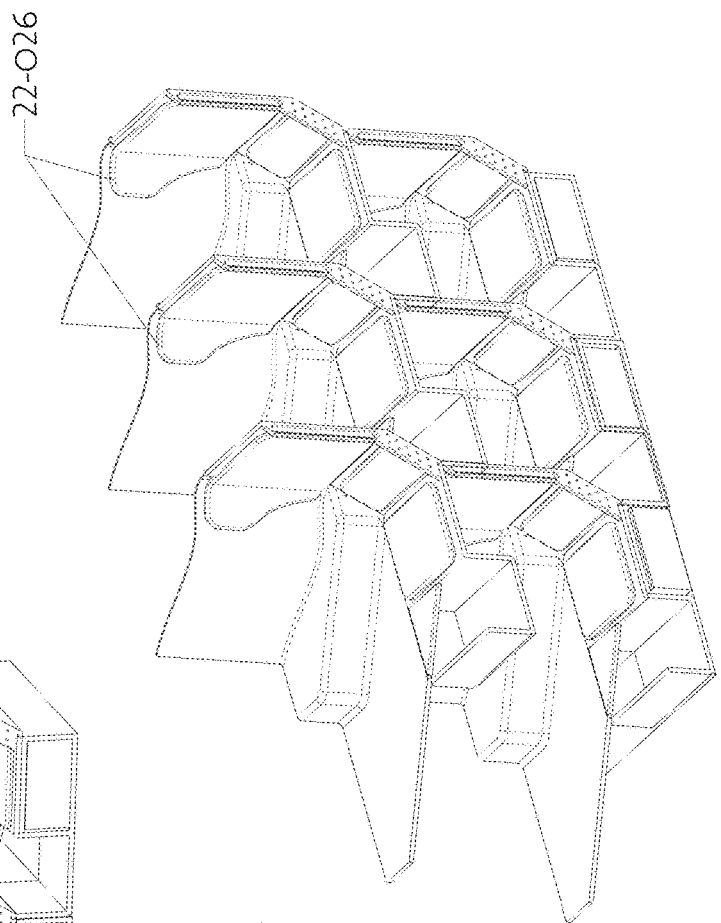

FIGS. 27, 28 show a wrap around seat back cushion to facilitate resting on the occupant while leaning on the side.

FIGS. 29, 30 show positions of air ducts to supply one or both of air vents placed near the head of the occupant in the sitting position and in the sleeping or flatbed position. The ducts are attached at the interfaces between the occupant supports and provide a single connection to the air supply from the aircraft, which may be at one of several levels—the conventional height of vents in traditional cabins i.e. above the seats and adjoining the lights for occupants, or with adapters to the central air supply at near the floor level that attached to ducts connecting such a adapter to the ducts shown in the figure. Other embodiments with substantially enclosed pods with 22-012 that substantially separate the occupant spaces or pods, may simply have air supplies to both levels of occupant supports placed on the walls of the cabin. Many embodiments are constructed to have substantial isolation of airflow between the occupant supports and therefore fresh air will fill each of the occupant support cavities or pods to isolate air for each of the occupants for reasons of hygiene.

FIGS. 31, 32 highlight the extension support 22-018 and the shoulder/head stop 22-019.

Figure 33:
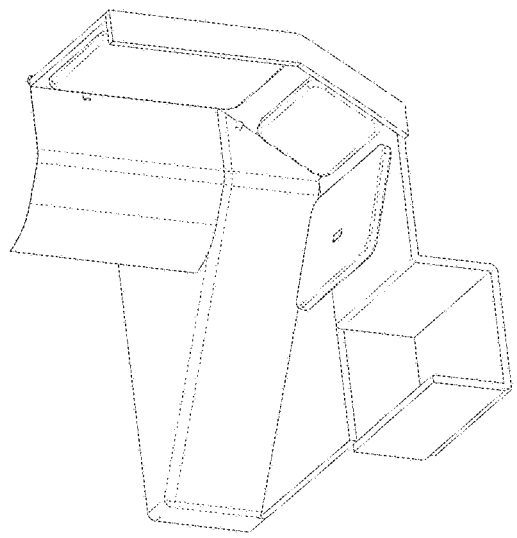

FIG. 33,34,35 show different views of another embodiment of the seat.

Figure 37:
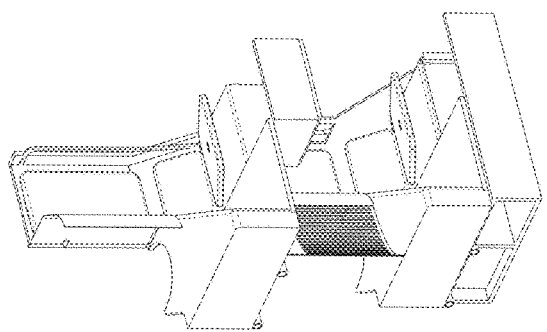
Figure 38:
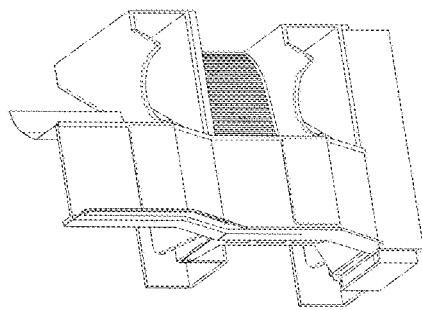
Figure 36:
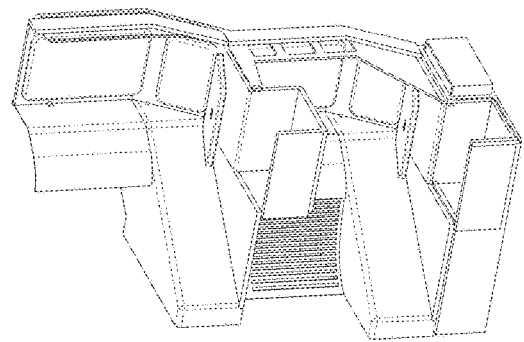

FIGS. 36, 37, 38 show the stacked version of the seats in 22-33, 34, 35.

Figure 40:
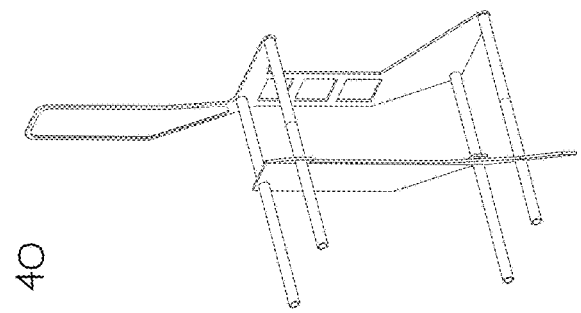
Figure 41:
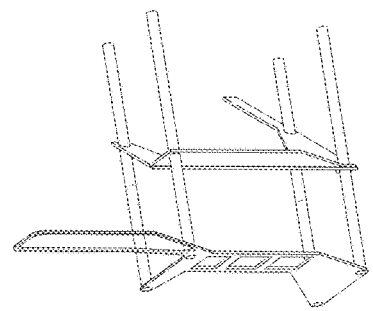
Figure 39:
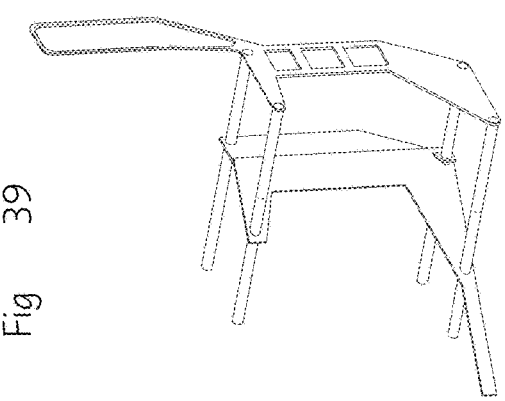

FIGS. 39, 40, 41 show an embodiment of the single stack structure for FIG. 22-36, 37, 38 with foot frames below for support and an optional drawer below.

Figure 43:
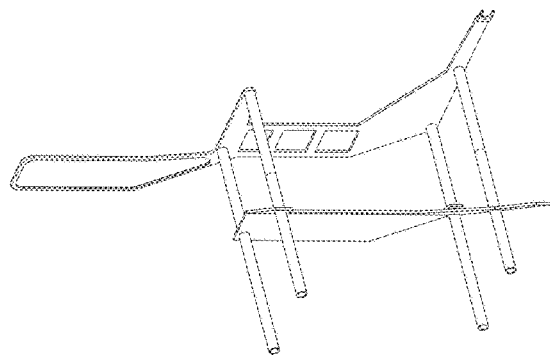
Figure 44:
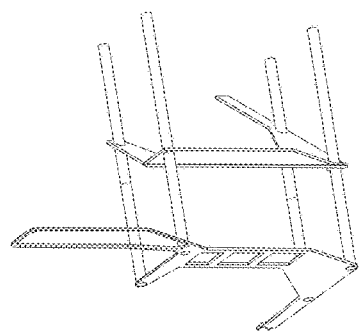
Figure 42:
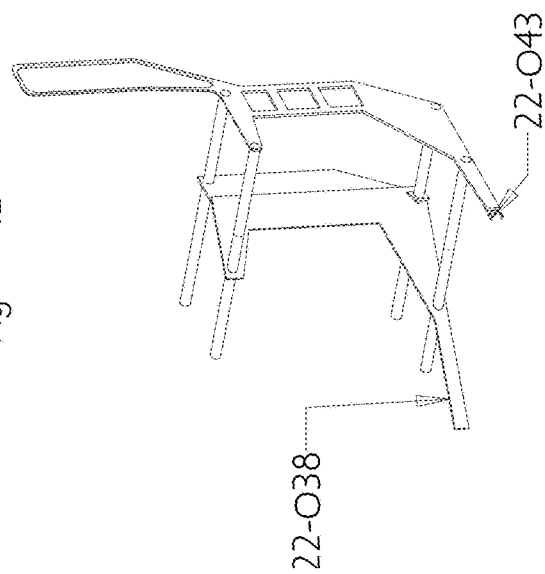

FIGS. 42, 43, 44 show the structure for an embodiment without a foot frame for direct connection of the single stack structure to the seat tracks. This embodiment has a structural member on plate 1 with notch 22-043 to attach to the lower tube of the adjoining single stack structure along axis of the vehicle.

Figure 46:
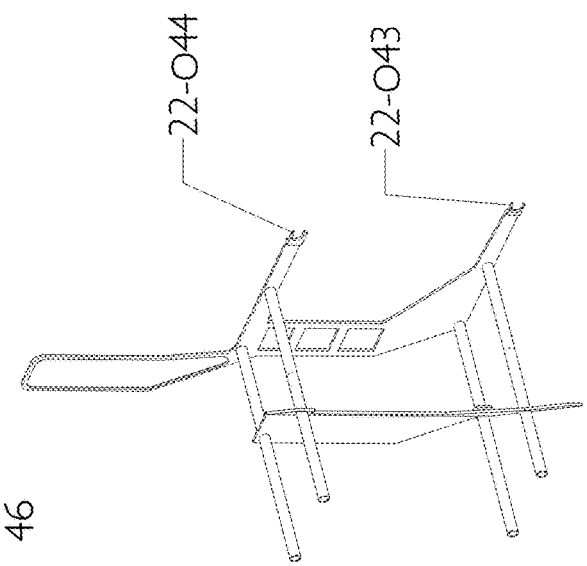
Figure 47:
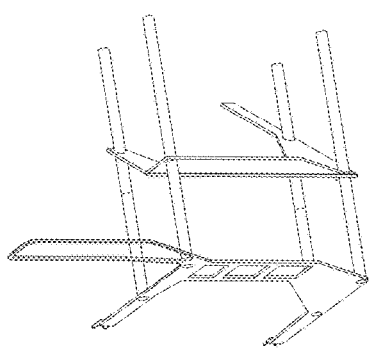
Figure 45:
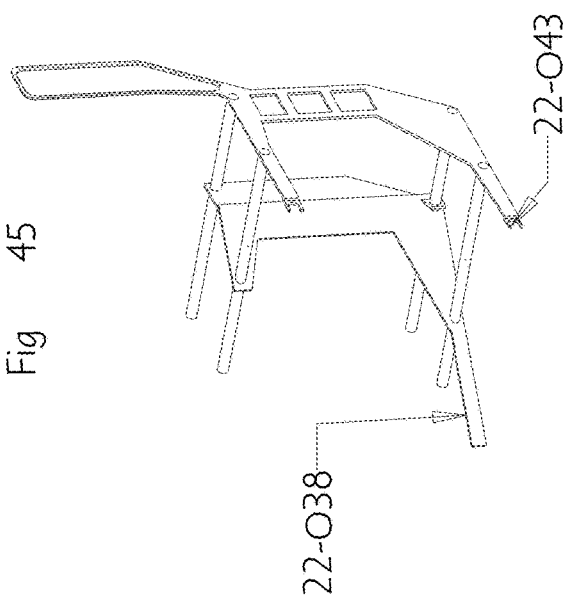
Figure 55:
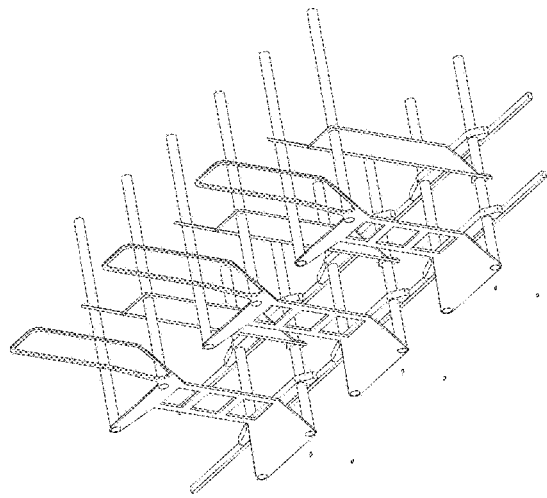
Figure 56:
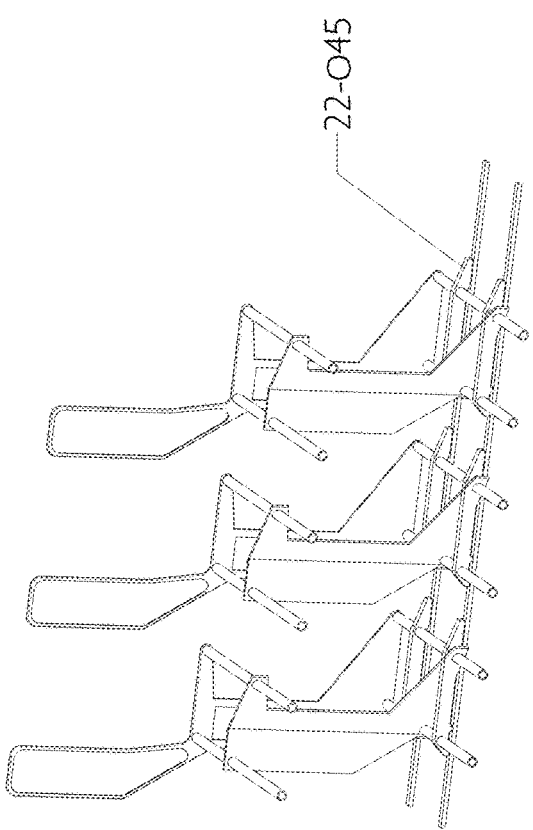

FIGS. 45,46,47 show the single stack structure for an embodiment without a foot frame for direct connection to the seat tracks. This embodiment has a structural member on plate 1 with notch 22-043 to attach to the both lower tube and upper tube of the adjoining support structure along axis of the vehicle.

FIGS. 48,49, 50 shows three contiguous stacked tiered seats.

FIGS. 51, 52, 53 show the deployment of three adjoining single stack structures with the interlinked plates. The version shown uses foot frames to attach to the seat tracks.

Figure 54:
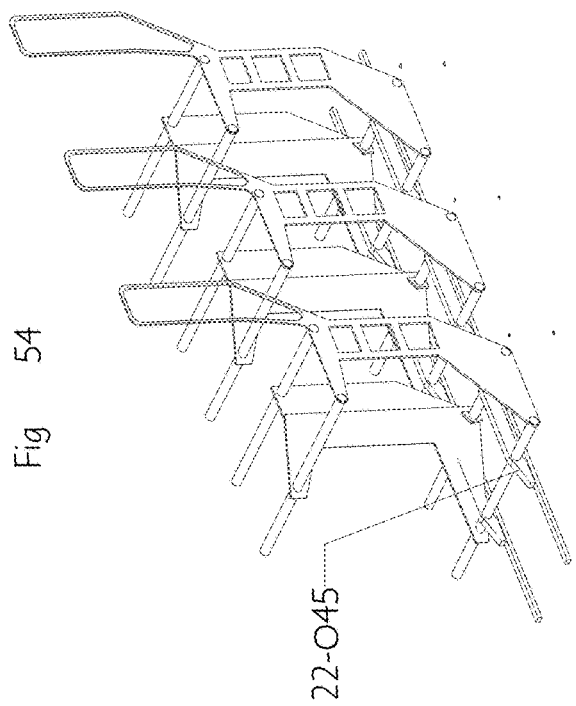

FIG. 54, 55, 56 show latch attachment members fixed to the tubes. Here each vertical structure with a tiered par of seats has two latch pairs—at the front and at the back. One of the latch pairs (typically the front pair) may be configured for vertical loads or in other embodiments only compressive loads. Typically with such embodiments the individual single stack structures are not attached to each other and the separate single stack structures will transfer the tensile and compressive loads independently to the seat tracks.

Figure 57:
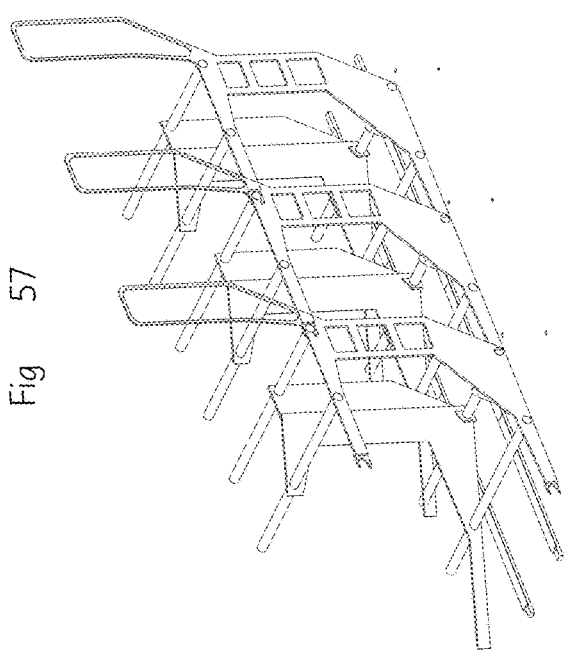
Figure 58:
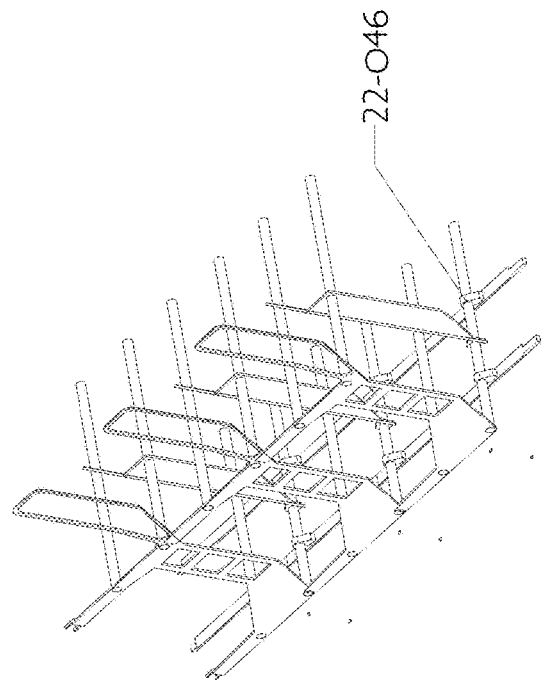
Figure 59:
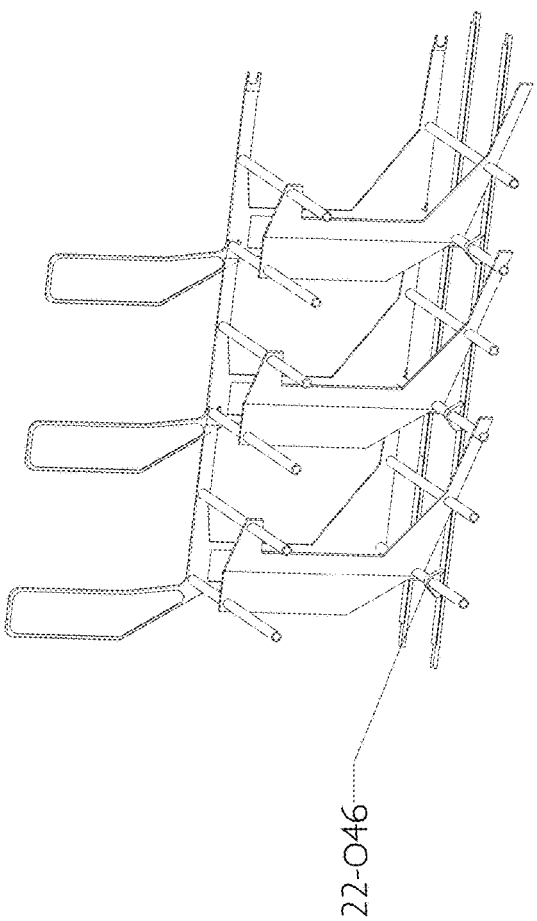

FIGS. 57,58,59 show latch attachment members fixed to the tubes. Here each single stack structure has a single latch pair—at the back. In such embodiments the individual structures are attached and the tensile and compressive loads distributed among the vertical structures. The attachments can also be with the upper tubes in some embodiments (not shown). A variation of this embodiment would have in addition a resting pad on the tracks for the front tubes in each single stack structure, thereby transferring compressive loads to the seat tracks.

Figure 61:
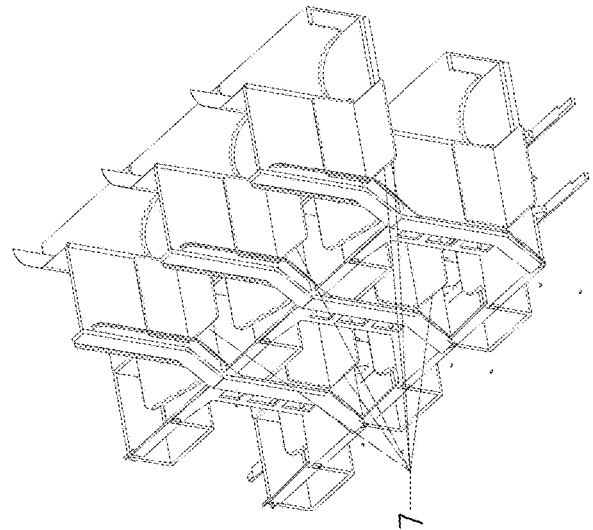
Figure 60:
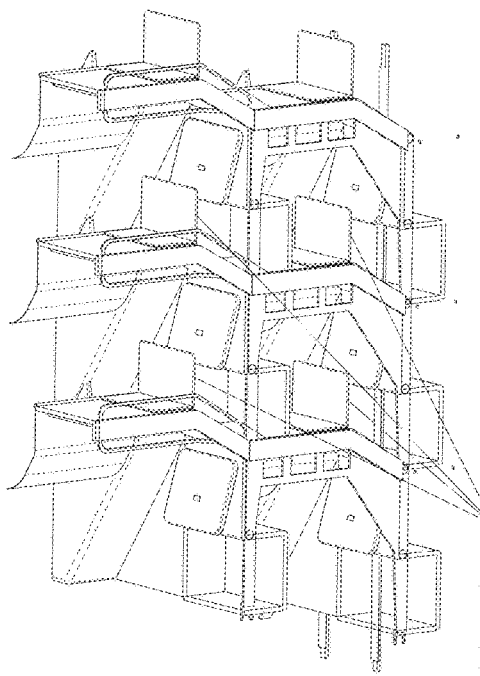
Figure 62:
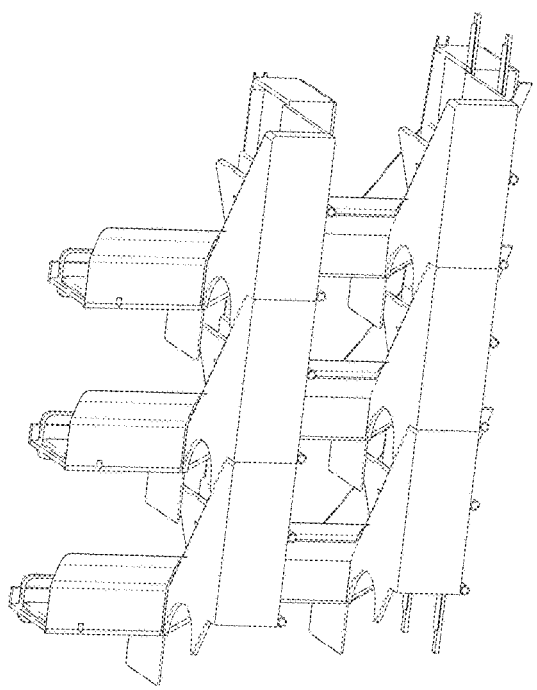
Figure 64:
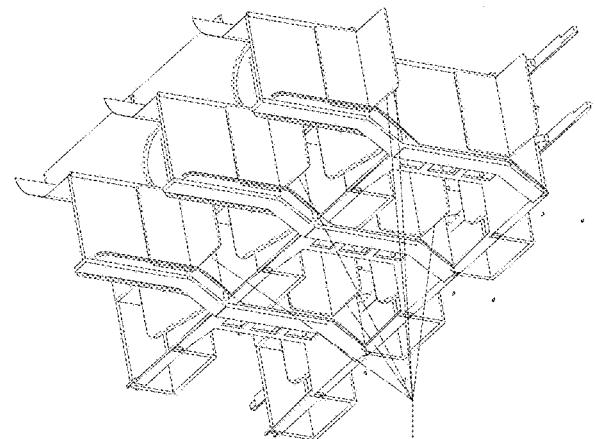
Figure 63:
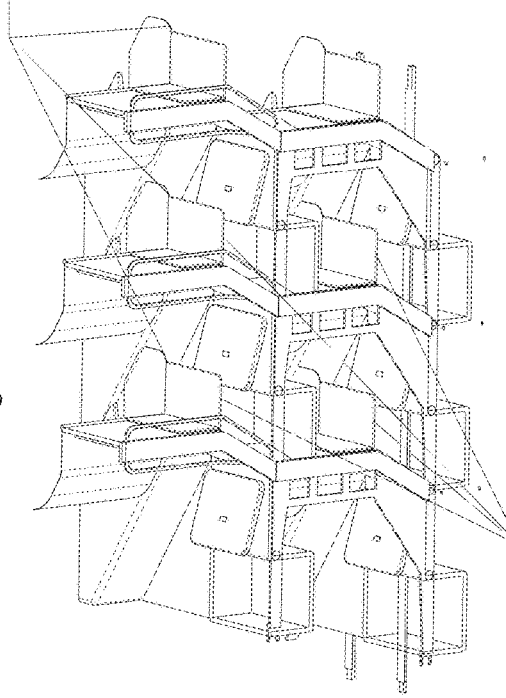
Figure 65:
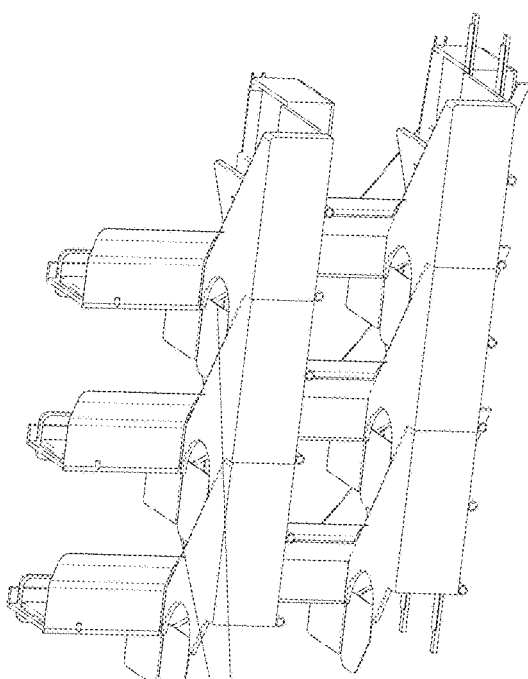

FIGS. 60, 61, 62 show a folding front table top 22-047.

FIGS. 63, 64, 65, 66, 67, 68 show multiple embodiments of retractable (sliding or as drop flap) side tables.

Figure 70:
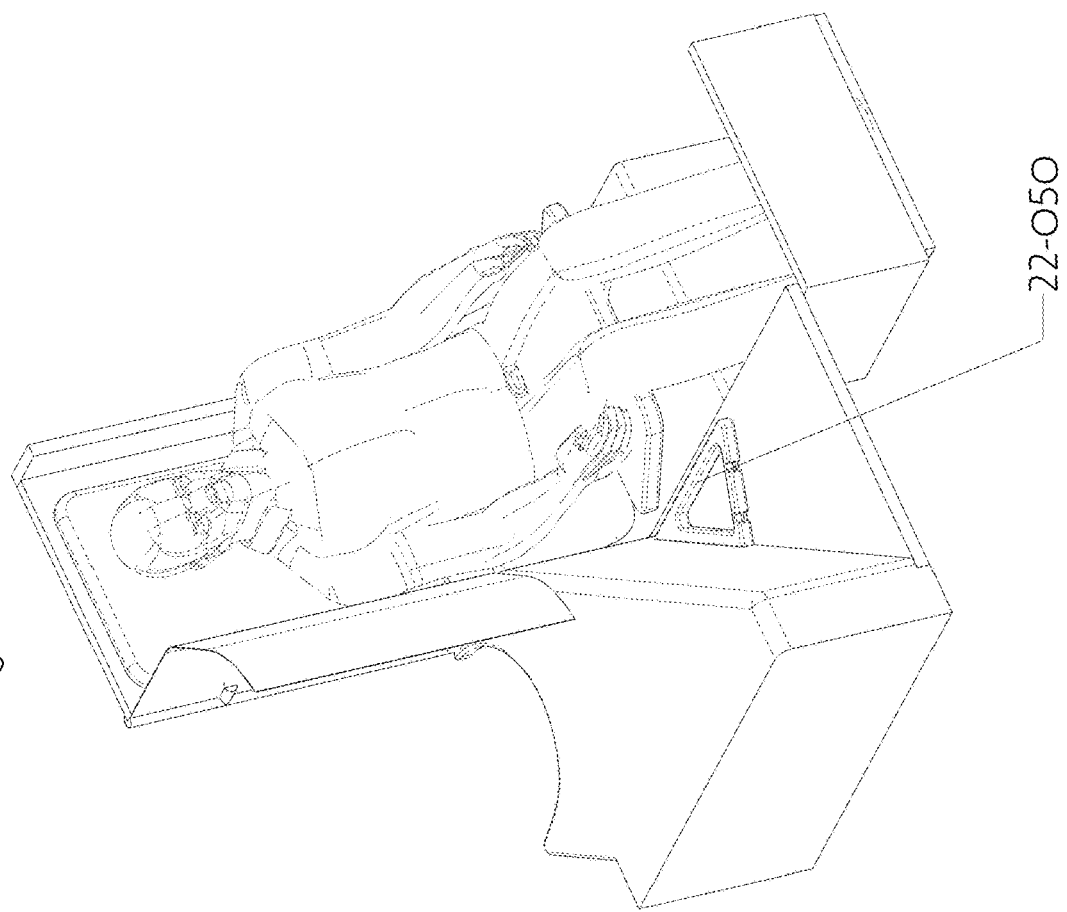
Figure 69:
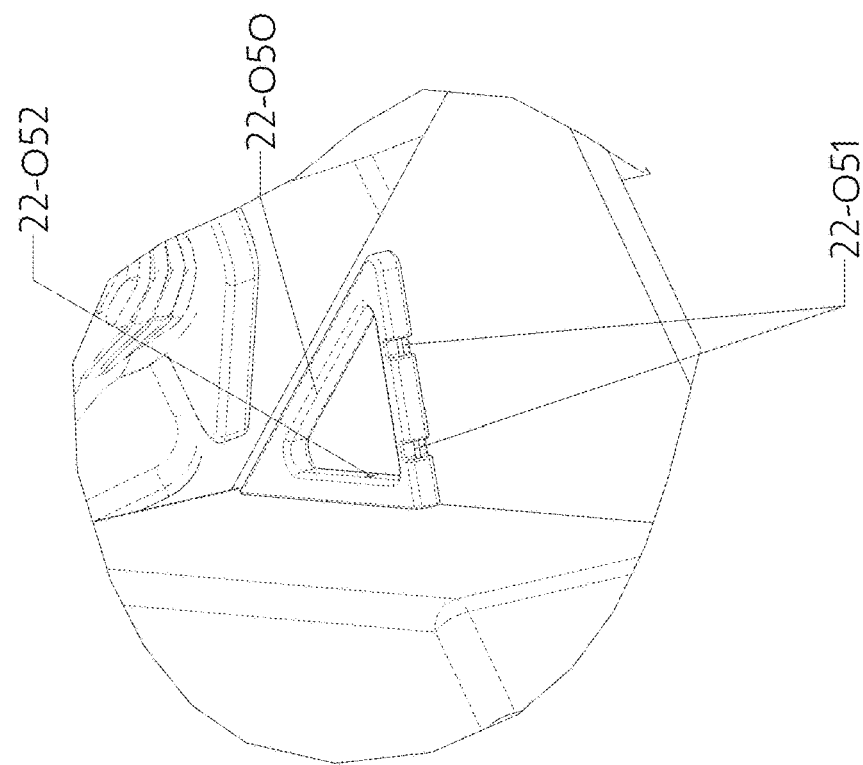
Figure 71:
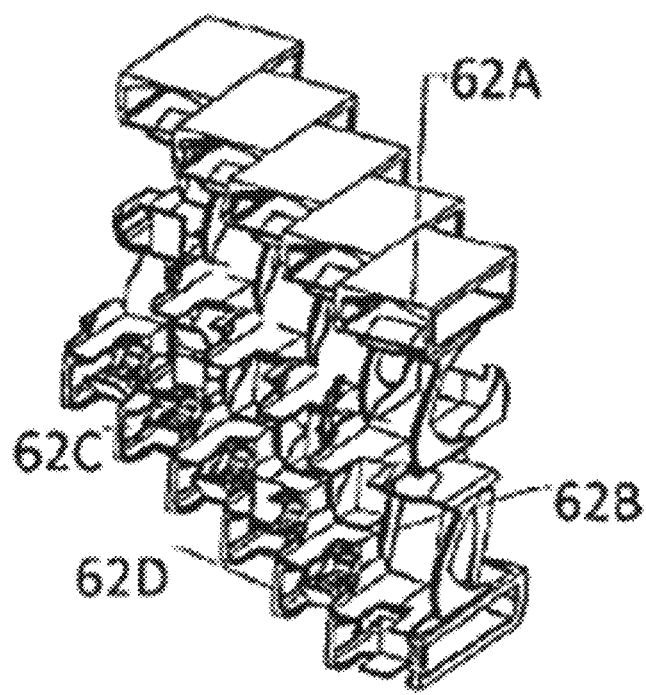
Figure 72:
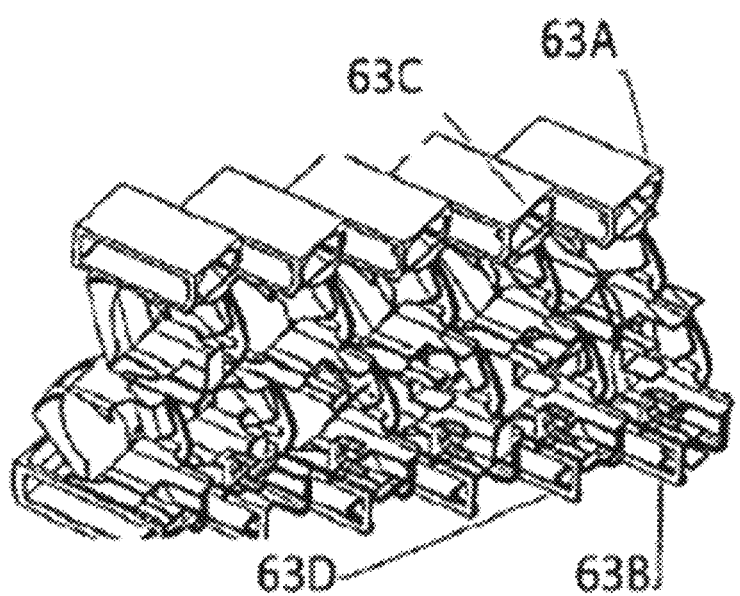
Figure 73:
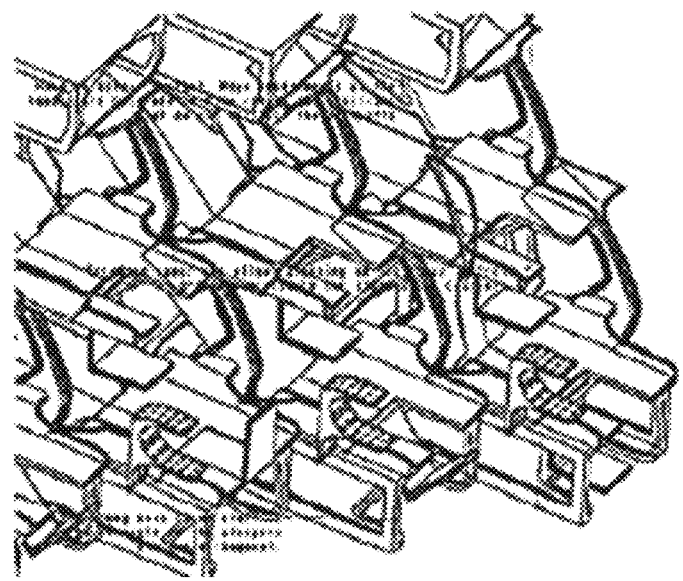
Figure 74:
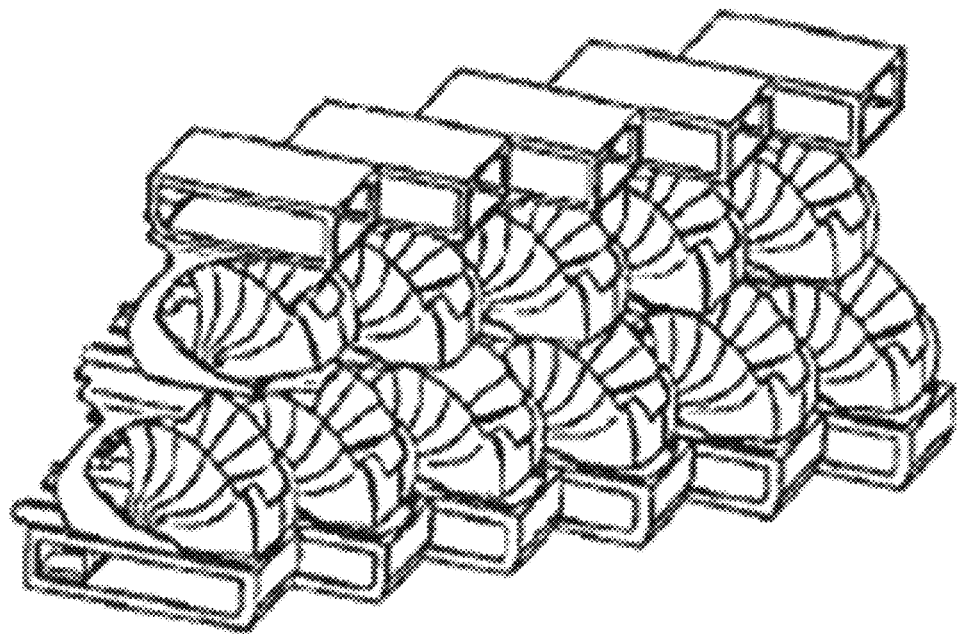
Figure 75:
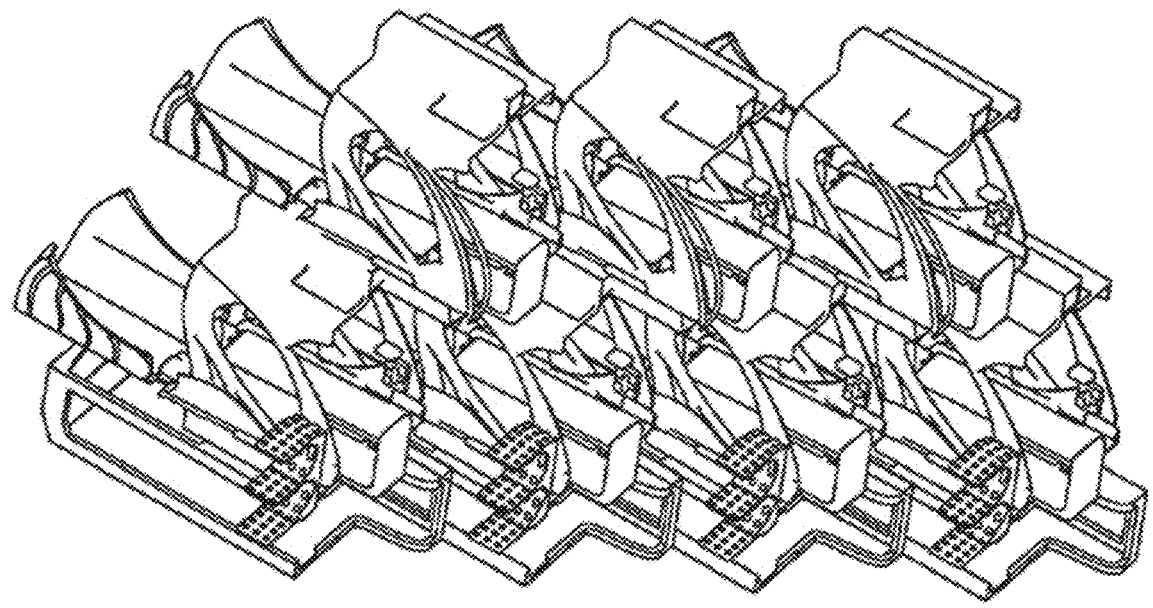
Figure 76:
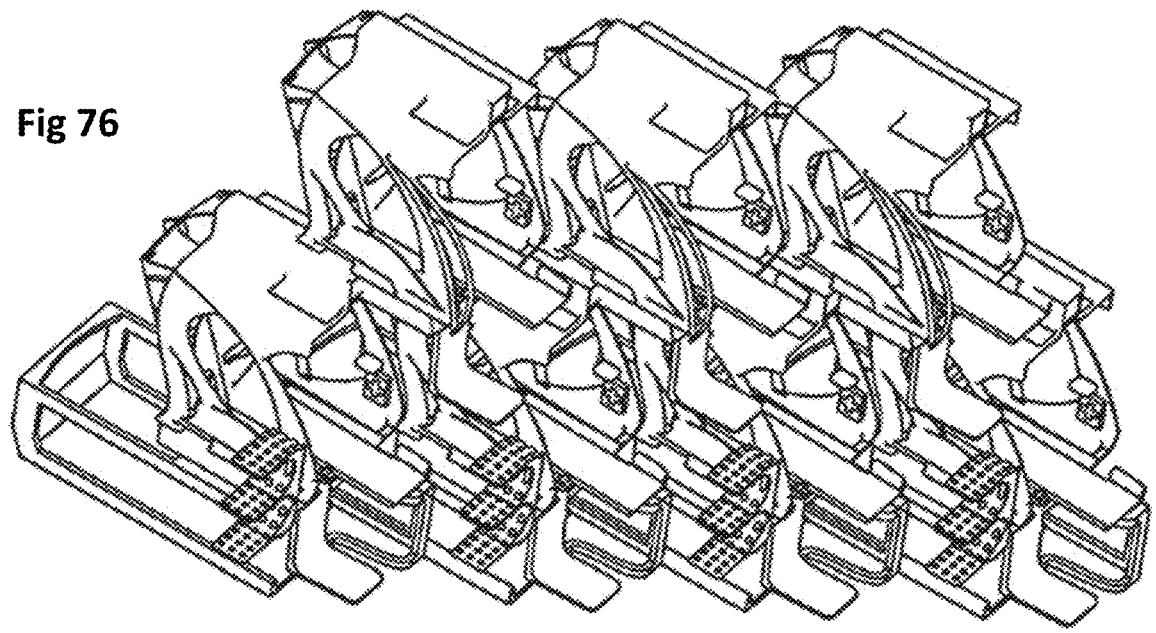
Figure 77:
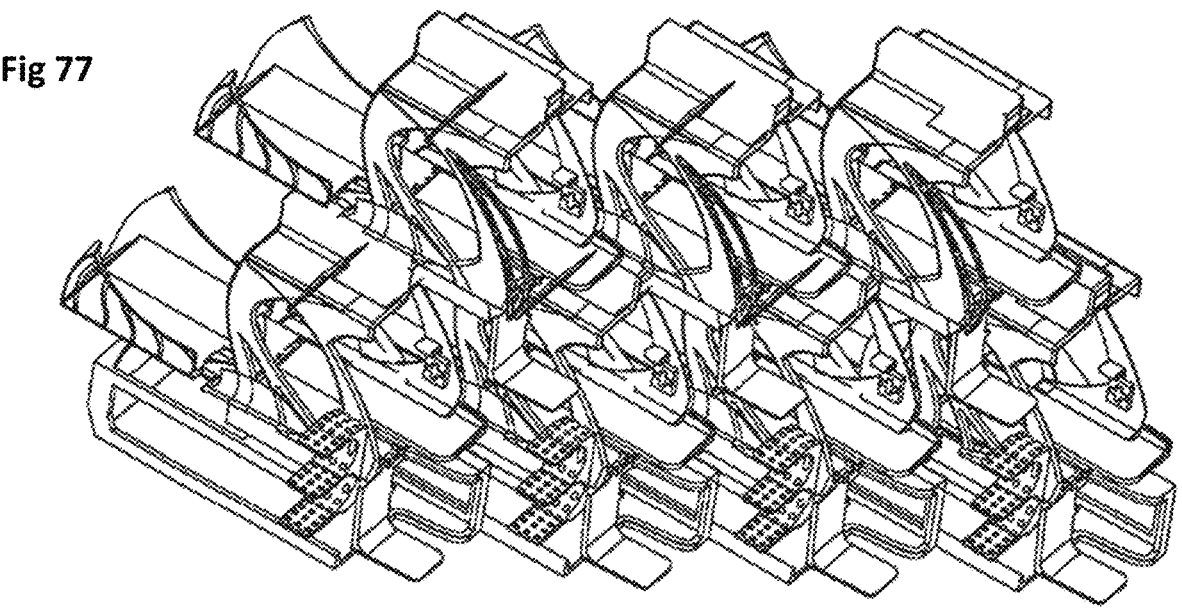
Figure 78:
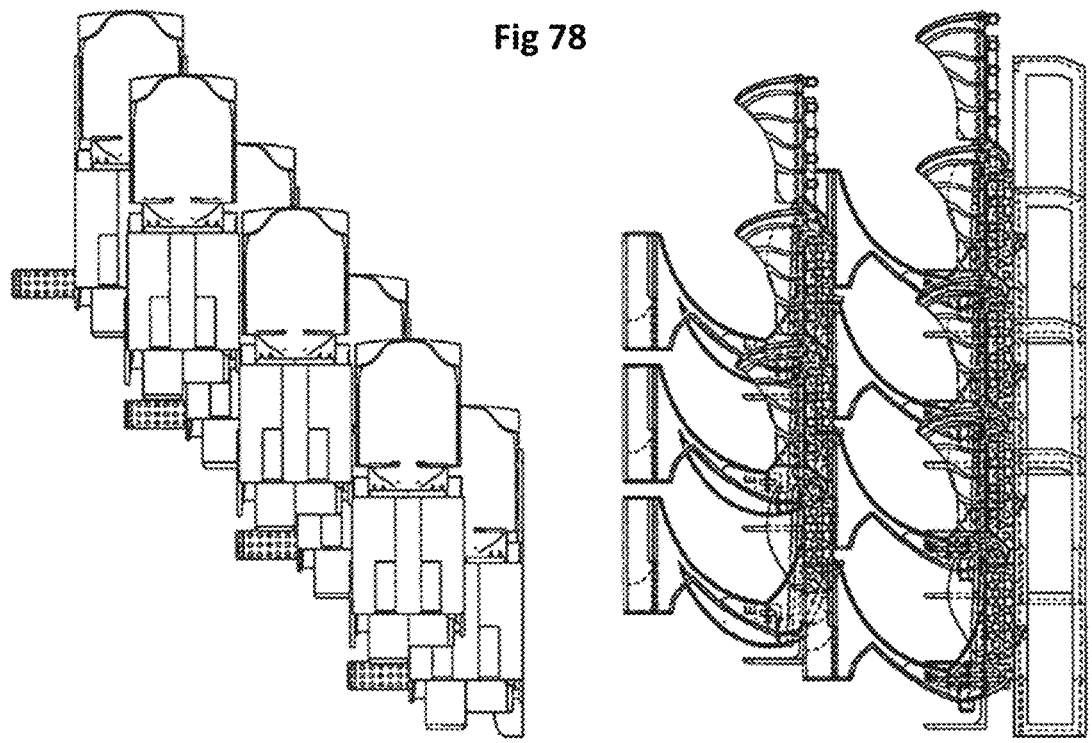
Figure 79:
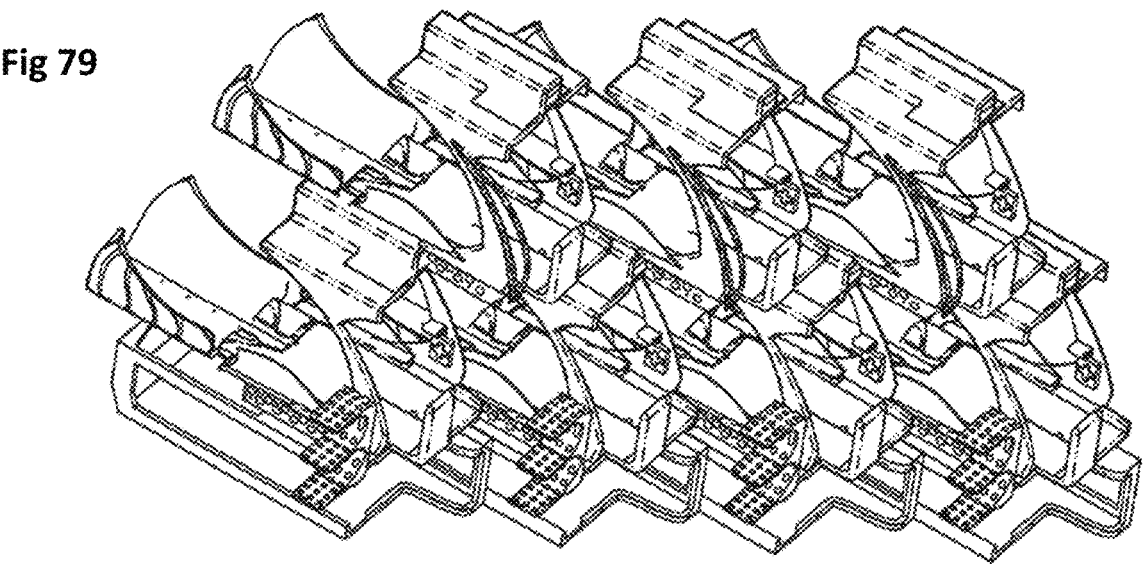
Figure 80:
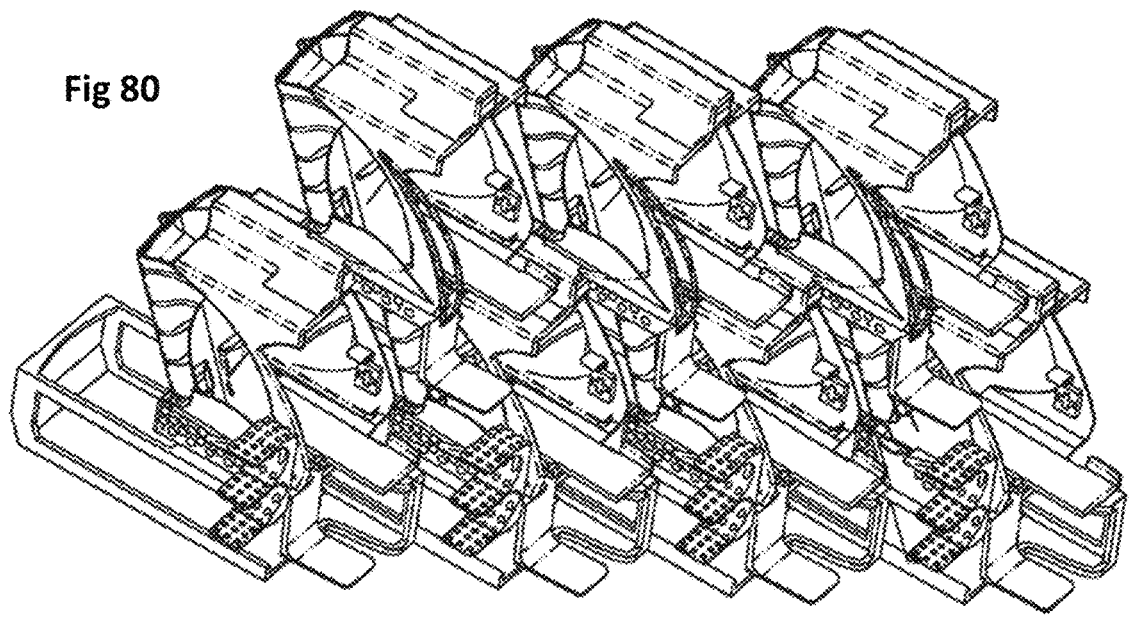
Figure 83:
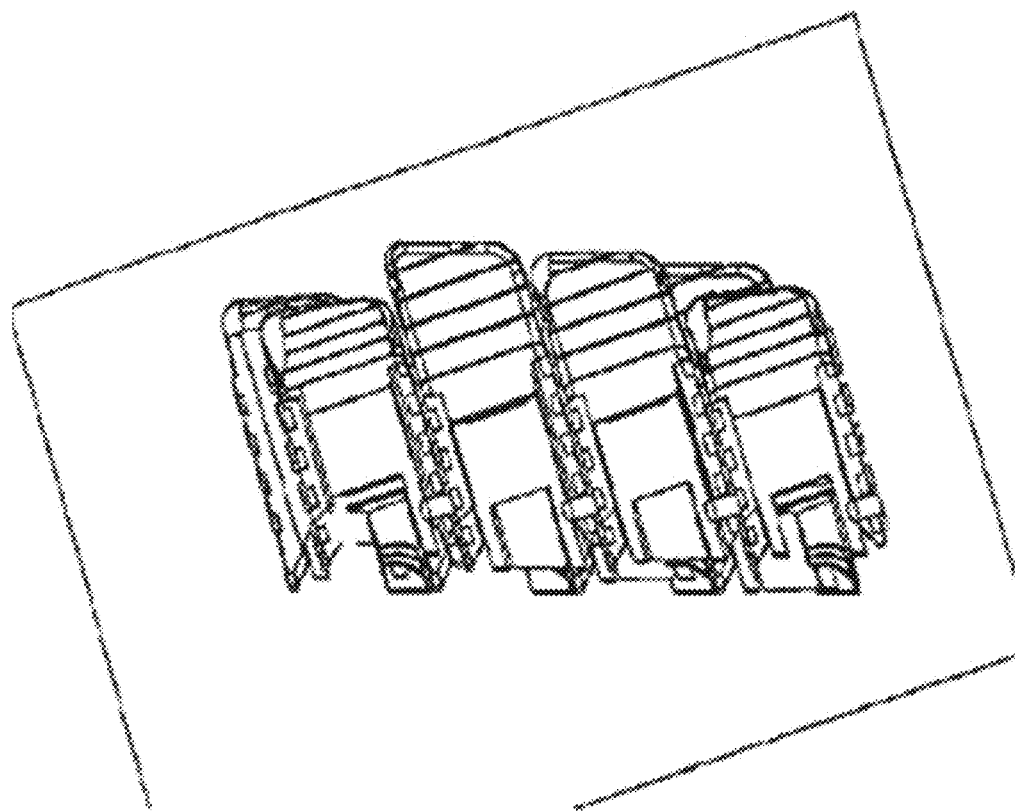
Figure 84:
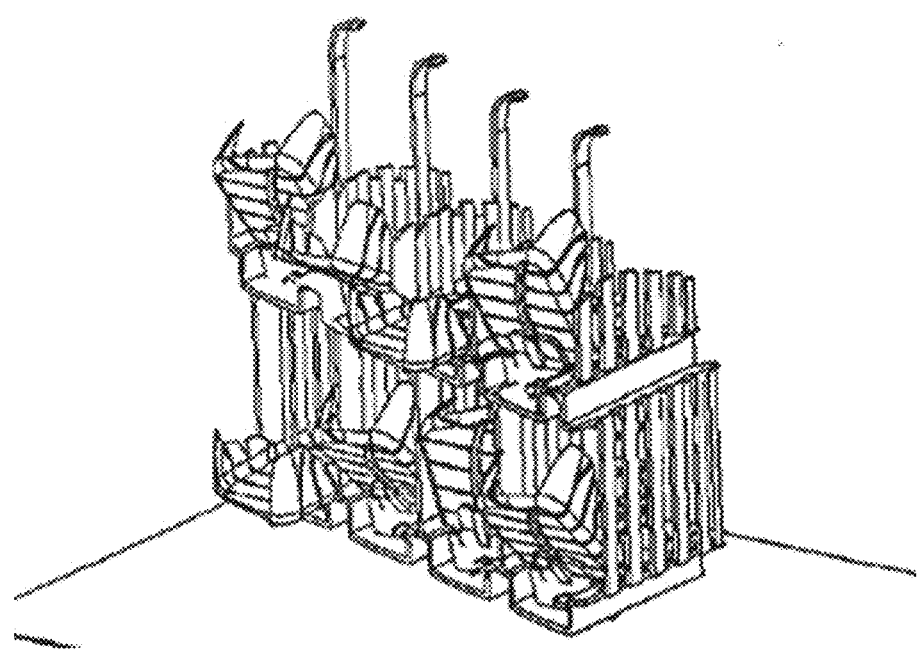

FIGS. 69,70 show a detachable brace for a latch attachment for a child seat. Such child seats can be standard automotive seats. The brace may support either a forward facing seat or an angled seat in the direction of the flat bed surface. The brace is mounted to the Plate 3 or 3A through the shroud for structural integrity.

FIGS. 71-84 show different embodiments and views of the invention configured with sitting position and proximal end adjoining the aisle and the distal end away from the aisle.

DETAILED DESCRIPTION OF INVENTION

AirSleeper Structure

The present invention discloses a set of embodiments of the air sleeper, in addition to those disclosed in for example in PCT/US2009/000342, PCT/US10/000237, PCT/US2011/001547, PCT/US2013/000024, PCT/US2014/045727, and PCT/US2017/064626 and related applications. It can also be used in any vehicle for a support structure for occupants. Aircraft cabins have a limited vertical space to the ceiling. Therefore, space economies in the vertical direction are critical for a working design that can meet the geometry constraints of an aircraft cabin. Moreover, as in many past embodiments of their sleeper each occupant has aisle access. Furthermore, this embodiment offers the occupant a sitting position and a flatbed position, without significant moving parts. As in prior Air Sleeper configurations disclosed by the applicant, the present invention has mini cabins or pods for each of the occupants that can isolate air supplies of each occupant from the others. Air supply sources are provided to the Air Sleeper modules from the central air supply system and are channeled through to each of the parts. Vents in many of the embodiments will be positioned near the head of the occupant, in both the sitting position on the flatbed position, to create a positive pressure region around the face of the occupant to ensure that fresh air is inhaled. Prior disclosures by the applicant provide specific embodiments for vent positions and orientation. The supply of air from the central air system, maybe to each of the individual pods or in some embodiments to a vertical stack of upper and lower parts or occupant support mechanisms. Some such embodiments will have the connection to the central system for air at the level of vents in conventional cabins. Such a connection will then be separated to the upper part vents and a supply provided to the lower pod as supply ducting. In other embodiments, the air supply may be from the main air supply system to ports near the floor on in the lower part of the cabin to feed into a lower pod or occupant support which in turn has ducting to separate supply to the upper pod and to the vents of the lower part or occupant support mechanism. Some embodiments will use the architecture for the air ducts as shown in the figures in particular item 22-023. each of the occupant support modules will have adapters to attach to adapters of another occupant support module installed immediately above or below. A lateral ducting within adapter edits and will lead to the side of the aircraft cabin to attach to the main air supply in the aircraft. (A floor connection is also possible) This can be at any level to correspond to the position of the adapter on the cabin wall for the air supply.

Some of the embodiments have a leg and foot well for the upper occupant that is below the ceiling of the pod housing the lower occupant. This architecture results in a reduction in the required vertical space for the tiered architecture. Further, some embodiments have a drawer below the seat of the lower tier occupant, to store baggage. Some such embodiments may also have a conveyor belt as previously disclosed to move baggage within the drawer for the convenience of the occupants.

In the lower tier of occupants, considering that the foot well of the upper occupant pods intruded into the space of the lower occupant pods and there is limited head swing space in the event of a collision, particular reference to a 16 G test requirement, air cushions 22-017, (which may have vents and may be foam filled) may be installed on the lower edge of the foot wells on the lower occupant side to mitigate injury in the event of a head strike. Yet other embodiments have a sloping rear wall of the foot well that reduces the intrusion of the food well into the space of the lower occupant pod.

Egress and ingress to the upper tier occupant pods will be with stairs that may be fixed or retracted to a stowed position when not in use. A light functional solution would be to have a simple sliding ladder 22-027 that slides into position for egress and ingress. For ease of use by the occupant the ladder may have an actuation handled on an extension near the occupants armrest. Therefore, it can be pulled in place while seated in the upper occupant support seat. Other ladder arrangements are also disclosed each with their own benefits but with a disadvantage dimensional weight which is a critical factor in aircraft. The ladder arrangements for egress and ingress may in some embodiments have an additional structural role. For example the retractable ladder that extends to the back of the seat—retractable ladder with full length safety wall—may have structural studs to attach to the seatback on the front and back of the lateral safety wall. Such a safety wall will provide a shear plane to maintain the rigidity of the support structure. In a smaller more weight efficient embodiment—Ladder with foot well safety wall—what the fund. The safety wall is limited to the footwell. Here again attachment points with studs on the front and the rear of the safety wall will enhance rigidity of the structure. A fixed ladder structure as disclosed we also have a structural role in making the occupant support system rigid in a impact condition.

Hold rails Are attached to the support structure and integrated into the furniture adjoining the seat backs, to facilitate egress and ingress particularly for the upper tier occupants.

Safety of the occupant is of paramount importance when in the occupant support. In the seated position traditional approaches for safety such as seat belts may be used. However, occupant safety in the lie flat position will require careful consideration, particularly during takeoff and landing. The invention provides a shoulder/head stop 22-0192 limited motion of the shoulder and therefore the head in the event of an axial impact event for the vehicle.

Such a shoulder/head stop in some embodiments may be folded into an extension support to support the occupant when in the flatbed position. Such an extension support may itself be folded down onto the side of the foot well, or in other embodiments may be slidable below the seat bottom or the flatbed surface. In embodiments where there is a second drawer on the side of the foot well on the lower tier pod, the extension support and the shoulder stop may be attached to the front surface of the drawer. The front of such a second drawer will also provide a shear plane for loading of the foot frame in an axial deceleration condition such as a crash. 22-008. In the absence of the second drawer the side wall of the foot frame will provide the required shear plane for rigidity.

To enhance structural strength and rigidity for an assembled structure, some embodiments have several latch arrangements between the single stack structures. The embodiments shown in the figures represent these latch arrangements as notches for ease of representation. Many such latch arrangements will be slidably attached to allow axial motion of the adjoining single stack structures, but providing vertical load sharing. Some embodiments have attachments between the plates 1, 3, 3A or 2 at either or both the upper tube level and the lower tube level. Several variations of embodiments are shown in FIGS. 05A to 22-08C. In embodiments where there is no foot well Plate 1 may have such interconnections without adversely affecting egress and ingress. This si shown for example in FIGS. 42, 43, 44, 45, 46, 47. In the case of embodiments with footwells and foot frames as previously connections between adjoining foot frames and the related latches provide the transfer of loading between the single stack structures mounted there on and therefore aid in load sharing with connections between the adjoining single stack structures. Attachment between such contiguous AirSleeper units are disclosed in prior disclosures of the applicant.

A slight staggering of the position of the occupant supports in the upper tier relative to the occupant supports in the lower tier permits the direct support of the seatback of the lower tier with the lumbar support of the upper tier thereby increasing the structural rigidity of the system and is reflected in the design of the single stack structure. Alternative positions are possible with different staggering of upper and lower seats.

Some embodiments of the present invention use a plate 3 or 3A as a structural member beneath the shroud of the flatbed separator wall 22-012 as a structural member to provide rigidity to the single stack structures in the event of an axial deceleration loading on the vehicle. These structural members would provide a "shear plane" to prevent deflection of the system in the event of a crash event along the axis of the aircraft. Similarly plate 1 located on the aisle side of the seat will provide a role of a "shear plane" to transfer axial loading in the aircraft during crash conditions.

Pivoting armrests may be installed on either or both of the upper and lower tier occupant supports to facilitate egress and ingress.

Display screens may be installed for the lower tier occupant on the outside substantially vertical surface of the foot well of the upper tier occupant support. Such a display screen may also be pivotally attached during takeoff and landing so that the potential head strike in the event of an axial direction loading will happen on the passive air cushion if installed.

Oxygen supply will in these embodiments usually be with oxygen generators for each of the occupant supports rather than a centralized supply. However, a satellite supply may also be used.

Each occupant support has a front table 22-014,047 and several possible side tables 22-013, 48, 49 for the convenience of the occupant. Some such retractable table tops are retractable into the top of the adjoining flatbed housing 22-011, or folds down flat against the wall 22-005 of the flatbed. Retractable tables 22-48, and 49 may have folding flaps to add to the surface area when deployed.

The process for deployment of the AirSleepers in some embodiments with foot frames, will be first the installation of the foot frames with latches to the seat tracks. Such latches may be configured to attach it to adjoining foot frames as previously disclosed by the applicant. Thereafter, the single stack structures are attached thereto with latches. Such attachments are disclosed in prior disclosures of the applicant. Alternatively, in some embodiments the single stack structures are attached with latches to the seat tracks. Many latches that may be used for such attachment are in prior disclosures of the applicant. Adjoining single stack structures may be latched together embodiments with this feature.

Figure 34:
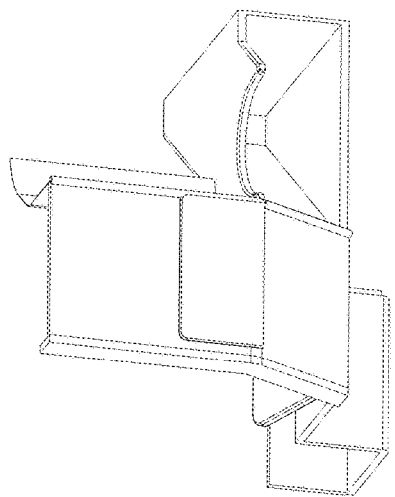
Figure 35:
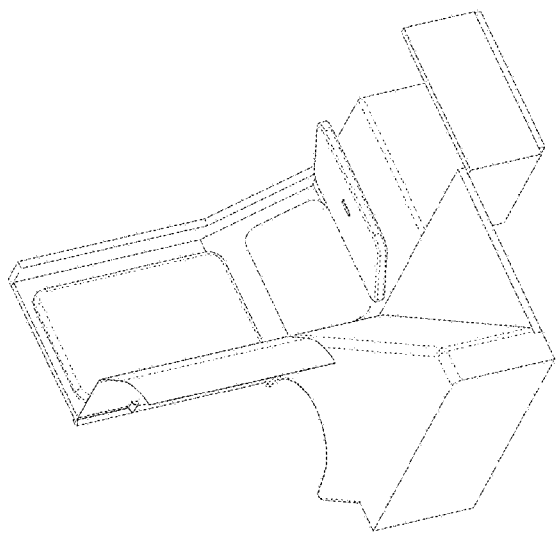

The single stack structures may be preassembled with the 2 tier seats assembled as shown in FIG. 36,37,38 or in some embodiments where the single stack structure can be separated into a structure comprising the lower tubes and another with the upper tubes, seats may be installed as units shown in FIGS. 33, 34, 35.

In other embodiments, the occupant support elements of each of the lower level occupant supports may be preassembled and attached to the foot frames with latches. Some such embodiments will have the flatbed surface 22-004 and the sitting surface 22-001, 22-002, 22-003 and the flatbed housing 22-011 covering the flatbed surface 22-004 of the occupant behind the installed occupant support. In this installation in some embodiments, the flatbed surface 22-004 may be attached to not just the foot frames immediately below the sitting surface 22-001 and the foot well 22-009, but also to the foot frames immediately fore (front) of the occupant support, to increase structural strength and rigidity to the installed system. The subsequent installation of the occupant support in front of this occupant support that has been installed will follow the same procedure and in addition have its flatbed housing 22-011 attached to the flatbed surface 22-004 of the occupant support immediately behind, for additional rigidity and strength of the installed system. Following the installation of the first tier of occupant supports in the system, the upper tier is installed. This assumes that the single stack structure can be separated into an upper and lower section.

Structural support of the system of occupant supports is made up of single stack structures that may in some embodiments be separated in to upper and lower parts.

Such single stack structures may have some or all elements comprising composite materials such as carbon fiber fabrications. The single stack structures accommodate the sitting position and flatbed position for the occupant in a contiguous space. The support tubes transferred the initial loading during impact and also the weight of the occupant to the support tracks. These loads are conveyed through the support plates. Considering the substantial moments of the initial loading of the system comprising the occupants and the support structures during a crash condition such as a 16 G loading in the axial direction of the aircraft or vehicle, many embodiments will benefit from attachments between structural supports of contiguous occupant supports. There are many possibilities for such attachments. As disclosed by the applicant in the past some such attachments will need to accommodate expansion and contraction of the airframe. Therefore some such attachments will have such detachable attachments having sliding arrangements. These are shown in some of the figures as notches. Assembly and disassembly of the occupant supports and transferring them out of the aircraft for maintenance or installation needs to consider the sides of the largest component that needs to be moved to fit through the doors. To this end the support tubes may have telescoping sections. Clearly, the overlapping sections of those telescoping tubes must be of sufficient length to sustain the loading forces. Moreover weight considerations are important in sizing the tubes for both their structural role and for allowing such telescoping action.

FIGS. 05A, B and C, show an embodiment of the single stack structures. The embodiment shown is attached at the top of foot frames which provide such structural support as disclosed in prior disclosures of the applicant. The single stack structures include structural tubes 22-028, structural plates 22-029, 22-030 and 22-031 (or 22-032 not shown). They also include structural support for handles for the applicant.

Structural plate 22-030 is optional if a cantilevered solution is acceptable considering the forces on the structural system and a crash during conditions.

Seat support elements 22-034 are attached to the seat bottom. And the sleeper support elements 22-035 are attached to the flatbed element.

FIGS. 06A, B and C show an embodiment two sets of structural support members. In some such embodiments structural support members of contiguous occupant supports are connected to allow the transfer of forces between the contiguous structural support members to mitigate track loadings. The figures show the features 22-37, 22-38, 22-39 which are notches for slidable attachment between the support structures of contiguous occupant supports.

FIGS. 07A, B, C show an embodiment as in FIGS. 06A, B, C but with structural plate 3A or 22-032 rather than 22-031. This structural plate increases the flexibility in the shape of shrouds separating the occupant supports, but limits the structural strength of the assembled structural support members. For example some shrouds will leave an open space between pods and so the place 3A will accommodate that with a compromise to structural rigidity.

FIGS. 08A, B and C show the structural support members directly attached to the seat tracks with suitable latches. Some embodiments of such latches are disclosed in prior filings of the applicant.

Latch arrangements to the seat tracks for the embodiments without the foot frame, need to accommodate the vertical loading of the single stack structures, and also the horizontal loading during rapid deceleration or acceleration of the vehicle. If the single stack structures are not attached to each other in the axial direction two latch pairs would be normal approximately below the two tubes at the lower level. Usually one of the two latches will have horizontal load limiting and both latches will have vertical compressive and tensile load limiting.

However, when adjoining single stack structures are attached to each other as noted above, there is load sharing between the single stack structures. Therefore in such embodiments the front latch of each of the single stack structures have a limited role. And may be limited to a compression loadbearing pad. This will take the vertical loading of the single stack structure.

Loadbearing during axial deceleration of the vehicle will be transferred to the rear latch of each of the single stack structures which are now connected with the single stack structure behind.

Similar arguments are provided for the case with foot frames in prior disclosures of the applicant.

Embodiments disclosed herein for the air sleeper are also family-friendly, and include a detachable brace for a child seat in the space adjoining the occupant sitting position. Latch arrangements for such a child seat need to be attached to a structural member because of loadings during crashes. Some embodiments of the present invention attach the brace to the plate 3 or 3A through the shroud for structural integrity.

FIGS. 69,70 show the detachable brace for a latch attachment for a child seat. Such child seats can be standard automotive seats. The brace may support either a forward facing or rear facing seats, and can be latched onto a brace that accommodates a forward facing direction or a angled direction in the direction of the flat bed surface.

The Brace and structural strength should accommodate the maximum size of child seat. There are child seats and boosters available in the market for children up to 12 years of age.

The air supply system for the occupant supports in this invention will be extended in this embodiment with the child seat support facility to have an auxiliary vent just ahead of the child seat position.

If the Occupant support spaces are substantially sealed pods with the wall 22-012 as a complete partition, an air supply in the pod will suffice and will fill the space in the pod with a positive pressure and feed both the occupant and the child in the child seat.

CONCLUSIONS, RAMIFICATIONS & SCOPE

It will become apparent that the present invention presented, provides a new paradigm for implementing key safety features comfort and convenience features for occupants in vehicle.

The invention claimed is:

1. A system of tiered occupant support structures in a vehicle with each of said tiered occupant support structures consisting of an upper and a lower occupant support each configured to provide an occupant with a sleep position with a flat bed and a sitting position with a seat bottom, wherein:
   the sitting position is adjoining an aisle of the vehicle;
   a space occupied by the flat bed has a proximal end adjoining the aisle and a distal end away from the aisle;
   the flat bed is at an angle to the direction of the aisle;
   each of the occupants have aisle access;
   the upper occupant support has egress and ingress access with steps adjoining the aisle;
   each of said occupant supports comprise a foot space that lies adjacent to the seat bottom, and an edge of said foot space with the aisle lies at a substantially constant distance from the center of the aisle along substantially the entire length of said edge;
   the sitting position has an upright orientation;
   the seat bottom of the lower occupant support in the upright sitting position, is directly below at least a part of the seat bottom of the upper occupant support in the upright sitting position; and
   wherein the system of tiered occupant supports are arranged along the aisle of the vehicle in the direction of an axis of the vehicle.

2. A system of tiered occupant support structures in a vehicle as in claim 1, wherein said occupant supports are configured to allow the feet of the occupant in a sitting position in the upper occupant support to be at a vertical position below a ceiling of the lower occupant support.

3. A system of tiered occupant support structures in a vehicle as in claim 1, further comprising an air supply ducting to channel air from the aircraft supply to locations in the vicinity of the head of the occupants in the upper and lower occupant supports in one or more of the positions of the head of the occupant in the sitting position and the flat bed lying position, and wherein vents of said ducts distribute air to create a positive pressure region around the occupant head thereby facilitating fresh air from the aircraft supply for breathing by the occupants.

4. A system of tiered occupant support structures in a vehicle as in claim 1, wherein said steps adjoining said aisle are slidable along the edge of the occupant support structure adjacent to the aisle, to lie below the foot space of the upper occupant sitting position.

5. A system of tiered occupant support structures in a vehicle as in claim 1, further comprising one or more retractable table tops configured to slide under the top of a flatbed housing (22-011), or pivotally attached to the side of the flatbed (22-005) to slide pivotally under the top of the flatbed housing.

6. A system of tiered occupant support structures in a vehicle as in claim 1, wherein each of said occupant support structures is attached to seat tracks on the floor of the vehicle with fixed latch arrangements.

7. A system of tiered occupant support structures in a vehicle as in claim 6, wherein said attachments to seat tracks with latches are through foot frames with foot wells.

8. A system of tiered occupant support structures in a vehicle as in claim 6, wherein the structure is directly connected to the seat tracks, and each of said structures have a pair of latches substantially at the location of one or more of the lateral members at the lower level.

9. A system of tiered occupant support structures in a vehicle as in claim 1, wherein each of said tiered occupant support structures are supported with a single stack structure for load bearing.

10. A system of tiered occupant support structures in a vehicle as in claim 9, wherein said single stack structure has two or more plates substantially in the direction of the axis of the vehicle and substantially vertical to support vertical loads and inertial loads during deceleration of the vehicle.

11. A system of tiered occupant support structures in a vehicle as in claim 10, wherein one of said plates lie adjoining the flat bed surface of one or more of the lower and upper occupant supports.

12. A system of tiered occupant support structures in a vehicle as in claim 10, further comprising one or more lateral members at each of upper and lower occupant support seat levels configured to attach to said plates.

13. A system of tiered occupant support structures in a vehicle as in claim 12, wherein seat and flat bed structures are attached to the lateral members.

14. A system of tiered occupant support structures in a vehicle as in claim 1, wherein said support structures are interconnected along the axis of the vehicle, with detachable connections at one or more vertical levels to transfer loads.

15. A system of tiered occupant support structures in a vehicle as in claim 14, wherein said interconnections are slidable connections to allow horizontal motion relative to the each other but transfer vertical loads.

16. A system of tiered occupant support structures in a vehicle as in claim 14, wherein one pair of said connections comprise a substantially fixed latch connection to the seat tracks, thereby proving a common latch for adjoining support structures.

17. A system of tiered occupant support structures in a vehicle as in claim 1, further comprising a support extension above a foot-space of one or more occupant supports at the level of the flat bed to provide support for a torso of said occupant while in the flat bed space.

18. A system of tiered occupant support structures in a vehicle as in claim 17, further comprising a shoulder/head stop located in front of the occupant head or shoulder while in the flat bed position, in the direction of the axis of the vehicle for load bearing in the axial of the vehicle.

19. A system of tiered occupant support structures in a vehicle as in claim 1, further comprising a detachable brace with child seat latch connections to mount a child seat in one or more of said occupant supports in a space outside a space required for said sitting position of the occupant, to be in one or more facing directions of the child seat with regard to the direction of motion of the vehicle.

20. A system of tiered occupant support structures in a vehicle as in claim 7, further comprising an air supply vent connected to the air supply ducting in the occupant support structure configured to be in the vicinity of the child seat.

* * * * *